United States Patent
Wei

(10) Patent No.: US 11,366,083 B2
(45) Date of Patent: Jun. 21, 2022

(54) DETECTION CARTRIDGE, DETECTION METHOD, AND DETECTION DEVICE

(71) Applicant: SKYLA Corporation, Hsinchu (TW)

(72) Inventor: Chia-Chun Wei, Hsinchu (TW)

(73) Assignee: SKYLA Corporation, Hsinchu (TW)

(*) Notice: Subject to any disclaimer, the term of this patent is extended or adjusted under 35 U.S.C. 154(b) by 338 days.

(21) Appl. No.: 16/566,919

(22) Filed: Sep. 11, 2019

(65) Prior Publication Data

US 2020/0132637 A1 Apr. 30, 2020

(30) Foreign Application Priority Data

Oct. 31, 2018 (CN) .......................... 201811283628.1

(51) Int. Cl.
*G01N 29/22* (2006.01)
*G01N 1/38* (2006.01)
(Continued)

(52) U.S. Cl.
CPC ............ *G01N 29/222* (2013.01); *G01N 1/38* (2013.01); *G01N 29/02* (2013.01); *B01L 3/5025* (2013.01); *G01N 2001/383* (2013.01)

(58) Field of Classification Search
CPC ........ G01N 29/222; G01N 1/38; G01N 29/02; G01N 2001/383; G01N 35/04; B01L 3/5025; B01L 2400/0409; B01L 2300/0867; B01L 2300/0883; B01L 2400/0406; B01L 2200/0621; B01L 2200/16; B01L 3/50273

See application file for complete search history.

(56) References Cited

U.S. PATENT DOCUMENTS

2006/0073484 A1* 4/2006 Mathies .............. B01F 11/0071
435/6.19
2008/0156079 A1* 7/2008 Momose ........... B01L 3/502715
73/61.44

(Continued)

FOREIGN PATENT DOCUMENTS

CN 107930710 4/2018
JP 2007285968 11/2007

(Continued)

OTHER PUBLICATIONS

"Office Action of Taiwan Counterpart Application", dated Feb. 4, 2020, p. 1-p. 6.

(Continued)

*Primary Examiner* — David Z Huang
(74) *Attorney, Agent, or Firm* — JCIPRNET

(57) ABSTRACT

A detection cartridge, a detection method, and a detection device are provided. The detection cartridge includes a detection tank, a sample tank, N containers, and at least one first temporary tank. The sample tank is in communication with the detection tank. The N containers are in communication with the detection tank, wherein N is a positive integer greater than or equal to 2. The at least one first temporary tank is disposed on at least one of N flow paths between the N containers and the detection tank, wherein a quantity of the first temporary tanks on an nth flow path in the N flow paths is greater than or equal to that on an (n-1)th flow path, and n is a positive integer that is not less than 2 and is not more than N.

17 Claims, 55 Drawing Sheets

(51) Int. Cl.
  *G01N 29/02* (2006.01)
  *B01L 3/00* (2006.01)

(56) References Cited

U.S. PATENT DOCUMENTS

| | | | | |
|---|---|---|---|---|
| 2010/0262389 | A1* | 10/2010 | Nakanishi | B01F 13/0059 |
| | | | | 702/56 |
| 2013/0209329 | A1* | 8/2013 | Momose | B01L 3/502746 |
| | | | | 422/506 |
| 2018/0161772 | A1* | 6/2018 | Rammohan | B01L 3/502738 |

FOREIGN PATENT DOCUMENTS

| | | | |
|---|---|---|---|
| TW | 201334861 | | 9/2013 |
| TW | 201516410 | | 5/2015 |
| TW | I588486 | | 6/2017 |
| TW | I591340 | | 7/2017 |
| WO | WO-2009066737 A1 * | 5/2009 | B01L 3/50273 |
| WO | 2012165006 | | 12/2012 |

OTHER PUBLICATIONS

"Search Report of Europe Counterpart Application", dated Feb. 10, 2020, p. 1-p. 9.

* cited by examiner

DETECTION CARTRIDGE, DETECTION METHOD, AND DETECTION DEVICE

CROSS-REFERENCE TO RELATED APPLICATION

This application claims the priority benefits of China application serial no. 201811283628.1, filed on Oct. 31, 2018. The entirety of the above-mentioned patent application is hereby incorporated by reference herein and made a part of this specification.

BACKGROUND OF THE INVENTION

Field of the Invention

The invention relates to a detection cartridge, a detection method, and a detection device, and in particular, to a detection cartridge, a detection method, and a detection device suitable for detecting a liquid sample.

Description of Related Art

In the detection method of a conventional liquid sample, some of the detection methods require the addition of two or more reagents in order to detect the required detection items from the reaction results. These detection methods have a complicated operation process and are prone to human error, resulting in incorrect detection results.

In order to increase the accuracy and convenience of detection, various detection cartridges have been developed, which are mostly micro-channel structures designed to make liquid flow in the micro-channel structures via capillary action. However, when detection is performed using the current detection cartridges, the operation process of the machine is still quite complicated. Therefore, how to develop a detection cartridge that may simplify the complicated operation process of the detection machine is the goal of the industry.

SUMMARY OF THE INVENTION

The invention provides a detection cartridge, a detection method, and a detection device that may simplify the complicated operation process of a detection machine.

The invention provides a detection cartridge including a detection tank, a sample tank, N containers, and at least one first temporary tank. The sample tank is in communication with the detection tank. The N containers are in communication with the detection tank, wherein N is a positive integer greater than or equal to 2. The at least one first temporary tank is disposed on at least one of N flow paths between the N containers and the detection tank, wherein a quantity of the temporary tanks on an nth flow path in the N flow paths is greater than or equal to that on an (n−1)th flow path, and n is a positive integer that is not less than 2 and is not more than N.

According to an embodiment of the invention, in the detection cartridge, the sample tank may not be located on the N flow paths.

According to an embodiment of the invention, in the detection cartridge, the at least one first temporary tank may be located at a turning point of the N flow paths.

According to an embodiment of the invention, in the detection cartridge, a waste tank is further included. The waste tank is in communication with the detection tank.

According to an embodiment of the invention, in the detection cartridge, a centrifuge tank is further included. The centrifuge tank is in communication between the sample tank and the detection tank.

According to an embodiment of the invention, in the detection cartridge, the centrifuge tank and the at least one first temporary tank may respectively be in communication with the waste tank.

According to an embodiment of the invention, in the detection cartridge, a second temporary tank and a capture unit may be further included. The second temporary tank is in communication with the detection tank. The capture unit is connected to an inner wall of the second temporary tank.

According to an embodiment of the invention, in the detection cartridge, a capture unit is further included. The capture unit is connected to an inner wall of the at least one first temporary tank.

According to an embodiment of the invention, in the detection cartridge, some of the N flow paths may have a shared path.

According to an embodiment of the invention, in the detection cartridge, an (n−1)th container in the N containers may be located on a shared path between the nth container and the detection tank.

The invention provides a detection method including the following steps. A centrifuge device is provided. The centrifuge device includes a driving unit, a platform connected to the driving unit, and a turntable disposed on the platform, wherein the platform has an axis of rotation. The detection cartridge is disposed on the turntable. A sample is placed into the sample tank. N reagents are respectively placed into the N containers. The sample is introduced into the detection tank. The N reagents are sequentially introduced into the detection tank via the N flow paths. The liquid in the detection tank is detected. In the step of sequentially introducing the N reagents into the detection tank via the N flow paths, by controlling the rotation speed and the rotating direction of the platform, a relative position of any position on the detection cartridge with respect to the axis of rotation is changed, and a centrifugal force is added to the sample and the N reagents.

According to an embodiment of the invention, in the detection method, the detection cartridge may have an angle of rotation with respect to a reference direction, and the angle of rotation may be set according to a flow path in the N flow paths in which a position of a liquid is to be changed.

According to an embodiment of the invention, in the detection method, when the detection cartridge is located at the angle of rotation and the centrifugal force is applied to the sample and the N reagents, the position of the liquid in one part of the N flow paths may be changed, and the liquid in the other part of the N flow paths remains in the same position.

According to an embodiment of the invention, in the detection method, the detection cartridge further includes a centrifuge tank. The centrifuge tank is in communication between the sample tank and the detection tank.

According to an embodiment of the invention, in the detection method, the detection cartridge further includes a waste tank. The waste tank is in communication with the detection tank.

According to an embodiment of the invention, in the detecting method, the step of sequentially introducing the N reagents into the detection tank via the N flow paths may include the following steps. The liquid in the (n−1)th flow path is introduced into the detection tank. The liquid in the detection tank is introduced into the waste tank. The liquid in the nth flow path is introduced into the detection tank.

According to an embodiment of the invention, in the detection method, the detection cartridge further includes a second temporary tank and a capture unit. The second temporary tank is in communication with the detection tank. The capture unit is connected to an inner wall of the second temporary tank.

According to an embodiment of the invention, in the detection method, before the liquid in the detection tank is introduced into the waste tank, the following steps may be further included. The liquid in the detection tank is introduced into the second temporary tank. The liquid in the second temporary tank is returned to the detection tank.

According to an embodiment of the invention, in the detection method, the detection cartridge further includes a capture unit. The capture unit is connected to an inner wall of the at least one first temporary tank.

The invention provides a detection device, including a centrifuge device and the detection cartridge. The centrifuge device includes a driving unit, a platform, and a turntable. The platform is connected to the driving unit. The turntable is disposed on the platform. The detection cartridge is mounted on the turntable.

Based on the above, in the detection cartridge, the detection method, and the detection device provided by the invention, by setting the quantity of the temporary tanks on the nth flow path in the N flow paths of the detection cartridge to be greater than or equal to the quantity of the temporary tanks of the (n−1)th flow path, the N reagents may be sequentially introduced into the detection tank via the N flow paths. Therefore, the detection cartridge and the detection method provided by the invention may execute multi-stage reaction detection, simplify the complicated operation flow of the detection machine, reduce human error, and improve the convenience of detection.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
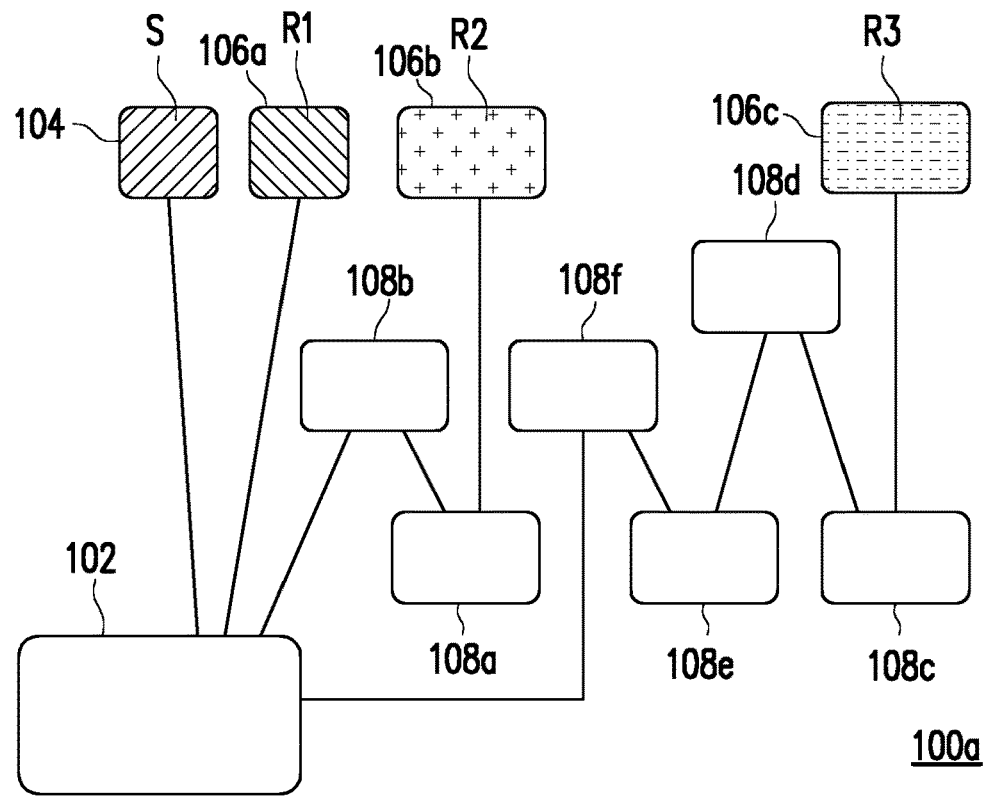
FIG. 1A to FIG. 1F are flowcharts of a detection method of an embodiment of the invention.

FIG. 1A to FIG. 1F are flowcharts of a detection method of an embodiment of the invention. FIG. 2A is a schematic of a detection device of an embodiment of the invention. FIG. 2B to FIG. 2D are top views of the detection device of FIG. 2A. For a clearer explanation, the turntable is not shown in FIG. 2B to FIG. 2D.

Referring to FIG. 1A and FIG. 2A to FIG. 2D, a detection device 10 includes a centrifuge device 12 and a detection cartridge 100a. The centrifuge device 12 includes a driving unit 14, a platform 16, and a turntable 18. The platform 16 is connected to the driving unit 14. The turntable 18 is disposed on the platform 16. The detection cartridge 100a is mounted on the turntable 18. The detection cartridge 100a may be disc shaped, but the invention is not limited thereto.

The detection cartridge 100a includes a detection tank 102, a sample tank 104, N containers, and at least one first temporary tank. The detection cartridge 100a may be used to detect a test object in a liquid. For example, the detection cartridge 100a may be used for biochemical detection (e.g., blood biochemical values, antigen detection) or contaminant detection (e.g., heavy metals). The detection tank 102 may be used to hold a liquid containing a test object.

The sample tank 104 is in communication with the detection tank 102 and may be used to house a sample. The sample is, for example, blood, plasma, or waste liquid discharged from a factory. The sample tank 104 may be in communication with the detection tank 102 via a pathway.

The N containers are in communication with the detection tank 102, wherein N is a positive integer greater than or equal to 2. The container may be used to house a variety of reagents. The reagents may be liquid reagents or solid reagents. When the container houses solid reagents, a diluent may be added to dissolve the solid reagents to obtain a liquid reagent. Those skilled in the art may determine the composition of the reagents based on the sample type and the detection item. In the present embodiment, N is exemplified by 3, but the invention is not limited thereto. That is, the detection cartridge 100a includes containers 106a to 106c. The container 106a is in communication with the detection tank 102 via a first flow path. The container 106b is in communication with the detection tank 102 via a second flow path. The container 106c is in communication with the detection tank 102 via a third flow path. The sample tank 104 may not be located on the first flow path to the third flow path.

The at least one first temporary tank is disposed on at least one of N flow paths between the N containers and the detection tank 102, wherein a quantity of the temporary tanks on an nth flow path in the N flow paths is greater than or equal to that on an (n−1)th flow path, and n is a positive integer that is not less than 2 and is not more than N. In the present embodiment, n is exemplified by a positive integer that is not less than 2 and is not more than 3, but the invention is not limited thereto.

In the present embodiment, the quantity of the temporary tanks is exemplified by 6, but the invention is not limited thereto. The detection cartridge 100a includes first temporary tanks 108a to 108f. The first temporary tanks 108a and 108b are disposed on a second flow path between the container 106b and the detection tank 102. The first temporary tanks 108c to 108f are disposed on a third flow path between the container 106c and the detection tank 102. In addition, the quantity of the temporary tanks on the third flow path (4) is greater than the quantity of the temporary tanks on the second flow path (2), and the quantity of the temporary tanks on the second flow path (2) is greater than the quantity of the temporary tanks on the first flow path (0).

Specifically, the container 106a and the detection tank 102 may be sequentially disposed on the first flow path. The container 106b, the first temporary tanks 108a to 108b, and the detection tank 102 may be sequentially disposed on the second flow path. The container 106c, the first temporary tanks 108c to 108f, and the detection tank 102 may be sequentially disposed on the third flow path.

In the present embodiment, the first temporary tanks 108a to 108f may respectively be located at the turning points of the first flow path to the third flow path. By disposing the first temporary tanks 108a to 108f at the turning points of the flow paths, the liquid flowing into the first temporary tanks 108a to 108f along the flow paths remains therein and temporarily no longer flows along the flow paths. Therefore, the order in which the liquid in the containers 106a to 106c flows into the detection tank 102 may be adjusted by setting the quantity of the temporary tanks on the flow paths.

Hereinafter, the detection method using the above detection cartridge 100a is described with reference to FIG. 1A to FIG. 1F and FIG. 2A to FIG. 2D.

Referring to FIG. 2A to FIG. 2D, a centrifuge device 12 is provided, wherein the central device 12 includes a driving unit 14, a platform 16 connected to the driving unit 14, and a turntable 18 disposed on the platform 16.

The platform 16 has an axis of rotation O1. The driving unit 14 is used to drive the platform 16 to rotate the platform 16 about the axis of rotation O1. A plurality of the turntable 18 may be disposed on the platform 16, so that a plurality of the detection cartridge 100a may be mounted at the same time to improve detection efficiency. In the present embodiment, one detection cartridge 100a is mounted as an example, but the invention is not limited thereto. Any case in which one or more of the detection cartridge 100a is mounted on the platform 16 of the centrifuge device 12 is within the scope of the invention. In addition, it is well known to those skilled in the art that before the driving unit 14 of the centrifuge device 12 drives the platform 16 to rotate, the platform 16 is first weighted to maintain the balance of the platform 16 and ensure that the centrifuge device 12 is functioning properly, which is not explained herein. In the case where two or more of the detection cartridge 100a are disposed on the platform 16 of the centrifuge device 12, the platform 16 may also be weighted by using a plurality of detection cartridges 100a to ensure that the centrifuge device 12 may operate normally. Further, it is well known to those skilled in the art that the above driving device 14 may include various components such as a motor (not shown) and a rotating shaft (not shown), which are not described herein.

The turntable 18 may have an axis of rotation O2. The axis of rotation O1 is not coaxial with the axis of rotation O2. The turntable 18 is, for example, provided with a counterweight (not shown) on top such that the mass center of the turntable 18 in combination with the counterweight is not located at the axis of rotation O2 of the turntable 18. Thus, via the design of the mass center of the turntable 18, the turntable 18 may drive the detection cartridge 100a mounted on the turntable 18 to rotate relative to the platform 16 as the platform 16 is rotated.

The detection cartridge 100a may have an angle of rotation θ with respect to a reference direction D. The detection cartridge 100a may be rotated along the axis of rotation O2 to another angle of rotation. The detection cartridge 100a has a chord section 110 as an alignment mark. For example, by setting the direction of the axis of rotation O1 and the axis of rotation O2 as the reference direction D, the angle between a normal N and the reference direction D on the chord section 110 of the detection cartridge 100a may be set as the angle of rotation θ. When the platform 16 is rotated about the axis of rotation O1, a centrifugal force may provide a driving force for the liquid in the detection cartridge 100a to move toward the direction of the centrifugal force. In addition, the angle of rotation θ may be set according to the flow path of the three flow paths (first flow path to third flow path) where the position of the liquid is to be changed.

Hereinafter, the control method of the angle of rotation θ is described with reference to FIG. 2B to FIG. 2D.

In an embodiment, an elastic member (e.g., a spring) (not shown) may be disposed between the platform 16 of the centrifuge device 12 and the turntable 18, and a stop structure (not shown) may be disposed on the platform 16. The driving unit 14 of the centrifuge device 12 drives the platform 16 to rotate about the axis of rotation O1, the centrifugal force applied to the turntable 18 is less than the elastic force of the elastic member (such as pretension, initial tension, or initial force of a spring), and the turntable 18 does not rotate around the axis of rotation O2, that is, the angle of rotation θ of the detection cartridge 100a remains unchanged (FIG. 2B). When the driving unit 14 drives the rotating speed of the platform 16 to increase, and the centrifugal force applied to the turntable 18 is greater than the elastic force of the elastic member, the turntable 18 is rotated about the axis of rotation O2, so that the relative position of any position on the turntable 18 with respect to the axis of rotation O1 is changed, that is, the angle of rotation θ of the detection cartridge 100a is changed. At this time, the angle of rotation θ may have a fixed angle via the design of a stop point on the platform 16 (FIG. 2C). Then, when the rotating speed of the platform 16 is lowered and the centrifugal force applied to the turntable 18 is less than the elastic force of the elastic member, the driving force causing the turntable 18 to rotate disappears, and the turntable 18 returns to the initial state. With the design of the stop point on the platform 16, the angle of rotation θ of the detection cartridge 100a returns to the initial degree and is a fixed angle (FIG. 2B).

Moreover, the centrifuge device 12 may further utilize the driving unit 14 to change the acceleration and deceleration inertia generated during the change in direction, so that the mass center of the turntable 18 combined with the counterweight is subjected to centrifugal force variation, and via the interference between the platform 16 and the turntable 18 (e.g., the interlocking of the gears), the direction of the turntable 18 is changed and the angle of rotation θ of the detection cartridge 100a is changed as a result. For example, a first gear (not shown) is between the driving unit 14 of the centrifuge device 12 and the platform 16, and a second gear (not shown) is between the platform 16 and the turntable 18, wherein the first gear and the second gear are connected by an interlocking design. In the state of FIG. 2B, it is assumed that the platform 16 is rotated about the axis of rotation O1 (e.g., clockwise rotation) and the angle of rotation θ of the detection cartridge 100a remains unchanged. However, when the driving unit 14 changes the driving direction (for example, changing to counterclockwise rotation), the platform 16 is rotated due to inertia (such as clockwise rotation), and at this time, due to the interlocking design of the first gear and the second gear, the driving force applied by the driving unit 14 causes the second gear to drive the turntable 18 to rotate about the axis of rotation O2 (such as clockwise rotation), thereby changing the relative position of any position on the turntable 18 with respect to the axis of rotation O1, that is, the angle of rotation θ of the detection cartridge 100a is changed, and via the stop point design on the platform 16, the angle of rotation θ is a fixed angle (as shown in FIG. 2D). Then, when the driving unit 14 changes the driving direction again, similar to the above actuation principle, the turntable 18 is returned to the initial state (as shown in FIG. 2B).

In an embodiment, the detection cartridge 100a may have three angles of rotation θ, such as 0 degrees (FIG. 2B), −60 degrees (FIG. 2C), and 90 degrees (FIG. 2D), but the invention is not limited thereto. For example, when the platform 16 is rotated clockwise at a low speed, since the centrifugal force applied to the turntable 18 is smaller than the elastic force of the elastic member, the angle of rotation θ of the detection cartridge 100a may be maintained at 0 degrees (FIG. 2B). When the platform 16 is rotated clockwise at a high speed, since the centrifugal force applied to the turntable 18 is greater than the elastic force of the elastic member, the turntable 18 is rotated counterclockwise, and with the design of the stop point, the angle of rotation θ of the detection cartridge 100a may be maintained at −60 degrees (FIG. 2C). Moreover, when the platform 16 is rotated counterclockwise, the turntable 18 is rotated clockwise by changing the inertia of the rotation and the interlocking of the gears, and with the design of the stop point, the angle of rotation θ of the detection cartridge 100a may be maintained at 90 degrees (FIG. 2D).

It may be seen that in the present embodiment, via the configurations of the counterweight, the elastic member, the stop structure, the stop point, and the gears with the switching of the driving direction and high and low rotating speed, the direction of the turntable 18 may be changed without stopping the rotating state of the platform 16, such that the detection cartridge 100a has a plurality of different angles of rotation θ.

In the present embodiment, although the angle of rotation θ is defined by the angle between the normal N and the reference direction D on the chord section 110, the invention is not limited thereto. In other embodiments, the angle of rotation may also be defined in accordance with the relative angular relationship of other alignment marks (e.g., alignment point, an alignment line, or an alignment pattern) disposed on the detection cartridge 100a and the reference direction D.

When the detection cartridge 100a is located at a specific angle of rotation and a centrifugal force is applied to a sample S and reagents R1 to R3, the position of the liquid in the three flow paths may be changed (flowing into the next tank) or remaining in the same position (remaining in the same tank). In the present embodiment, the quantity of the angles of rotation is set to two as an example. The first angle of rotation is 0 degrees, and the second angle of rotation is −60 degrees, but the quantity of the angles of rotation and the angle values of the invention are not limited thereto.

Figure 2A:
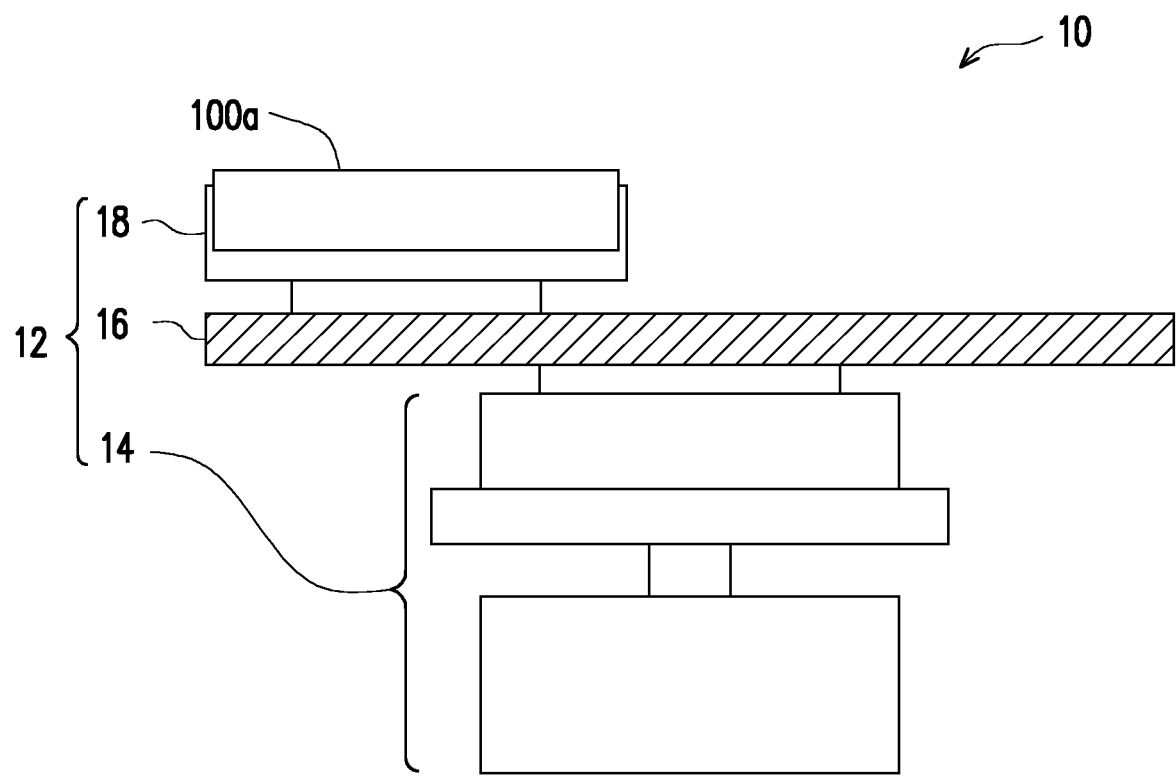
FIG. 2A is a schematic of a detection device of an embodiment of the invention.
Figure 2B:
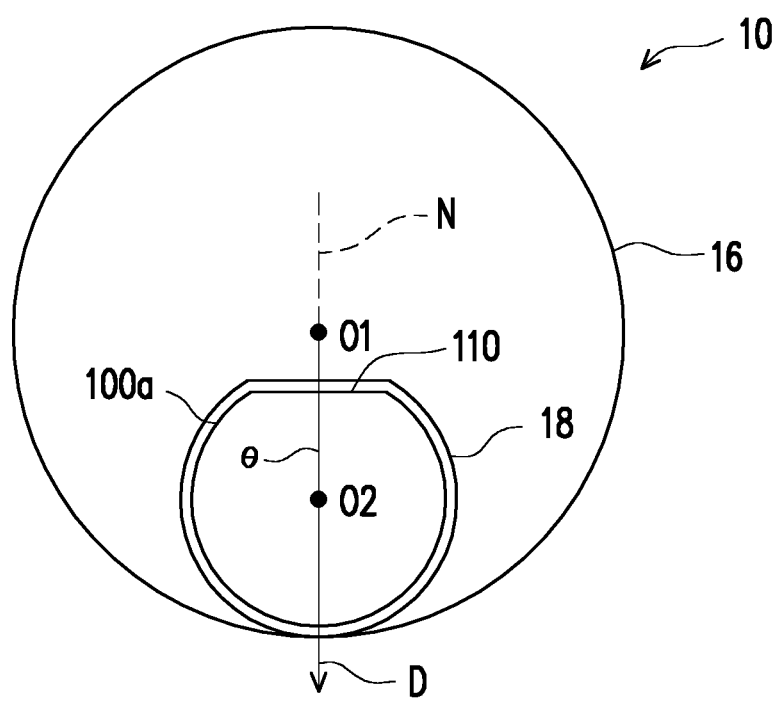
FIG. 2B to FIG. 2D are top views of the detection device of FIG. 2A.
Figure 2C:
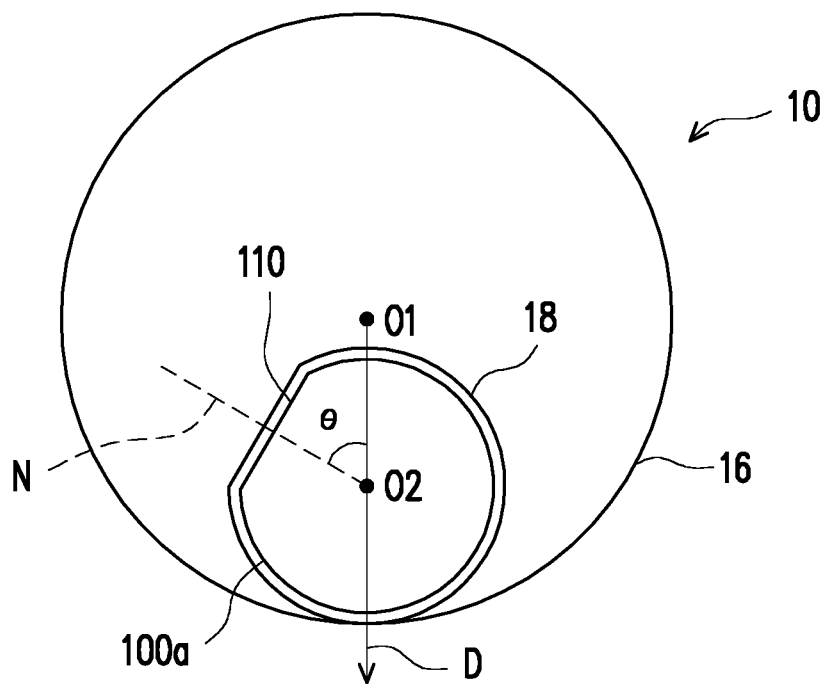
Figure 2D:
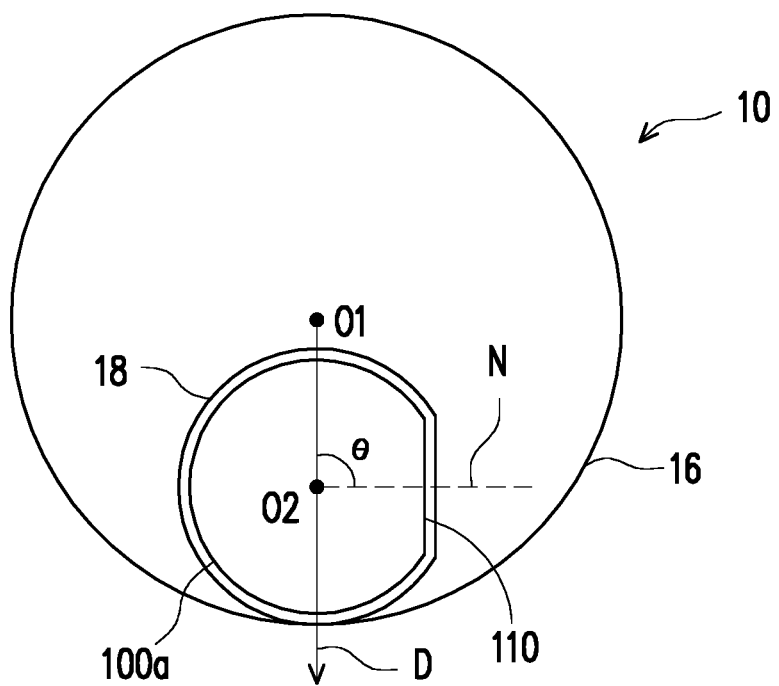

Referring to FIG. 1A, the detection cartridge 100a is provided. The sample S is placed in the sample tank 104, and the reagents R1 to R3 are respectively placed in the storage tanks 106a to 106c. Next, the detection cartridge 100a is mounted on the turntable 18. In another embodiment, the detection cartridge 100a may be first mounted on the turntable 18, and the sample S and the reagents R1 to R3 are respectively placed in the sample tank 104 and the containers 106a to 106c.

Figure 1B:
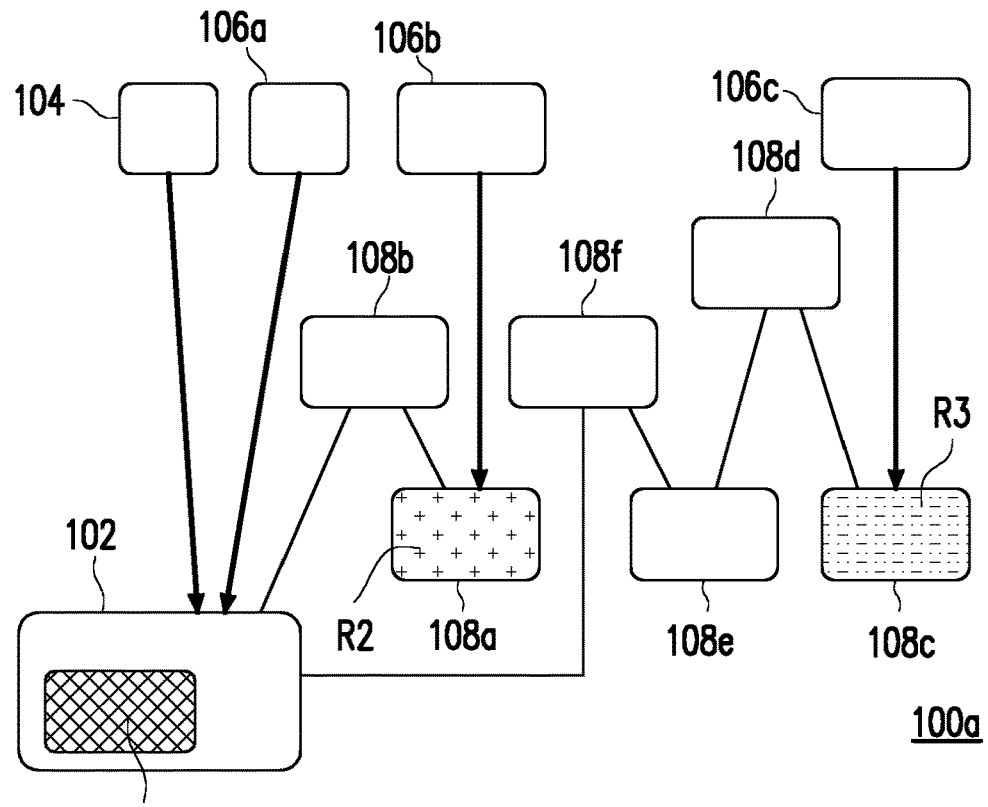

Referring to FIG. 1B, when the detection cartridge 100a is set to be located at the first angle of rotation (e.g., 0 degrees) and a centrifugal force is applied to the sample S and the reagents R1 to R3, the sample S flows into the detection tank 102, the reagent R1 flows into the detection tank 102, the reagent R2 flows into the first temporary tank 108a, and the reagent R3 flows into the first temporary tank 108c. At this time, the sample S and the reagent R1 flowing into the detection tank 102 react.

Figure 1C:
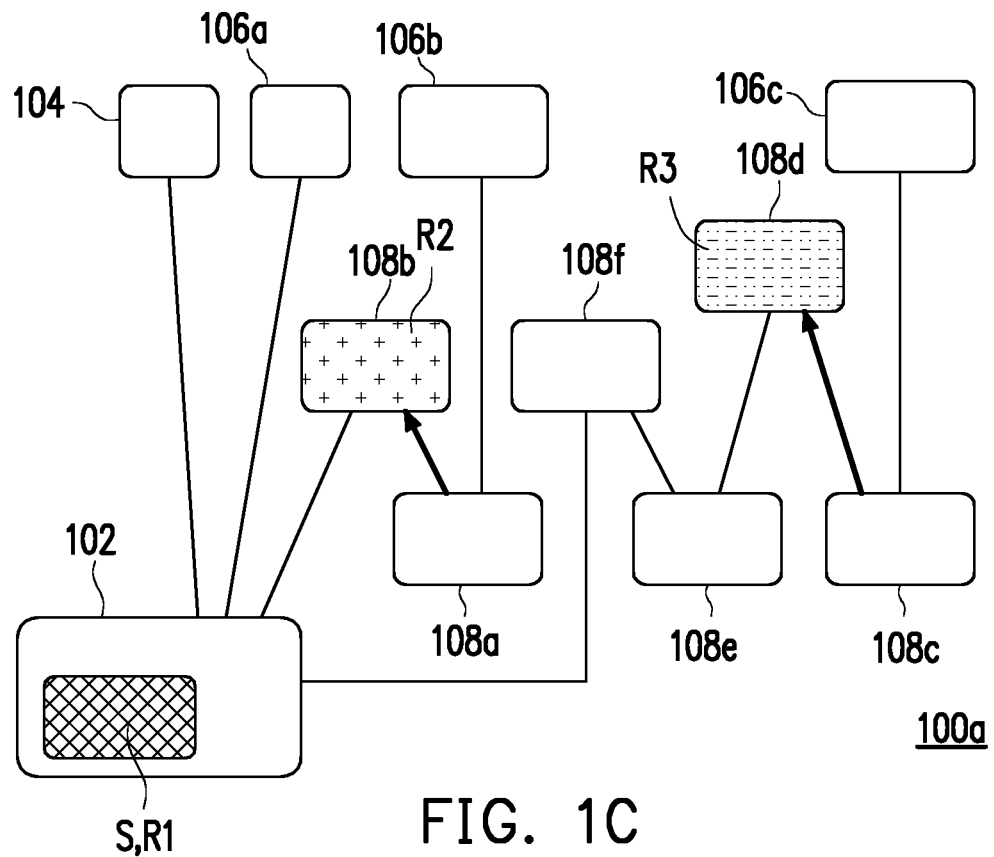

Referring to FIG. 1C, when the detection cartridge 100a is set to be located at a second angle of rotation (e.g., −60 degrees) and a centrifugal force is applied to the sample S and the reagents R1 to R3, the sample S and the reagent R1 remain in the detection tank 102, the reagent R2 flows into the first temporary tank 108b, and the reagent R3 flows into the first temporary tank 108d. During centrifugation, the liquid in the detection tank 102 does not flow out of the detection tank 102 via the pathway due to the design of the pathway layout with the angle of rotation setting, but the liquid is oscillated, thereby facilitating the mixing of the sample S and the reagent R1 in the detection tank 102 and accelerating the reaction.

Figure 1D:
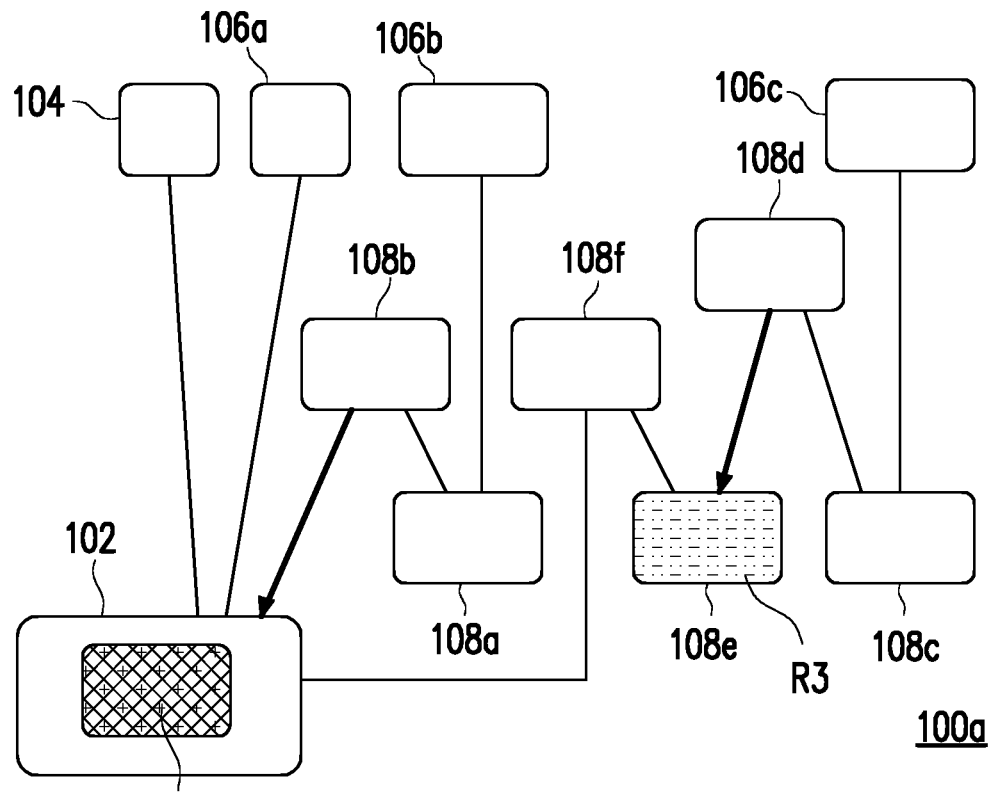

Referring to FIG. 1D, when the detection cartridge 100a is set to be located at the first angle of rotation (e.g., 0 degrees) and a centrifugal force is applied to the sample S and the reagents R1 to R3, the sample S and the reagent R1 remain in the detection tank 102, the reagent R2 flows into the detection tank 102, and the reagent R3 flows into the first temporary tank 108e. In this step, the reagent R2 flowing into the detection tank 102 may participate in the reaction in the detection tank 102.

Figure 1E:
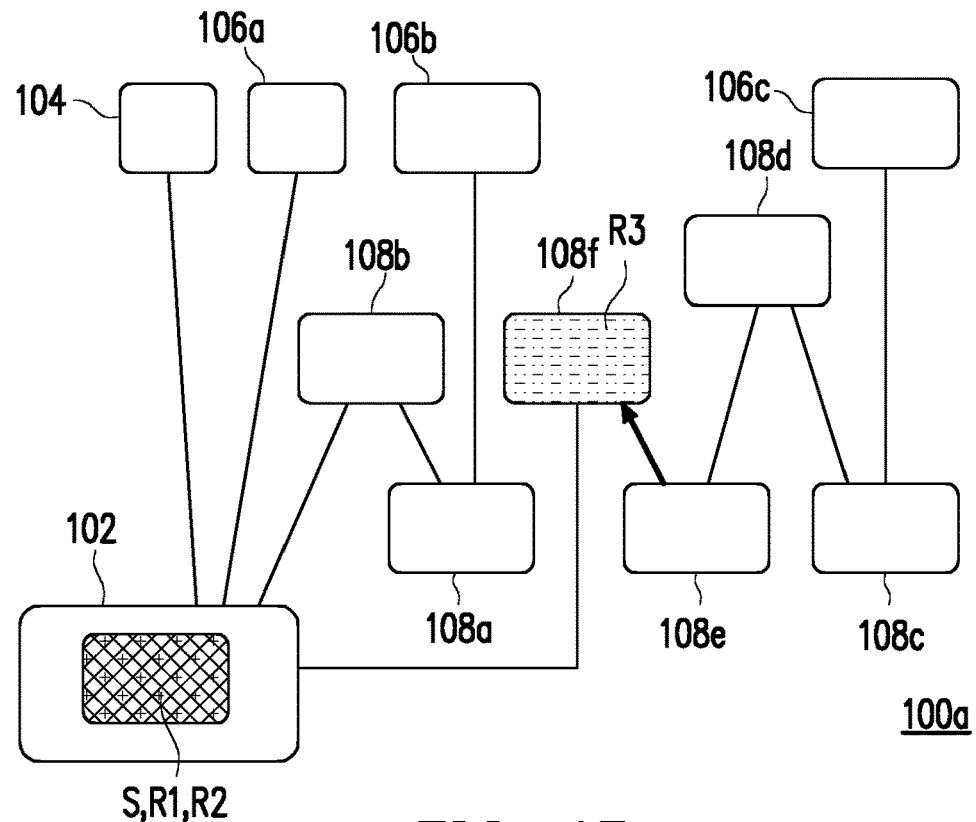

Referring to FIG. 1E, when the detection cartridge 100a is set to be located at the second angle of rotation (e.g., −60 degrees) and a centrifugal force is applied to the sample S and the reagents R1 to R3, the sample S and the reagents R1 and R2 remain in the detection tank 102, and the reagent R3 flows into the first temporary tank 108f. In this step, the centrifugal force may oscillate the liquid in the detection tank 102 to facilitate the reaction.

Figure 1F:
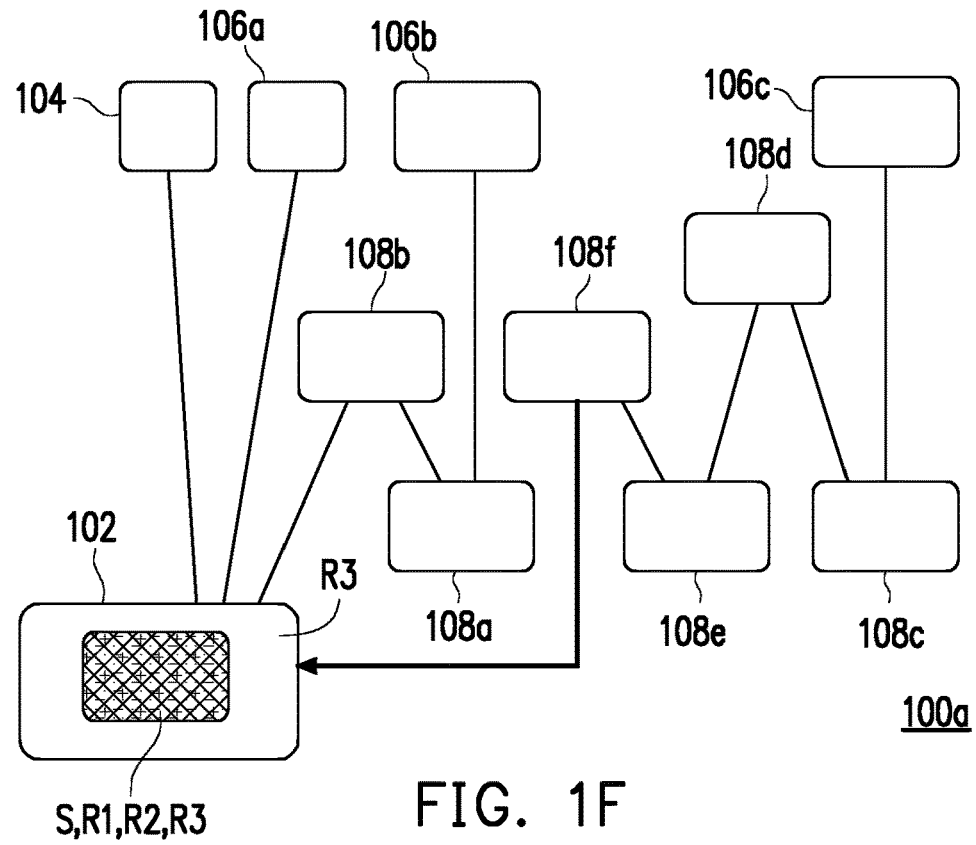

Referring to FIG. 1F, when the detection cartridge 100a is set to be located at the first angle of rotation (e.g., 0 degrees) and a centrifugal force is applied to the sample S and the reagents R1 to R3, the sample S and the reagents R1 and R2 remain in the detection tank 102, and the reagent R3 flows into the detection tank 102. In this step, the reagent R3 flowing into the detection tank 102 may participate in the reaction in the detection tank 102 to form a test object.

Next, the test object contained in the liquid in the detection tank 102 is detected to obtain a detection result. Those skilled in the art may select the measurement method of the test object according to the experimental design, which is not described herein.

As may be seen from the above, the detection method of the present embodiment includes the following steps. The detection cartridge 100a is mounted on the turntable 18 of the platform 16 of the centrifuge device 12, wherein the platform 16 is connected to the driving unit 14 of the centrifuge device 12 and has the axis of rotation O1. The sample S is placed in the sample tank 104, and the reagents R1 to R3 are respectively placed in the containers 106a to 106c, and the relative positions of the sample S and the reagents R1 to R3 on the detection cartridge 100a with respect to the axis of rotation O1 are changed by controlling the rotating speed and the rotating direction of the axis of rotation O1, and a centrifugal force is applied to the sample S and the reagents R1 to R3. The sample S is introduced into the detection tank 102, and the reagents R1 to R3 are respectively sequentially introduced into the detection tank 102 via the first flow path, the second flow path, and the third flow path. The liquid in the detection tank 102 is detected.

In addition, in the step of sequentially introducing the reagents R1 to R3 into the detection tank 102 via the first flow path to the third flow path, the rotating speed of the axis of rotation O1 (for example, increasing from 2000 rpm to 4000 rpm) and the rotating direction (e.g., clockwise rotation to counterclockwise rotation) may be controlled to change the relative position of any position on the detection cartridge 100a with respect to the axis of rotation O1. In this way, the detection process of the detection cartridge 100a may be executed by presetting the rotating speed, the rotating direction, and the rotation time of the centrifuge device 12, thereby achieving the object of automatic detection.

In the detection cartridge 100a, the detection method, and the detection device of the above embodiments, the quantity of the temporary tanks on the third flow path of the detection cartridge 100a is set to be greater than the quantity of temporary tanks of the second flow path, and the quantity of the temporary tanks on the second flow path is set to be greater than the quantity of the temporary tanks on the first flow path, so that the reagents R1 to R3 flow into the detection tank 102 sequentially via three flow paths. Therefore, the detection cartridge 100a and the detection method of the above embodiments may execute multi-stage reaction detection, simplify the complicated operation flow of the detection machine, reduce the human error, and improve the convenience of detection.

In the following, different detection cartridges and corresponding detection methods and detection devices are described in different embodiments. In the embodiments below, the reference numerals and contents of the above embodiments are adopted. In particular, the same reference numerals are used to represent the same or similar components, and description of the same technical content is omitted. The omitted portions are as described in the embodiments above and are not repeated in the embodiments below.

FIG. 3A to FIG. 3F are flowcharts of a detection method of another embodiment of the invention.

Figure 3A:
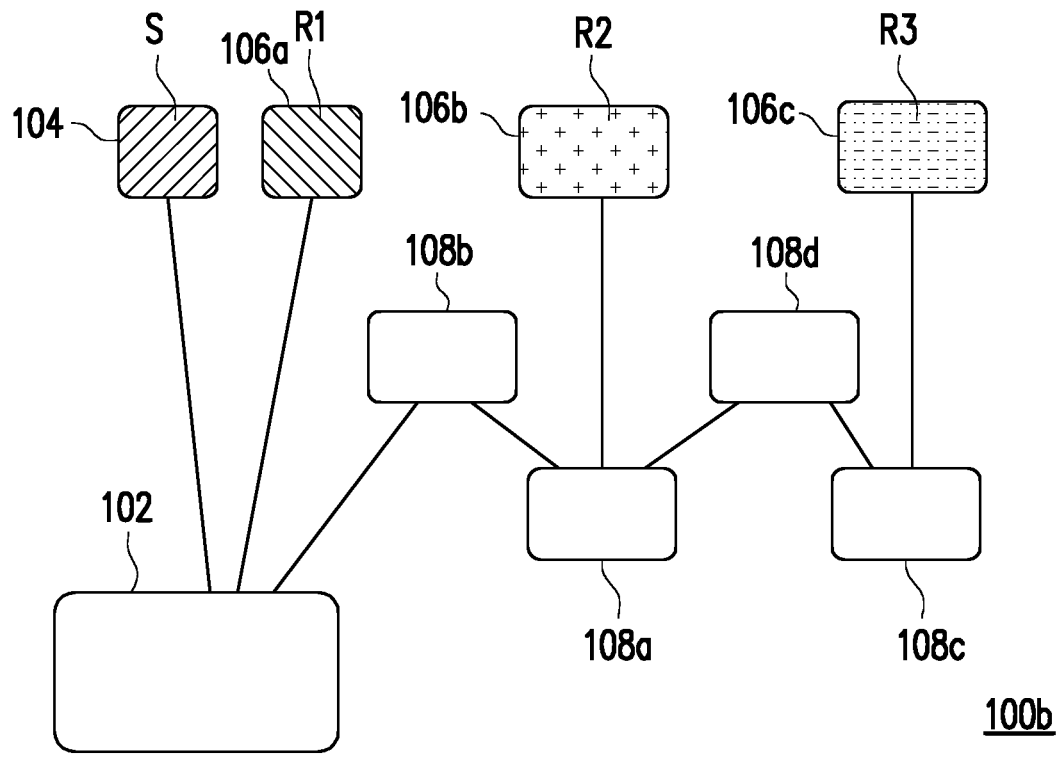
FIG. 3A to FIG. 3F are flowcharts of a detection method of another embodiment of the invention.
Figure 3B:
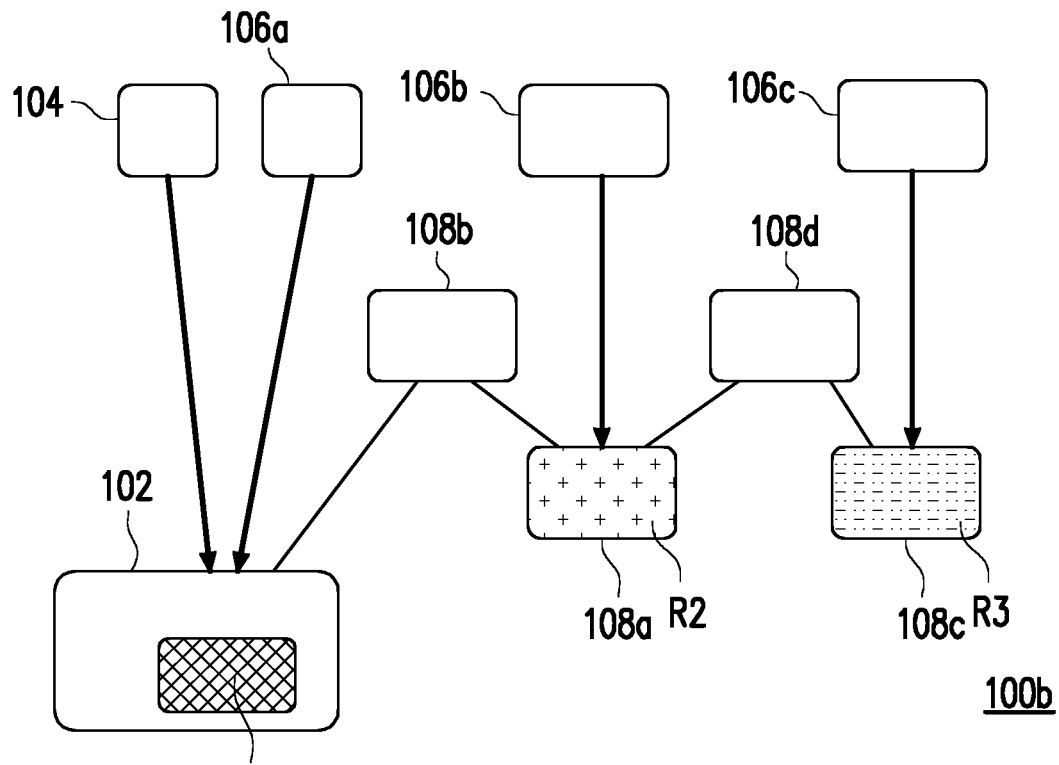
Figure 3C:
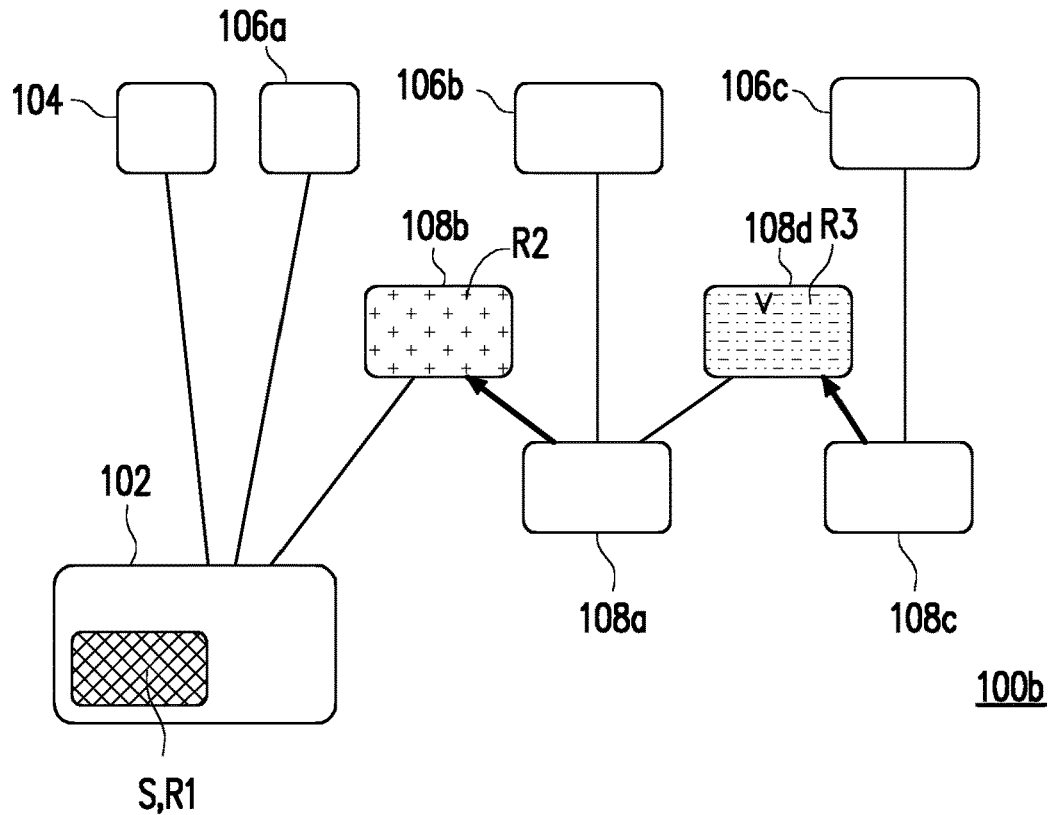
Figure 3D:
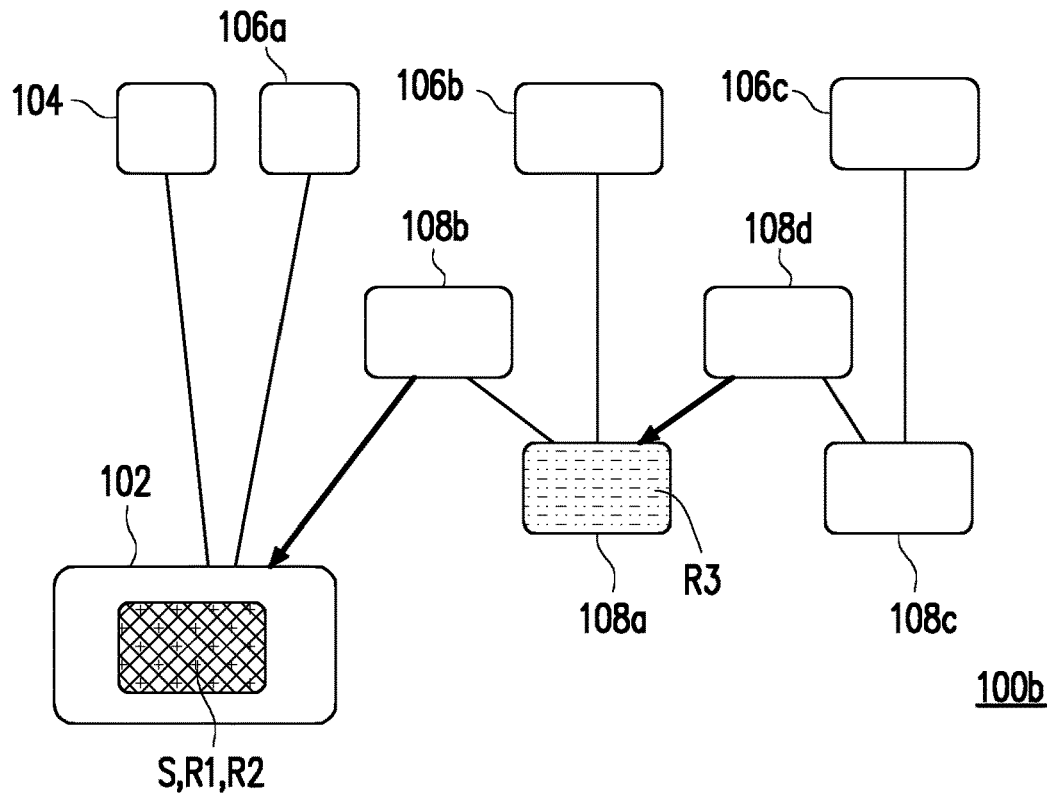
Figure 3E:
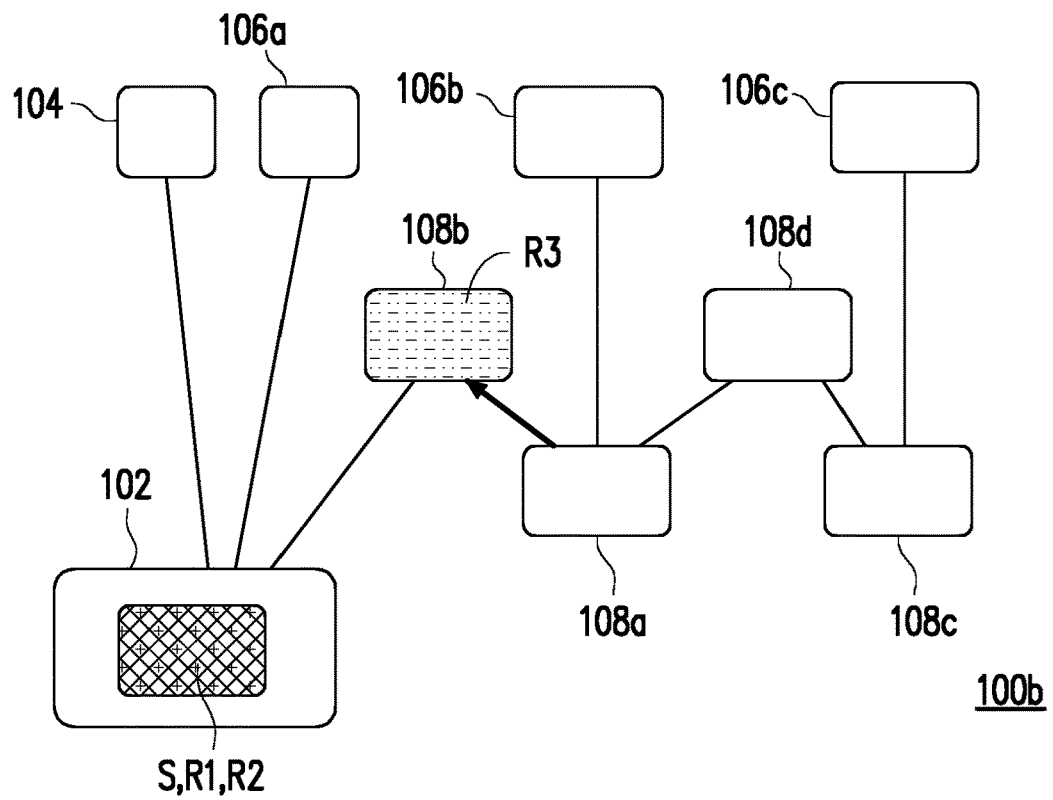
Figure 3F:
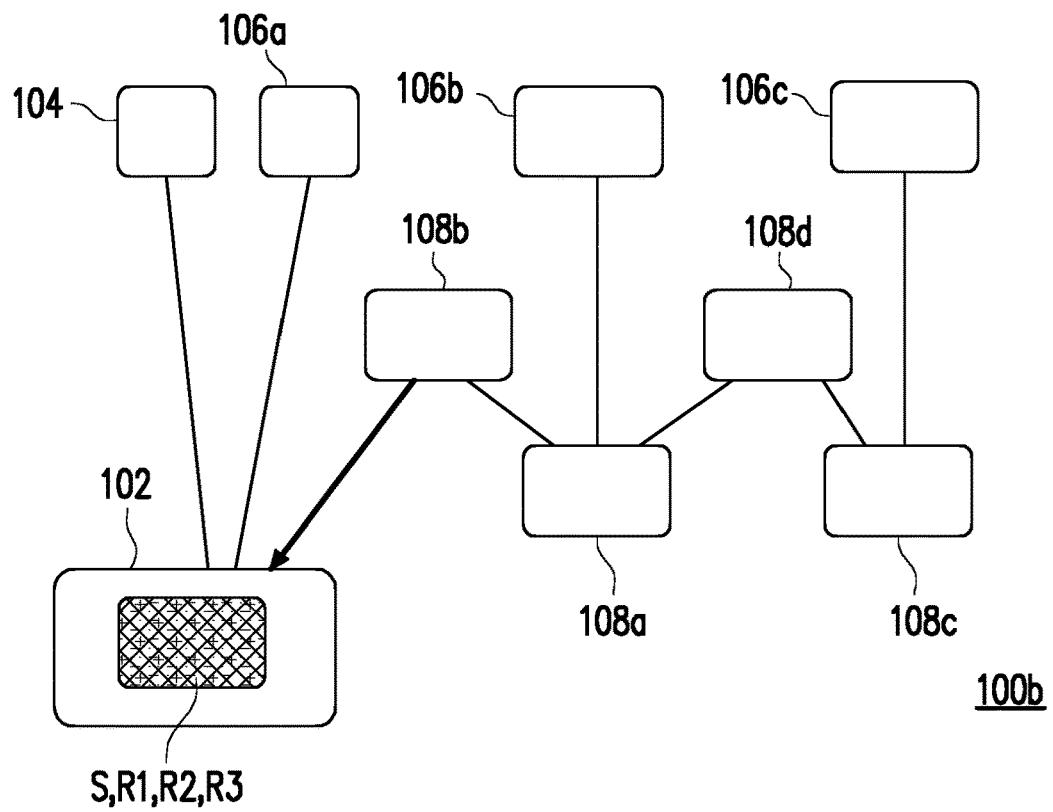

Referring to FIG. 1A and FIG. 3A simultaneously, the differences between a detection cartridge 100b of FIG. 3A and the detection cartridge 100a of FIG. 1A are as follows. The detection cartridge 100b does not have the first temporary tanks 108e and 108f in the detection cartridge 100a, and the second flow path and the third flow path of the detection cartridge 100b may have a shared path. In detail, the first temporary tank 108d of the detection cartridge 100b is in communication with the first temporary tank 108a, and the second flow path and the third flow path share the path from the first temporary tank 108a to the detection tank 102.

Hereinafter, the detection method using the above detection cartridge 100b is described with reference to FIG. 3A to FIG. 3F.

Referring to FIG. 1A to FIG. 1F and FIG. 3A to FIG. 3F simultaneously, when the detection cartridge 100b is used for detection, the angle of rotation set by the detection cartridge 100b is the same as that of the detection cartridge 100a. The differences between the detection method of FIG. 3A to FIG. 3F and the detection method of FIG. 1A to FIG. 1F are as follows. After the reagent R3 flows to the first temporary tank 108d (FIG. 3C), it first flows into the first temporary tank 108a (FIG. 3D), and then flows into the detection tank 102 (FIG. 3E to FIG. 3F) via the shared path of the second flow path and the third flow path (i.e., the path from the first temporary tank 108a to the detection tank 102).

In the detection cartridge 100b, the detection method, and the detection device of the above embodiments, since the second flow path and the third flow path of the detection cartridge 100b have a shared path, the quantity of the first temporary tanks required for the detection cartridge 100b may be reduced, thereby simplifying the complicatedity of the detection cartridge process.

FIG. 4A to FIG. 4F are flowcharts of a detection method of another embodiment of the invention.

Figure 4A:
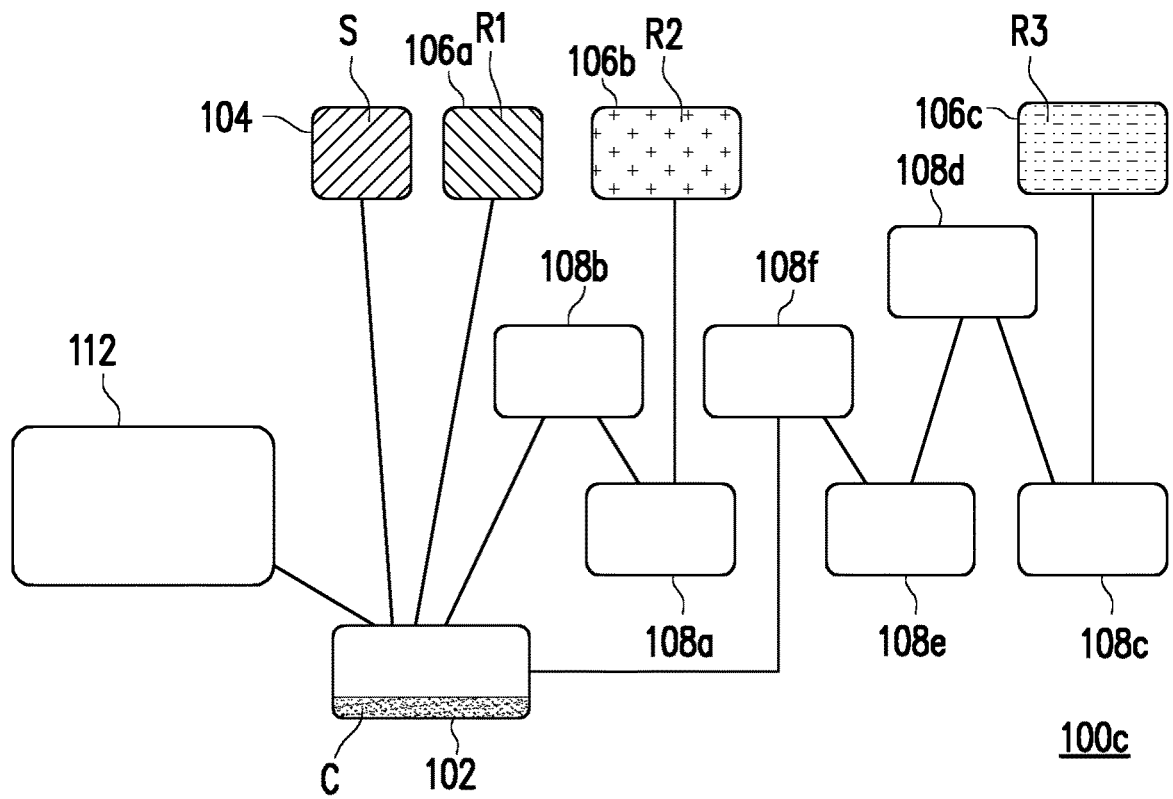
FIG. 4A to FIG. 4F are flowcharts of a detection method of another embodiment of the invention.

Referring to FIG. 1A and FIG. 4A simultaneously, the differences between a detection cartridge 100c of FIG. 4A and the detection cartridge 100a of FIG. 1A are as follows. The detection cartridge 100c further includes a waste tank 112 and a capture unit C. The waste tank 112 of the detection cartridge 100c is in communication with the detection tank 102 and is not located on the pathway in which the first flow path, the second flow path, the third flow path, and the sample tank 104 are in communication with the detection tank 102. The capture unit C of the detection cartridge 100c may be connected to the inner wall (e.g., the bottom surface) of the detection tank 102, but the invention is not limited thereto. The capture unit C is, for example, a compound, an antigen, an antibody, a magnetic bead, a ligand, or a combination thereof. Those skilled in the art may determine the composition of the capture unit C based on the sample type and the detection item.

Hereinafter, the detection method using the above detection cartridge 100c is described with reference to FIG. 4A to FIG. 4F.

Referring to FIG. 4A, the detection cartridge 100c is provided. The sample S is placed in the sample tank 104, and the reagents R1 to R3 are respectively placed in the containers 106a to 106c.

Figure 4B:
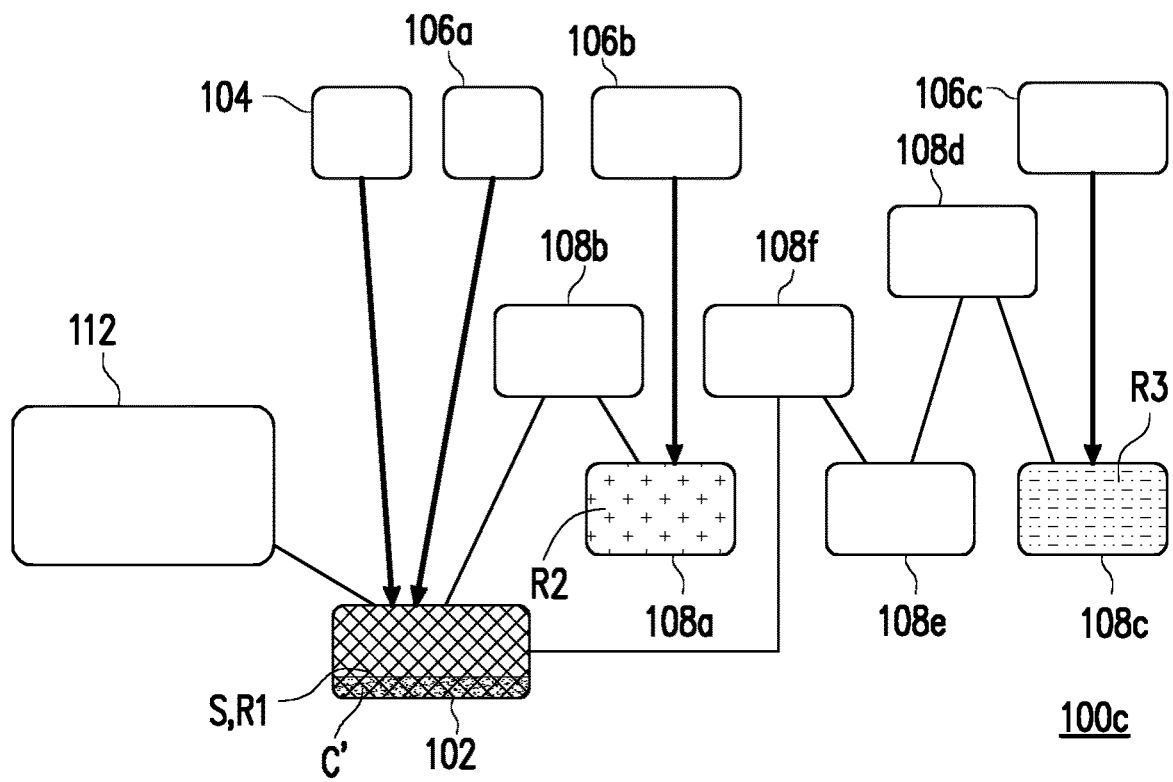

Referring to FIG. 4B, when the detection cartridge 100c is set to be located at the first angle of rotation (e.g., 0 degrees) and a centrifugal force is applied to the sample S and the reagents R1 to R3, the sample S flows into the detection tank 102, the reagent R1 flows into the detection tank 102, the reagent R2 flows into the first temporary tank 108a, and the reagent R3 flows into the first temporary tank 108c. At this time, the sample S and the reagent R1 flowing into the detection tank 102 may interact with the capture unit C to form a capture unit complicated C' connected to the detection tank 102. The capture unit complicated C' may be formed by all of the sample S, the reagent R1, and the capture unit C, or the compound from the reaction of the sample S and the reagent R1 is combined with the capture unit C. Of course, it is also possible to modify the structure of the capture unit C with the compound from the reaction of the sample S and the reagent R1. Those skilled in the art may know the composition of the capture unit complicated C' according to the detection items used and the composition of the reagents, and the invention is not limited thereto. In addition, the manner of mounting the detection cartridge 100c on the centrifuge device is provided in the foregoing embodiments and is not repeated herein.

Figure 4C:
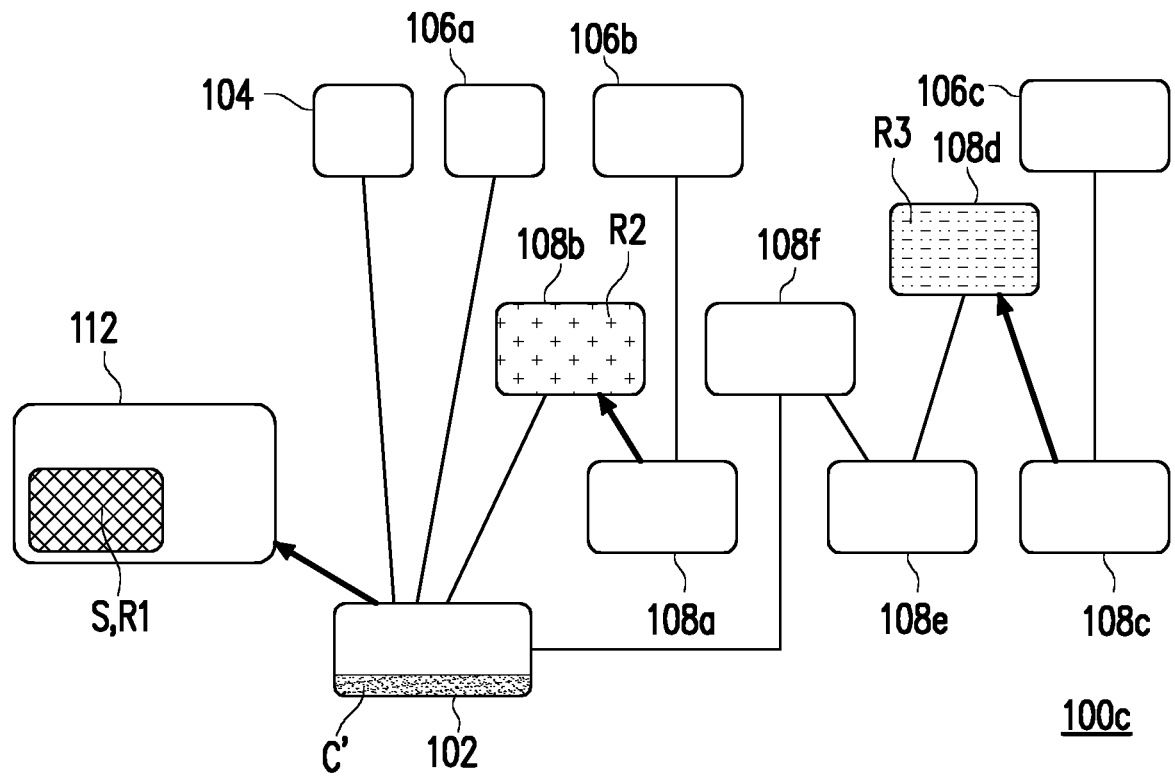

Referring to FIG. 4C, when the detection cartridge 100c is set to be located at a second angle of rotation (e.g., −60 degrees) and a centrifugal force is applied to the sample S and the reagents R1 to R3, the sample S and the reagent R1 flow into the waste tank 112, the reagent R2 flows into the first temporary tank 108b, and the reagent R3 flows into the first temporary tank 108d. In this step, the liquid is removed from the detection tank 102, which prevents the subsequent reaction of the capture unit complicated C' in the detection tank 102 from being disturbed.

Figure 4D:
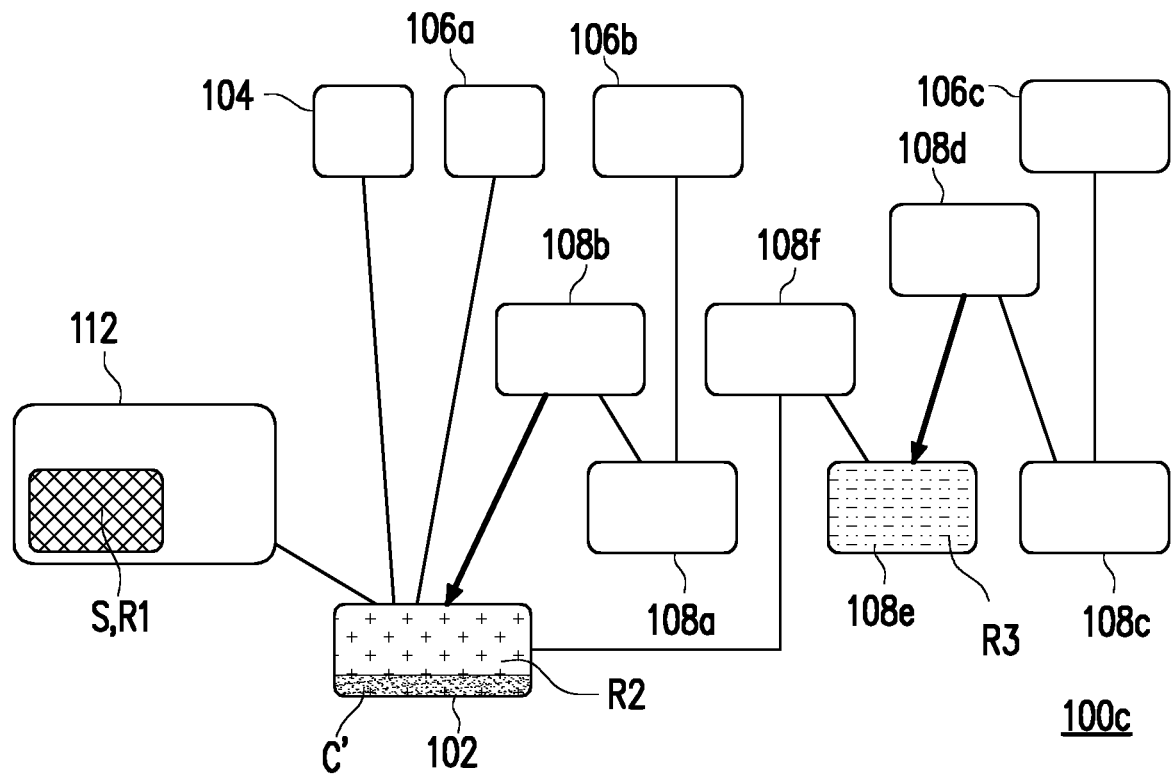

Referring to FIG. 4D, when the detection cartridge 100c is set to be located at the first angle of rotation (e.g., 0 degrees) and a centrifugal force is applied to the sample S and the reagents R1 to R3, the sample S and the reagent R1 remain in the waste tank 112, the reagent R2 flows into the detection tank 102, and the reagent R3 flows into the first temporary tank 108e. In an embodiment, the reagent R2 flowing into the detection tank 102 may react with the capture unit complicated C'. In another embodiment, the reagent R2 may be a cleaning solution or buffer that does not react with the capture unit complicated C'. During centrifugation, the liquid in the waste tank 112 does not flow out of the waste tank 112 via the pathway due to the design of the pathway layout with the angle of rotation setting.

Figure 4E:
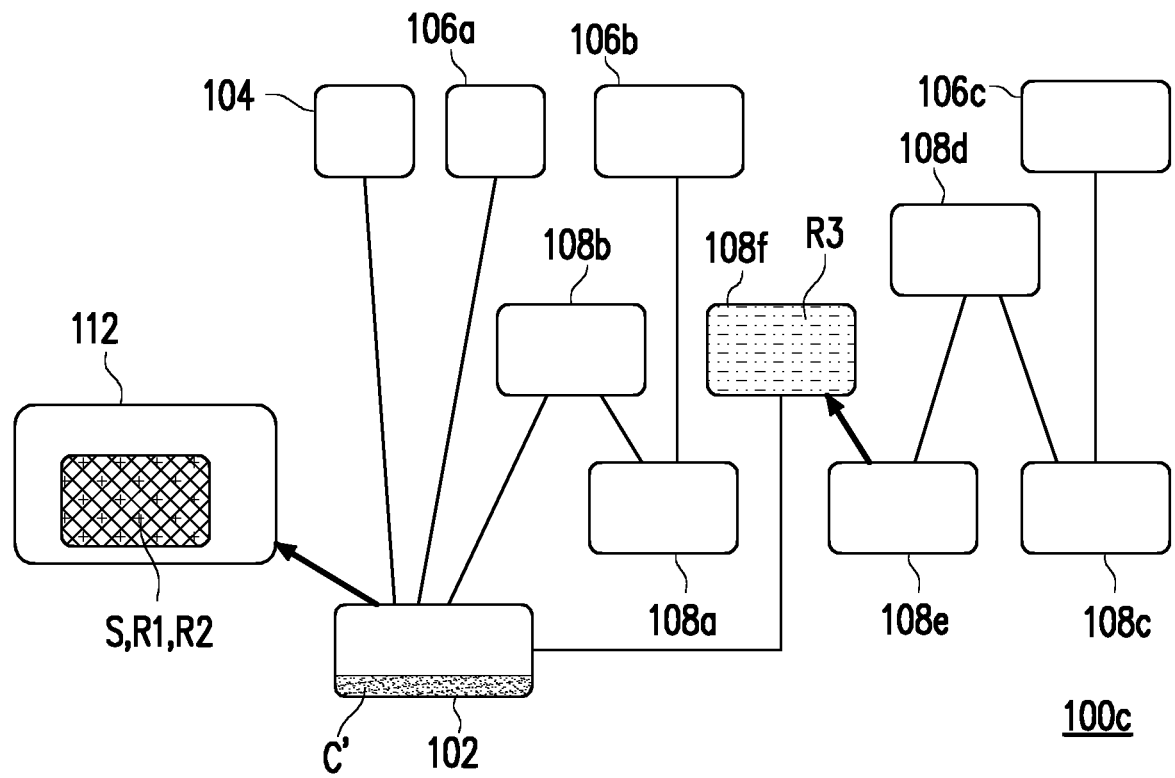

Referring to FIG. 4E, when the detection cartridge 100c is set to be located at the second angle of rotation (e.g., −60 degrees) and a centrifugal force is applied to the sample S and the reagents R1 to R3, the sample S and the reagent R1 remain in the waste tank 112, the reagent R2 flows into the waste tank 112, and the reagent R3 flows into the first temporary tank 108f. In this step, the liquid is removed from the detection tank 102, which prevents the subsequent reaction of the capture unit complicated C' in the detection tank 102 from being disturbed.

Figure 4F:
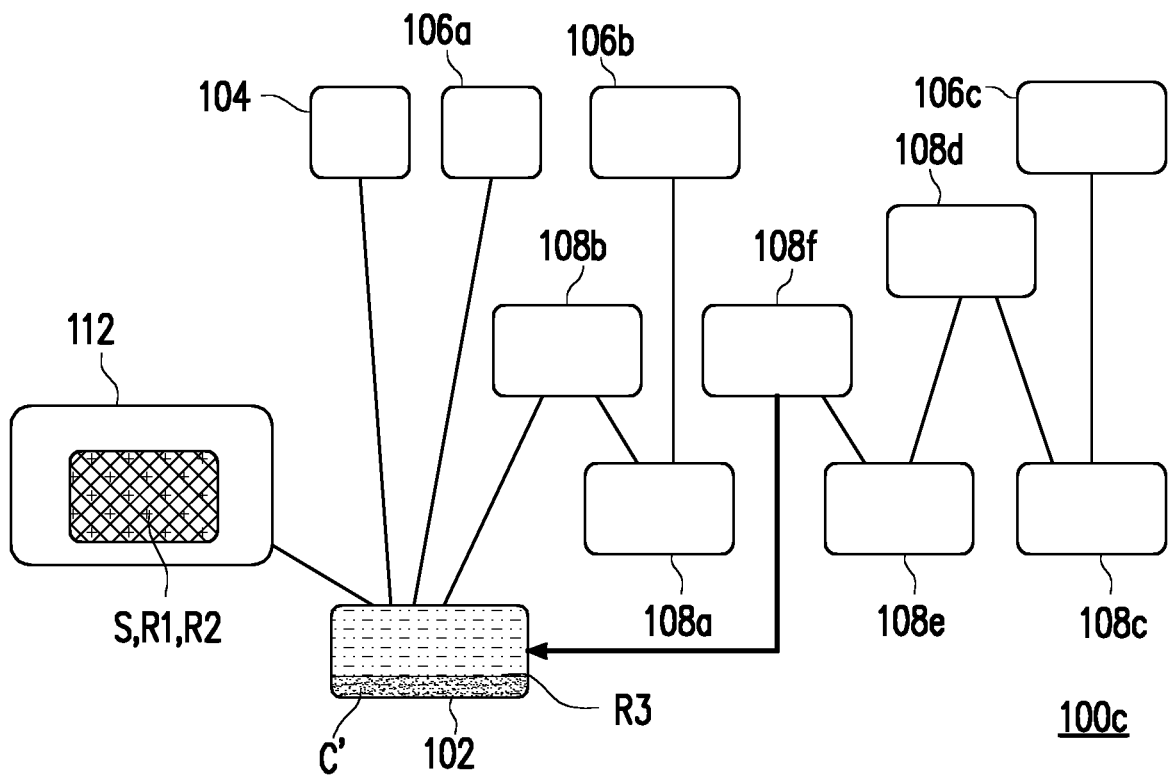

Referring to FIG. 4F, when the detection cartridge 100c is set to be located at the first angle of rotation (e.g., 0 degrees) and a centrifugal force is applied to the sample S and the reagents R1 to R3, the sample S and the reagents R1 and R2 remain in the waste tank 112, and the reagent R3 flows into the detection tank 102. In this step, the reagent R3 flowing into the detection tank 102 may react with the capture unit complicated C' in the detection tank 102 to form a test object. In the present embodiment, the test object may be the product from the reaction of the reagent R3 and the capture unit complicated C', resulting in a change in the color of the reagent R3. In another embodiment, the test object is a capture unit test object (not shown) from the modification of the structure of the capture unit complicated C' by the reagent R3. In another embodiment, the reagent R3 may separate the capture unit complicated C' from the detection tank 102 to disperse the capture unit complicated C' in the reagent R3, thereby increasing liquid turbidity in the detection tank 102. Those skilled in the art may know the composition of the test object according to the detection items and the composition of the reagents, and the invention is not limited thereto.

Next, the test object contained in the detection tank 102 is detected to obtain a detection result. For example, the absorbance of the liquid in the detection tank 102 at a particular wavelength or the transmittance of the liquid in the detection tank 102 at this point may be detected. Those skilled in the art may select an appropriate detection method according to the nature of the test object, and the invention is not limited thereto.

It may be seen from the above that the step of the reagents R1 to R3 flowing into the detection tank 102 via the first flow path, the second flow path, and the third flow path respectively may include the following steps. The reagent R1 in the first flow path flows into the detection tank 102, so that the reagent R1 in the detection tank 102 flows into the waste tank 112, and the reagent R2 of the second flow path flows into the detection tank 112, so that the reagent R2 in the detection tank 102 flows into the waste tank 112, and then the reagent R3 of the third flow path flows into the detection tank 112.

In the detection cartridge 100c, the detection method, and the detection device of the above embodiments, since the detection cartridge 100c includes the waste tank 112 for storing waste liquid, the interaction between the reagents may be prevented from interfering with the multi-stage reaction, thereby improving detection accuracy.

FIG. 5A to FIG. 5F are flowcharts of a detection method of another embodiment of the invention.

Figure 5A:
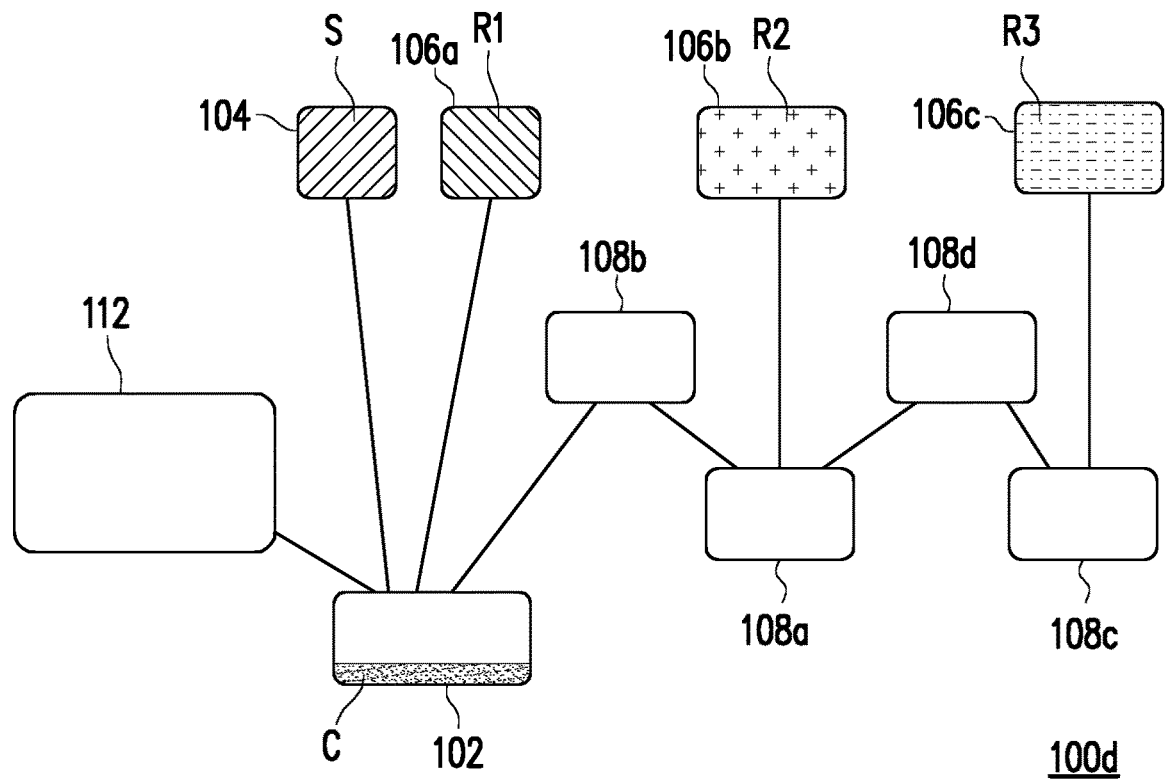
FIG. 5A to FIG. 5F are flowcharts of a detection method of another embodiment of the invention.
Figure 5B:
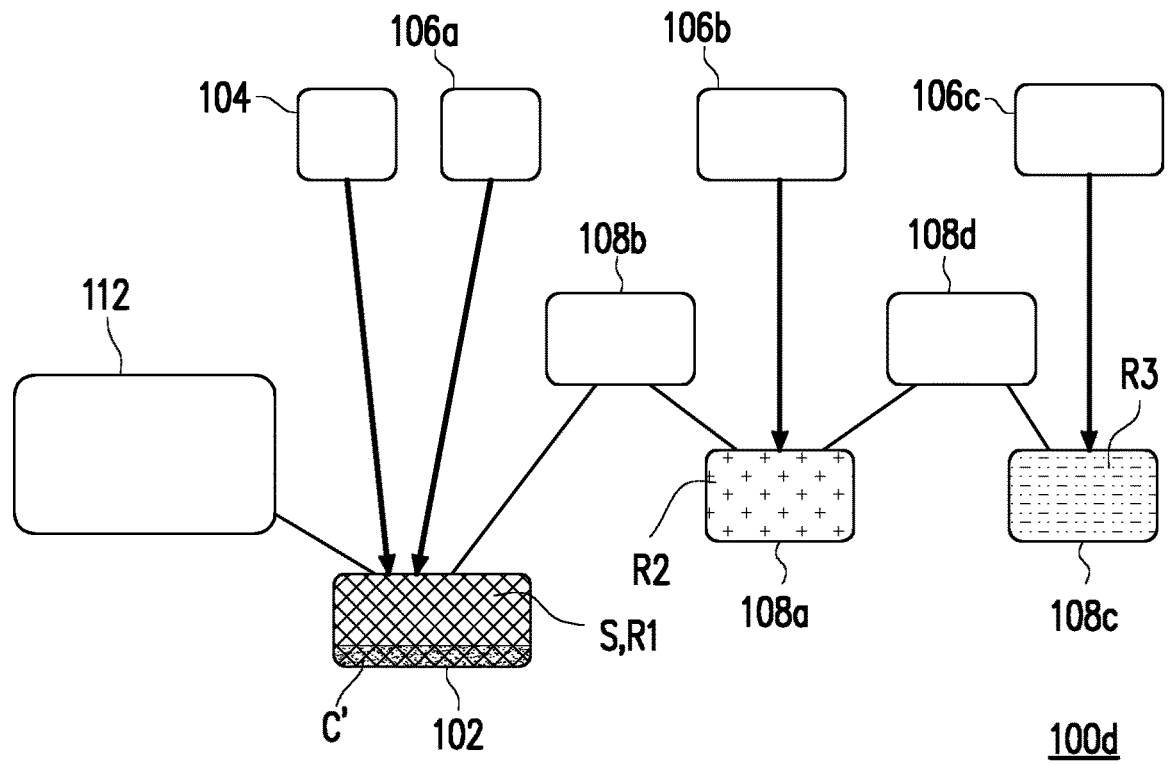
Figure 5C:
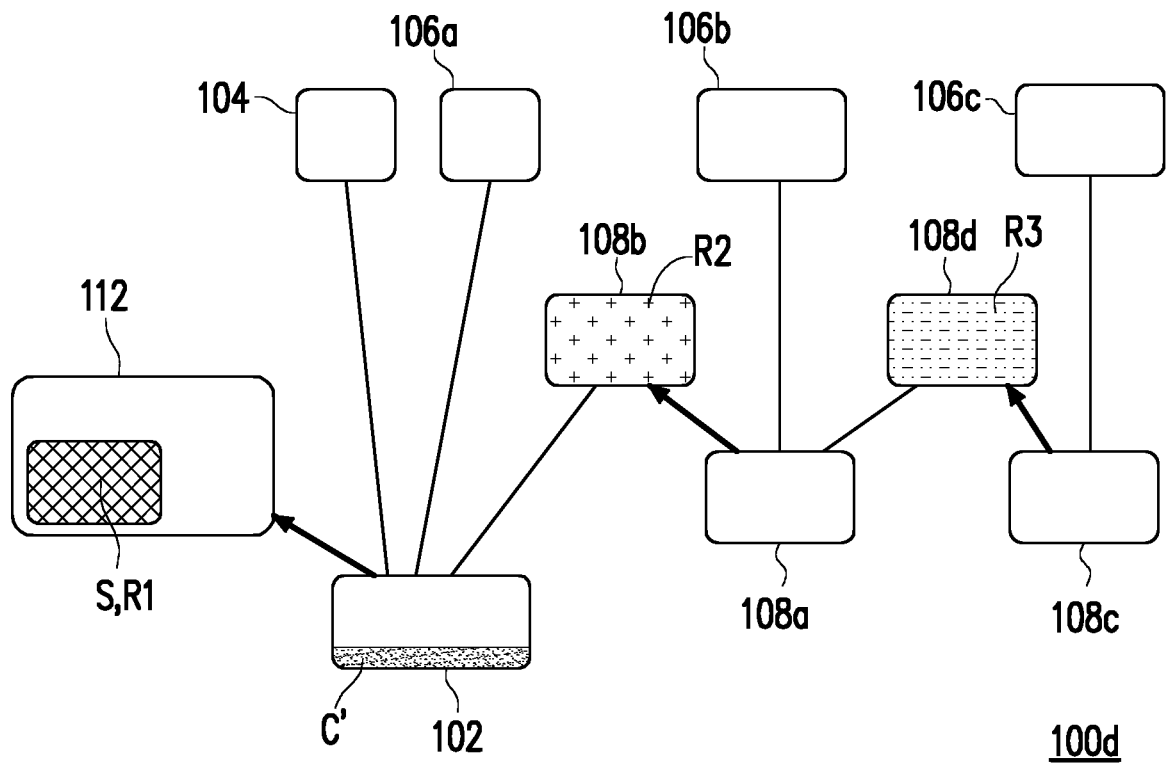
Figure 5D:
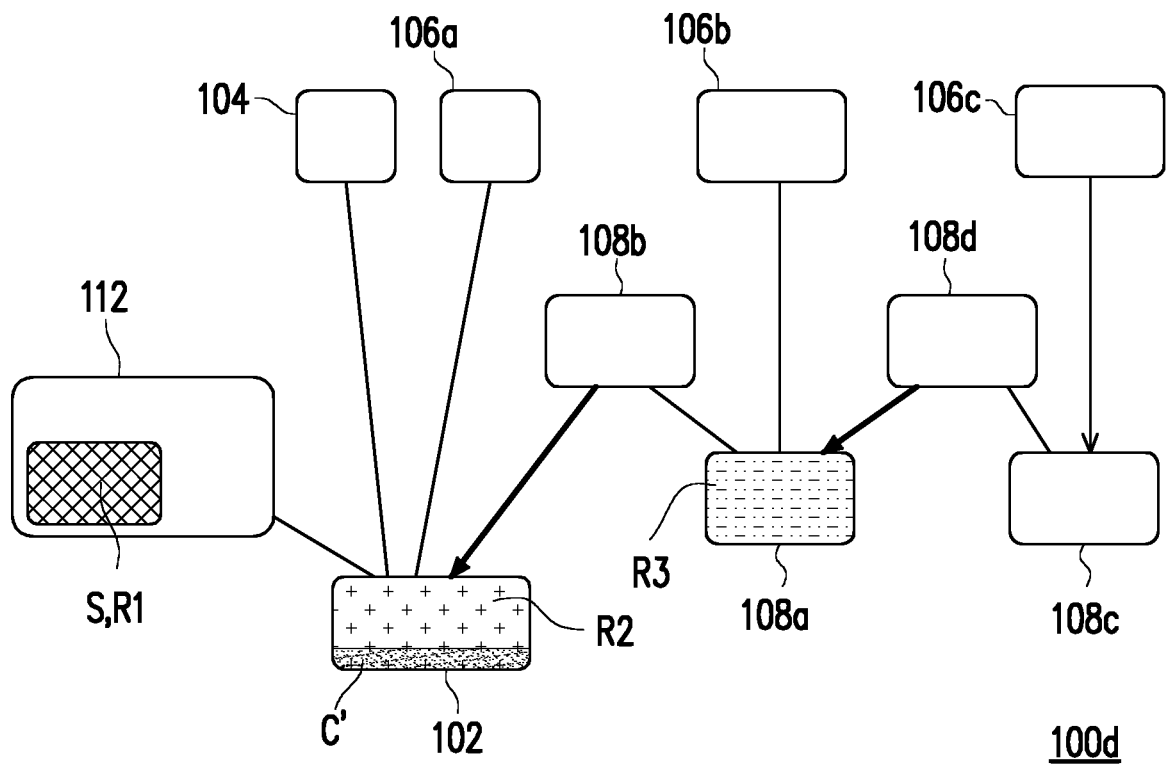
Figure 5E:
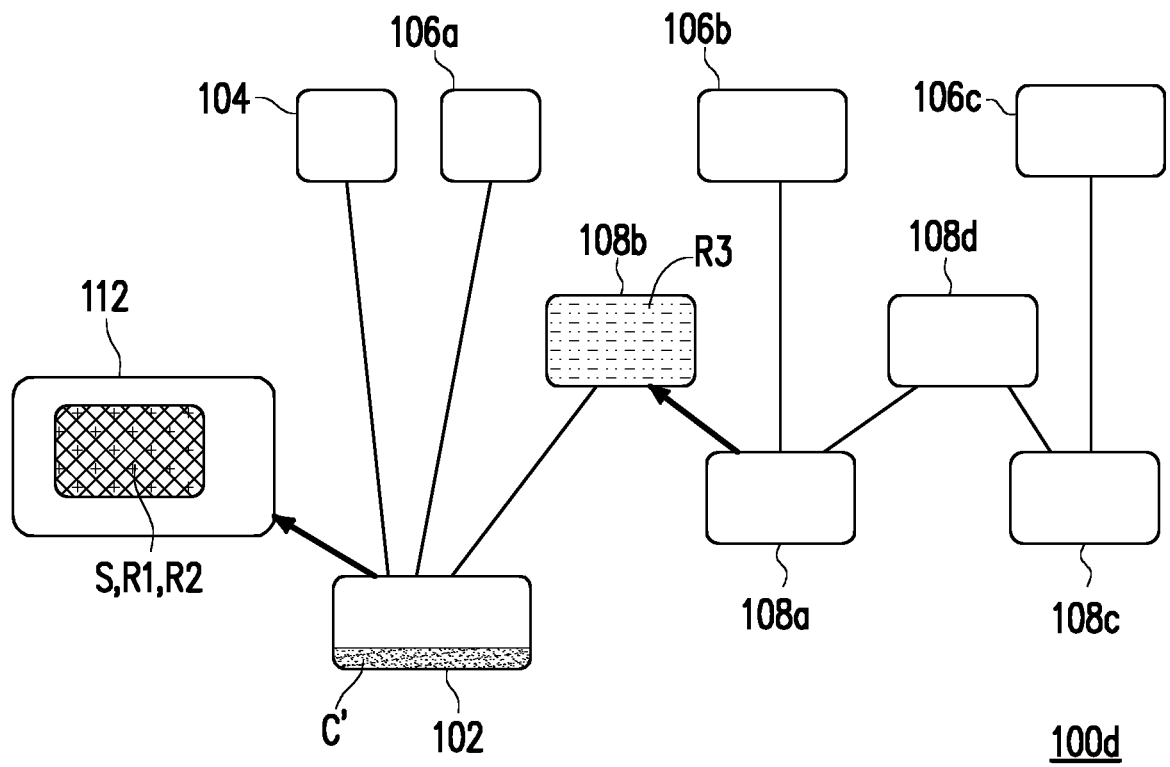
Figure 5F:
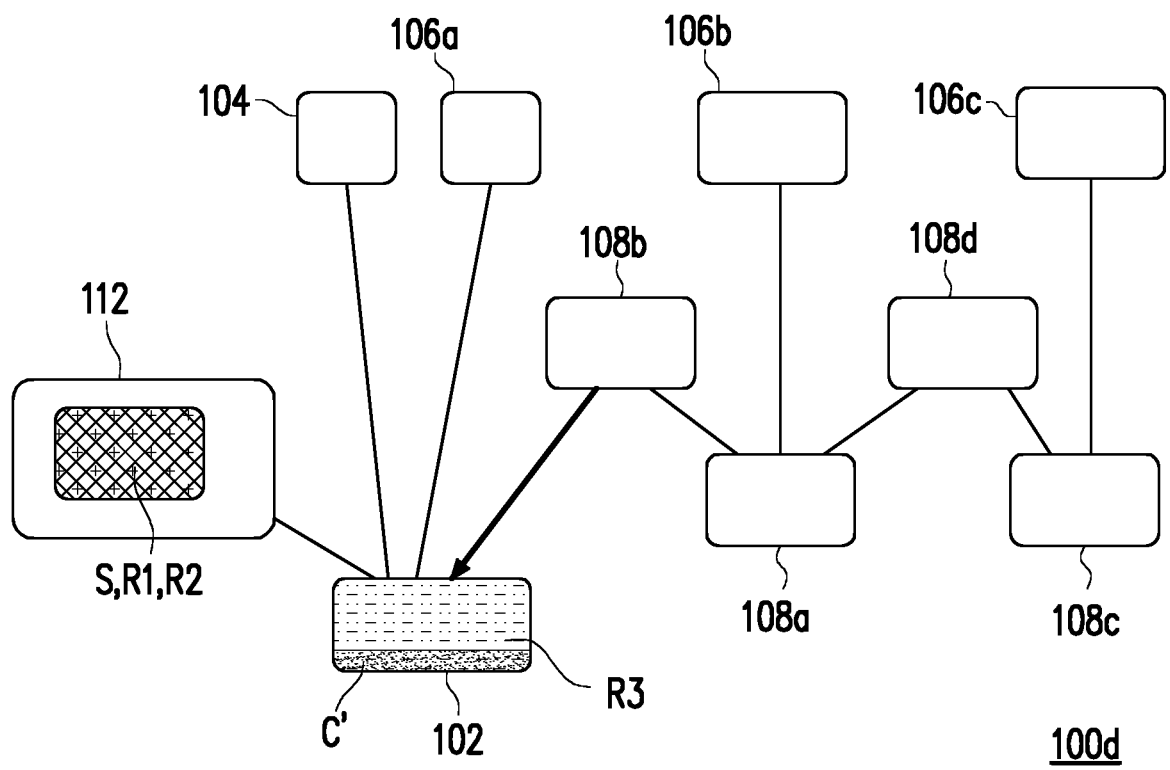

Referring to FIG. 4A and FIG. 5A simultaneously, the differences between a detection cartridge 100d of FIG. 5A and the detection cartridge 100c of FIG. 4A are as follows. The detection cartridge 100d does not have the first temporary tanks 108e and 108f in the detection cartridge 100c, and the second flow path and the third flow path of the detection cartridge 100d may have a shared path. In detail, the first temporary tank 108d of the detection cartridge 100d is in communication with the first temporary tank 108a, and the second flow path and the third flow path share the path from the first temporary tank 108a to the detection tank 102.

Hereinafter, the detection method using the above detection cartridge 100d is described with reference to FIG. 5A to FIG. 5F.

Referring to FIG. 4A to FIG. 4F and FIG. 5A to FIG. 5F simultaneously, when the detection cartridge 100d is used for detection, the angle of rotation at which the detection cartridge 100d is located is the same as that of the detection cartridge 100c. The differences between the detection method of FIG. 5A to FIG. 5F and the detection method of FIG. 4A to FIG. 4F are as follows. After the reagent R3 flows to the first temporary tank 108d (FIG. 5C), it first flows into the first temporary tank 108a (FIG. 5D), and then flows into the detection tank 102 (FIG. 5E to FIG. 5F) via the shared path of the second flow path and the third flow path (i.e., the path from the first temporary tank 108a to the detection tank 102).

In the detection cartridge 100d, the detection method, and the detection device of the above embodiments, since the second flow path and the third flow path of the detection cartridge 100d have a shared path, the quantity of the temporary tanks required for the detection cartridge 100d may be reduced, thereby simplifying the complicatedity of the detection cartridge process.

FIG. 6A to FIG. 6G are flowcharts of a detection method of another embodiment of the invention.

Figure 6A:
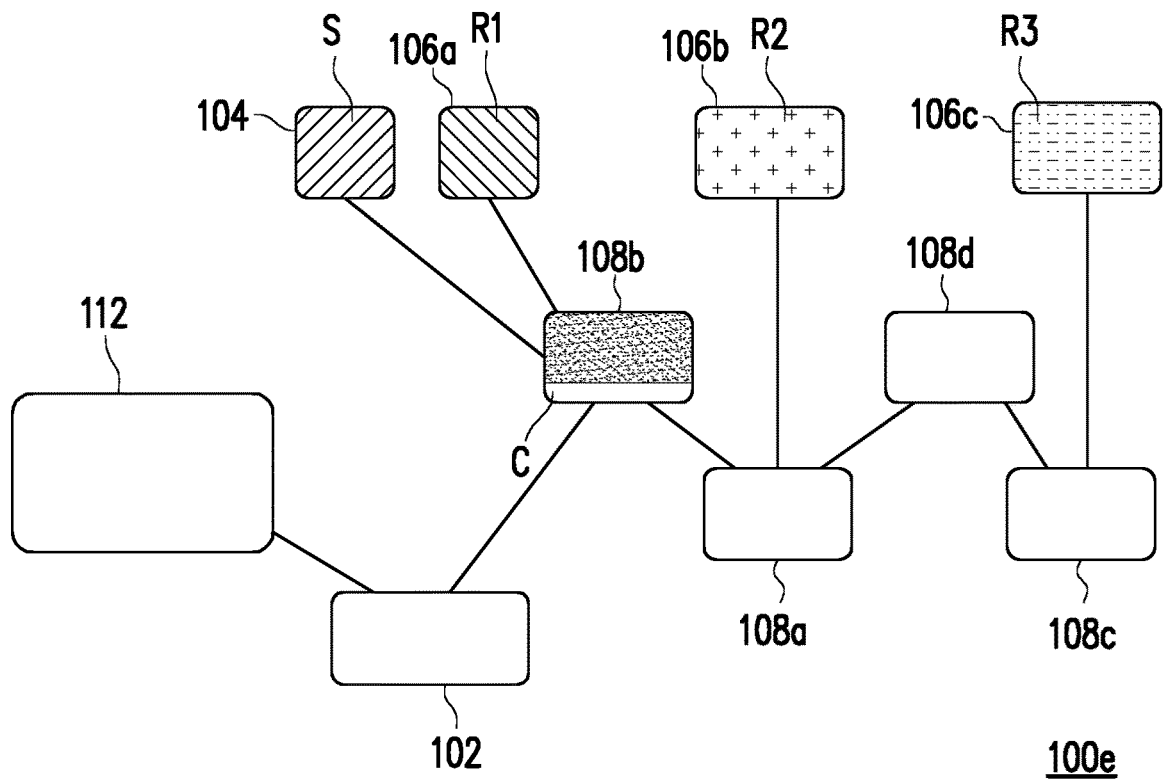
FIG. 6A to FIG. 6G are flowcharts of a detection method of another embodiment of the invention.

Referring to FIG. 5A and FIG. 6A simultaneously, the differences between a detection cartridge 100e of FIG. 6A and the detection cartridge 100d of FIG. 5A are as follows. In the detection cartridge 100e, the sample tank 104 and the container 106a are in communication with the first temporary tank 108b, and the first flow path, the second flow path, and the third flow path may have a shared path. In detail, the first temporary tank 108b of the detection cartridge 100e is in communication with the detection tank 102, and the first flow path, the second flow path, and the third flow path share the path from the first temporary tank 108b to the detection tank 102. Further, in the detection cartridge 100e, the capture unit C is connected to the inner wall (e.g., the bottom surface) of the first temporary tank 108b.

Hereinafter, the detection method using the above detection cartridge 100e is described with reference to FIG. 6A to FIG. 6G.

Referring to FIG. 6A, the detection cartridge 100e is provided. The sample S is placed in the sample tank 104, and the reagents R1 to R3 are respectively placed in the containers 106a to 106c.

Figure 6B:
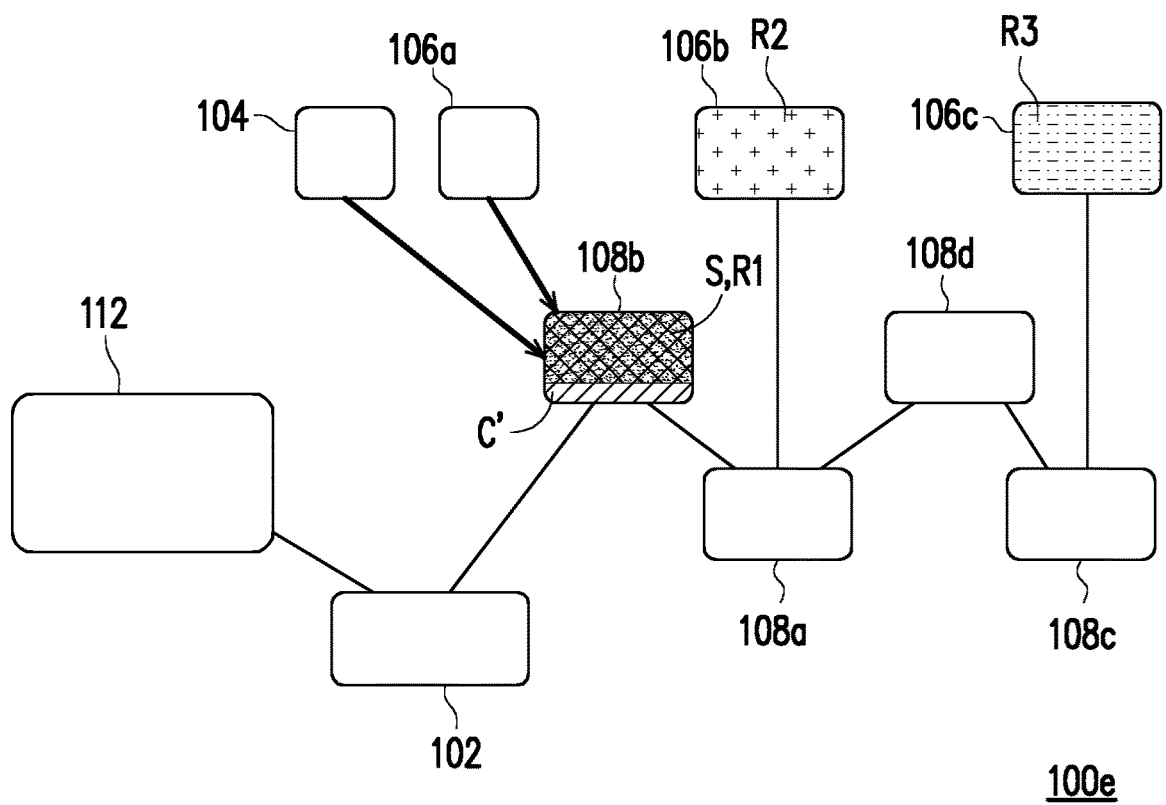
Figure 6C:
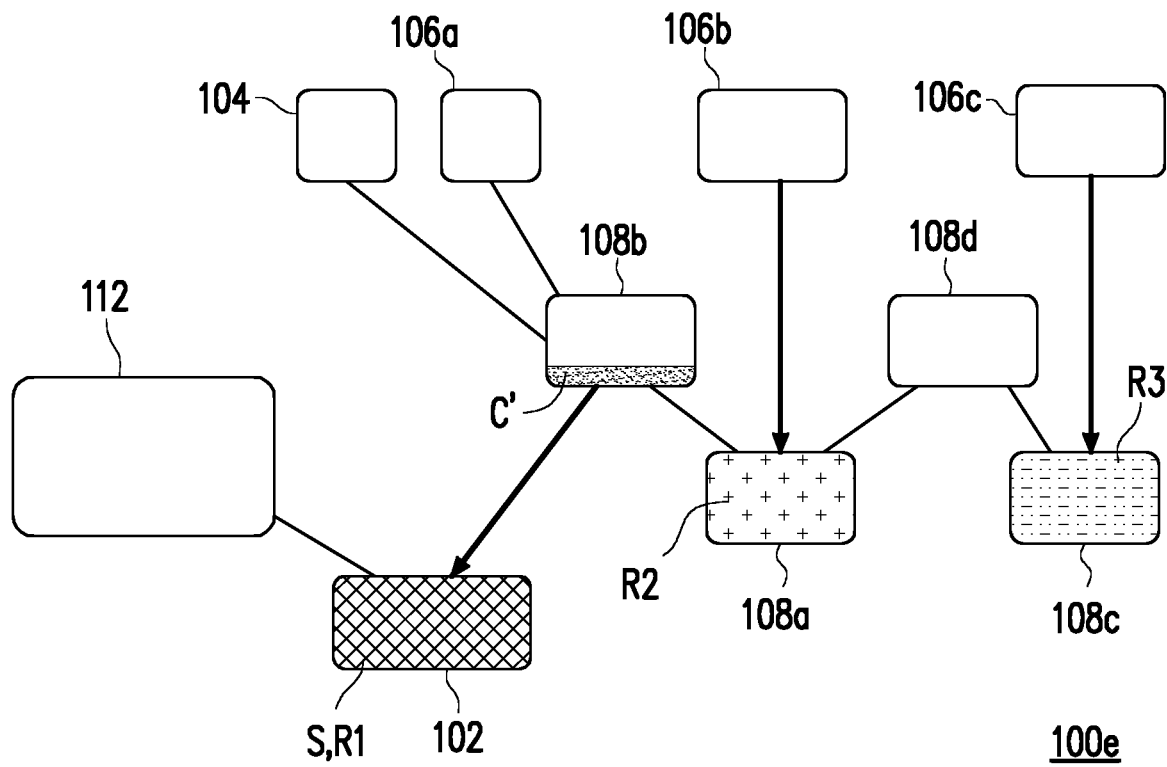
Figure 6D:
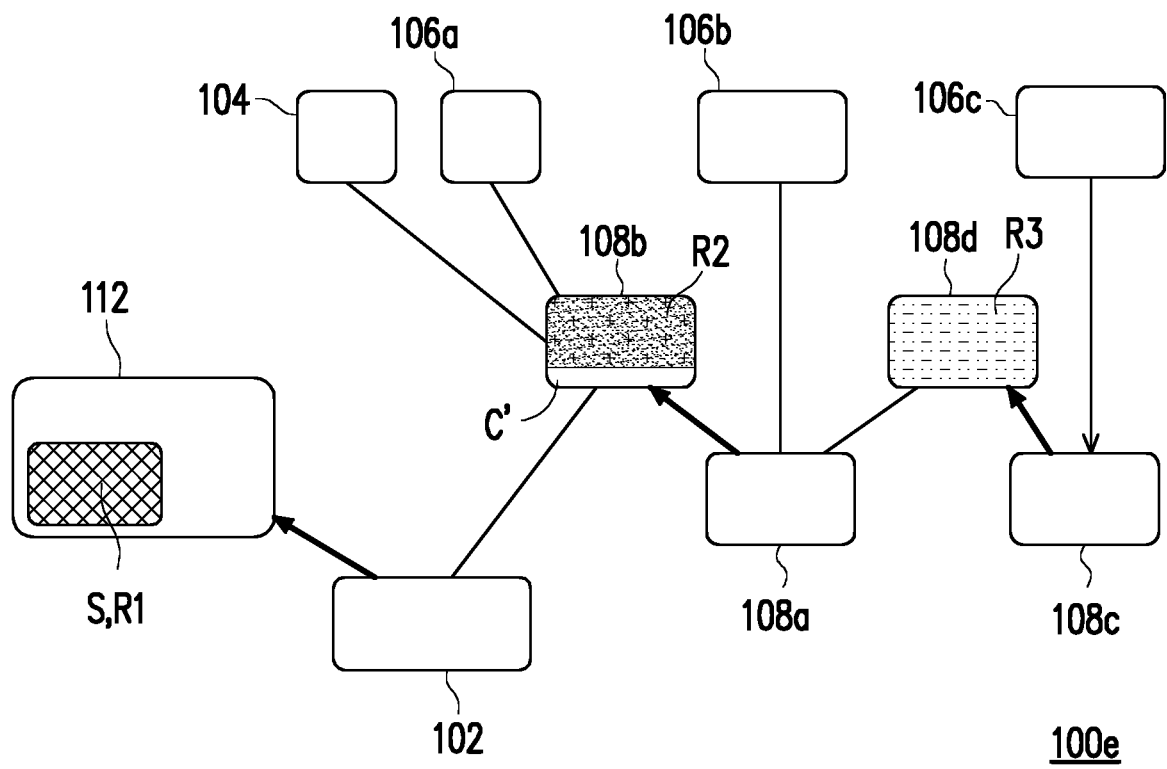
Figure 6E:
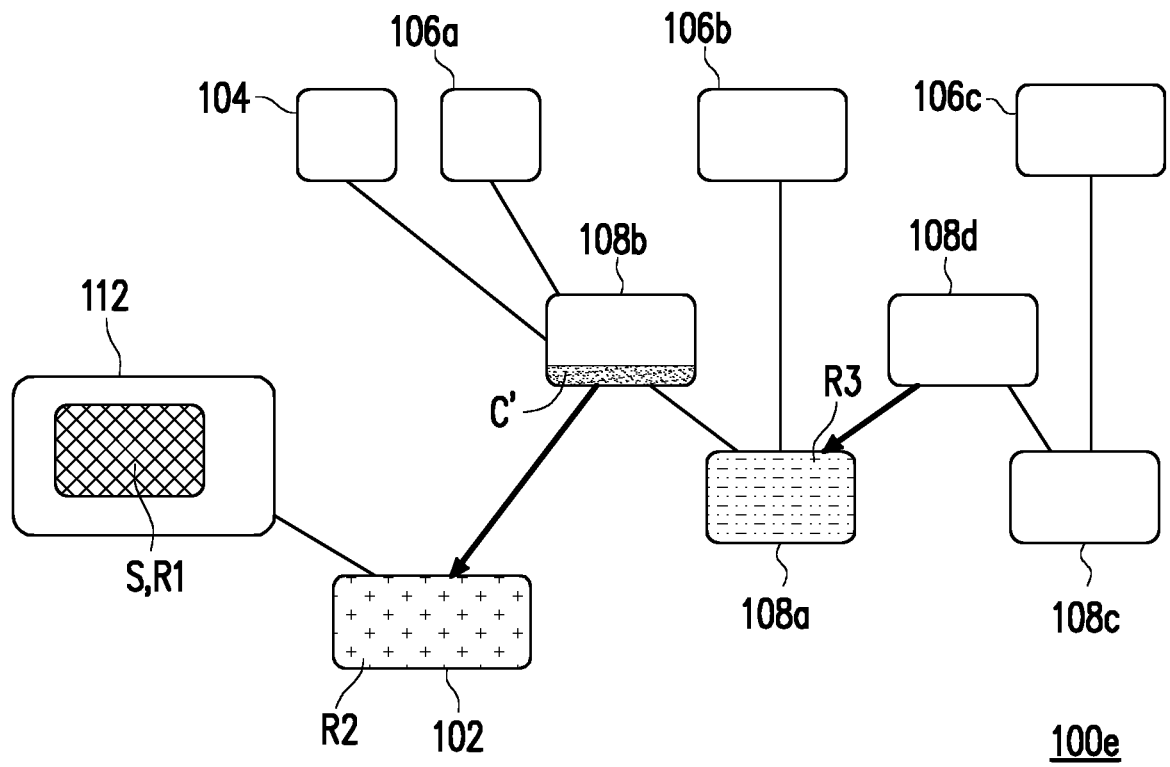

Referring to FIG. 6B, when the detection cartridge 100e is set to be located at a third angle of rotation (e.g., 90 degrees) and a centrifugal force is applied to the sample S and the reagents R1 to R3, the sample S flows into the first temporary tank 108b, the reagent R1 flows into the first temporary tank 108b, and the reagent R2 and the reagent R3 remain at the same position. At this time, the sample S, the reagent R1, and the capture unit C in the first temporary tank 108b may interact to form the capture unit complicated C' connected to the detection tank 102. At this time, the liquid in the containers 106b and 106c does not flow out of the containers 106b and 106c via the pathway due to the design of the pathway layout with the angle of rotation setting. In addition, the manner in which the detection cartridge 100e is mounted on the centrifuge device 12 and the composition of the capture unit complicated C' are provided in the foregoing embodiments and are not repeated herein.

Figure 6F:
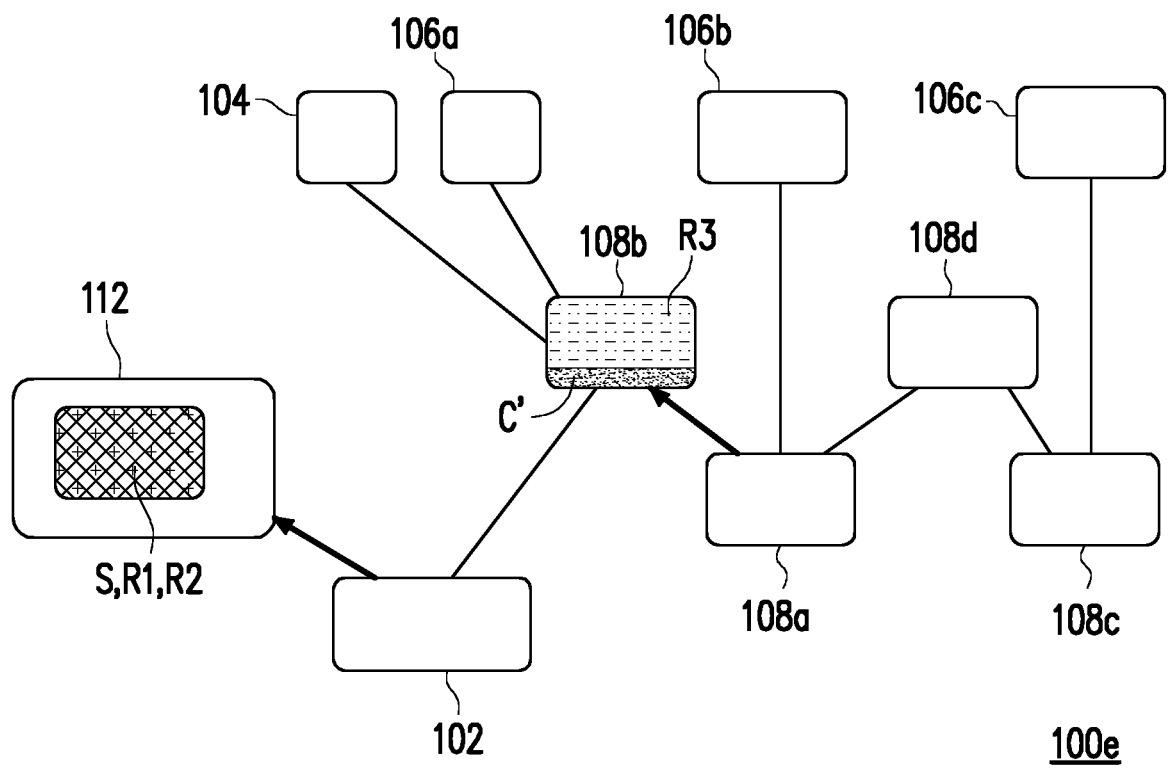
Figure 6G:
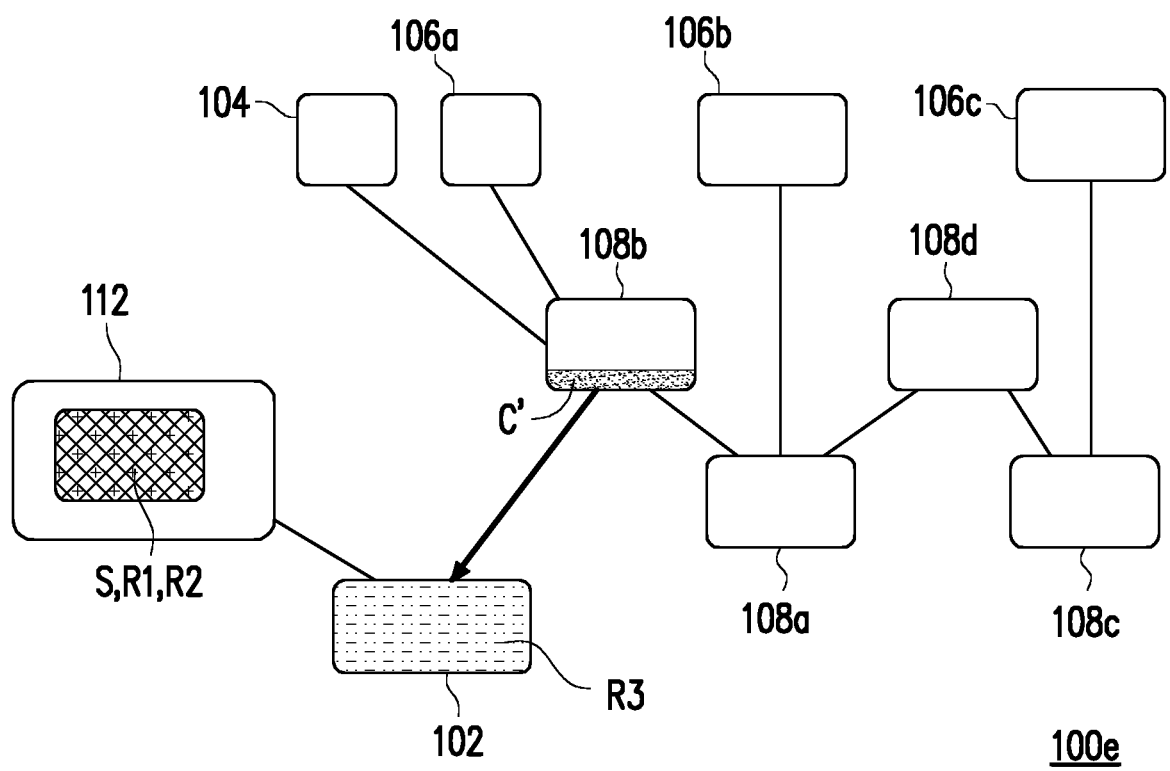

Referring to FIG. 5B to FIG. 5F and FIG. 6C to FIG. 6G simultaneously, when the detection cartridge 100e is used for detection, the subsequent angle of rotation at which the detection cartridge 100e is located is the same as that of the detection cartridge 100d. The differences between the detection method of FIG. 6C to FIG. 6G and the detection method of FIG. 5B to FIG. 5F are as follows. When the reagent R3 flows into the first temporary tank 108b, the reagent R3 may react with the capture unit complicated C' in the first temporary tank 108b to form a test object (FIG. 6F). In the present embodiment, the test object may be the product from the reaction of the reagent R3 and the capture unit complicated C' flowing into the detection tank 102 for detection (FIG. 6G). At this time, the capture unit compound C' does not flow with the reagent R3 and is still connected to the inner wall of the first temporary tank 108b.

In other embodiments, the reagent R3 may separate the capture unit complicated C' from the first temporary tank 108b, dispersing the capture unit compound C' in the reagent R3, thereby increasing the liquid turbidity of the reagent R3. Then, the capture unit complicated C' and the reagent R3 flow into the detection tank 102 together for detection. Those skilled in the art may know the composition of the test object according to the detection items and the composition of the reagents, and the invention is not limited thereto.

Based on the above embodiments, in the detection cartridge 100e, the detection method, and the detection device, the capture unit C is connected to the inner wall of the first temporary tank 108b to avoid interference with the detection of the detection tank 102. In addition, due to the added step of introducing the test object from the first temporary tank 108b into the detection tank 102, the mixing of the test object in the liquid is more uniform, thereby improving the reliability of the detection result.

FIG. 7A to FIG. 7F are flowcharts of a detection method of another embodiment of the invention.

Figure 7A:
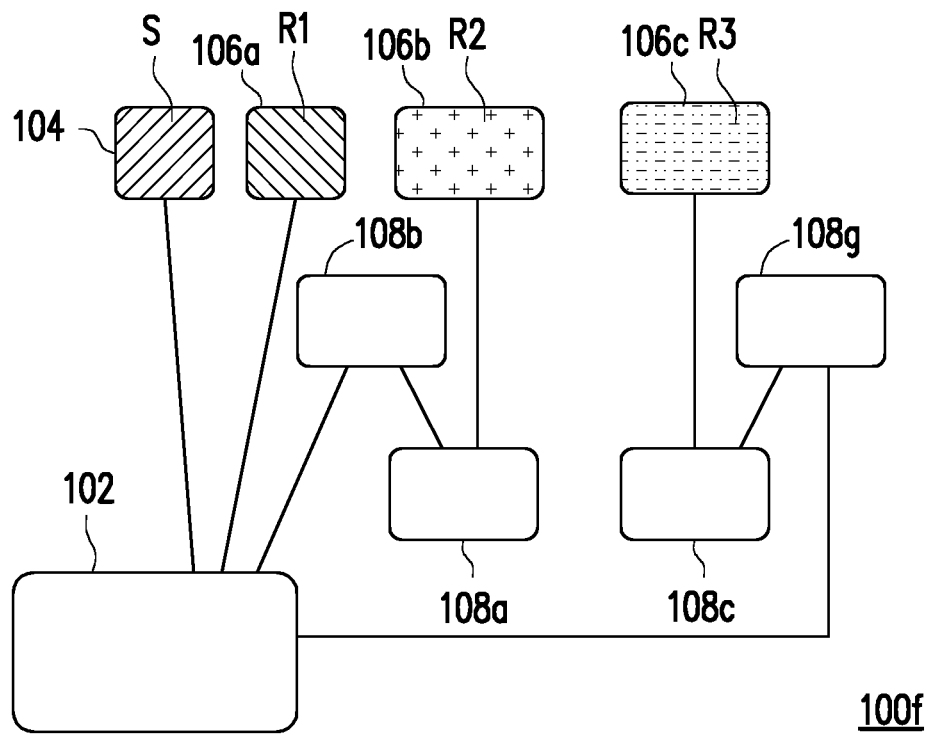
FIG. 7A to FIG. 7F are flowcharts of a detection method of another embodiment of the invention.

Referring to FIG. 1A and FIG. 7A simultaneously, the differences between a detection cartridge 100f of FIG. 7A and the detection cartridge 100a of FIG. 1A are as follows. The detection cartridge 100f does not have the first temporary tanks 108d to 108f in the detection cartridge 100a, and further includes a first temporary tank 108g. The first temporary tank 108g is in communication between the first temporary tank 108c and the detection tank 102. That is, the container 106c of the detection cartridge 100f is in communication with the detection tank 102 via the first temporary tanks 108c and 108g. Specifically, the container 106c, the first temporary tanks 108c and 108g, and the detection tank 102 may be sequentially disposed on the third flow path. In the present embodiment, the quantity of the temporary tanks on the third flow path (2) is equal to the quantity of the temporary tanks on the second flow path (2), and the quantity of the temporary tanks on the second flow path (2) is greater than the quantity of the temporary tanks on the first flow path (0).

Hereinafter, the detection method using the above detection cartridge 100e is described with reference to FIG. 7A to FIG. 7F.

Referring to FIG. 7A, the detection cartridge 100f is provided. The sample S is placed in the sample tank 104, and the reagents R1 to R3 are respectively placed in the containers 106a to 106c.

Figure 7B:
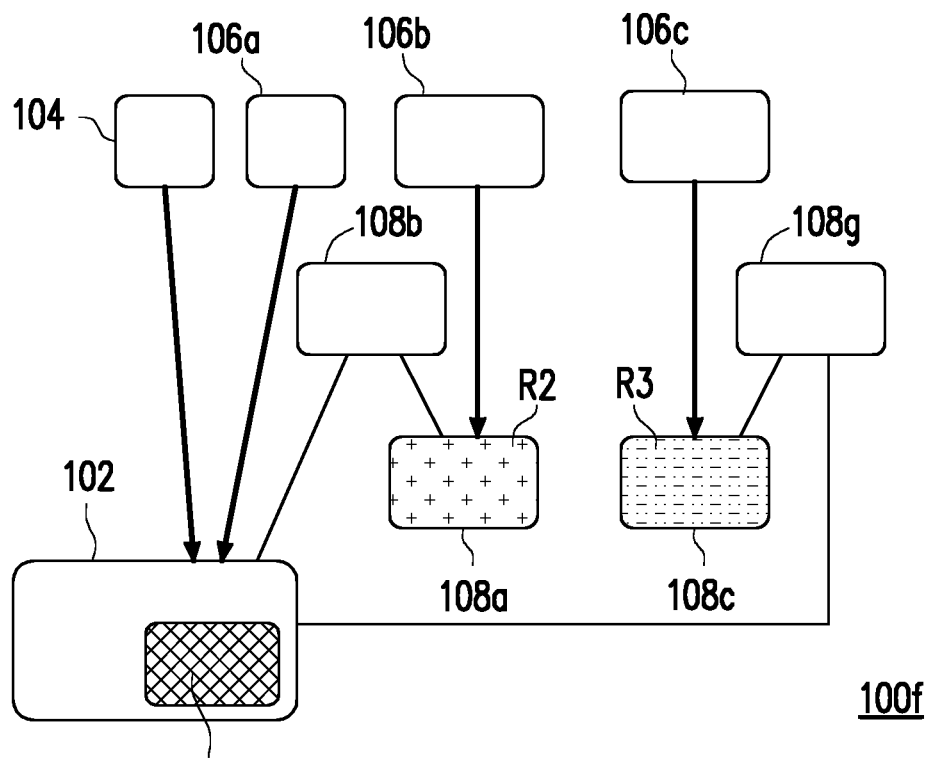

Referring to FIG. 7B, when the detection cartridge 100f is set to be located at the first angle of rotation (e.g., 0 degrees) and a centrifugal force is applied to the sample S and the reagents R1 to R3, the sample S flows into the detection tank 102, the reagent R1 flows into the detection tank 102, the reagent R2 flows into the first temporary tank 108a, and the reagent R3 flows into the first temporary tank 108c. At this time, the sample S and the reagent R1 flowing into the detection tank 102 are reacted. In addition, the manner of mounting the detection cartridge 100e on the centrifuge device is provided in the foregoing embodiments and is not repeated herein.

Figure 7C:
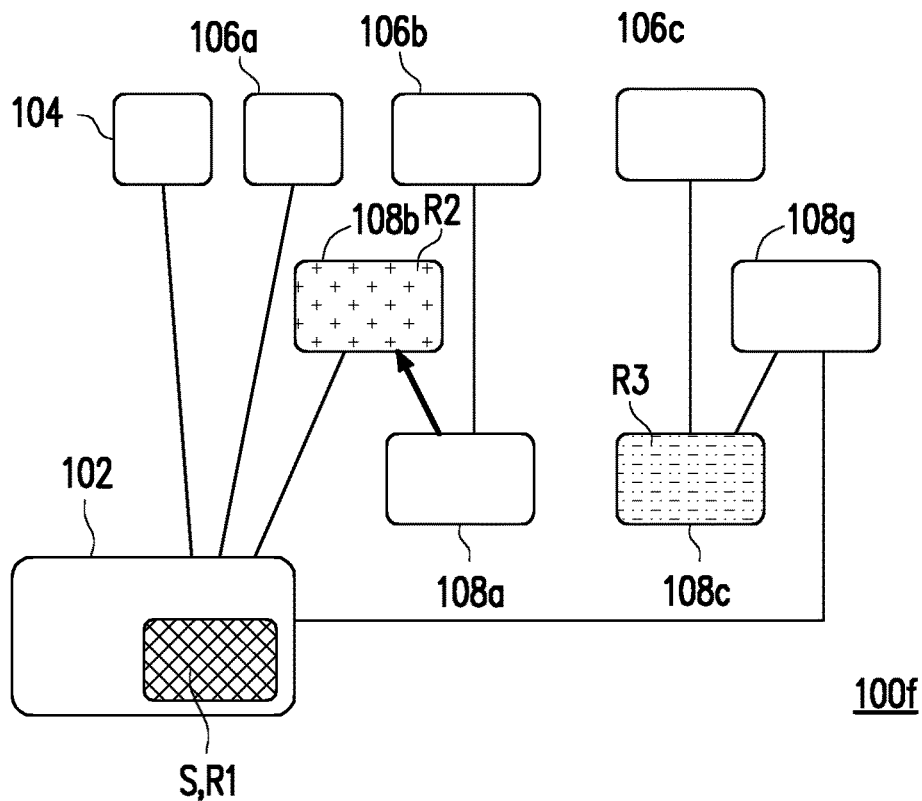

Referring to FIG. 7C, when the detection cartridge 100f is set to be located at a second angle of rotation (e.g., −60 degrees) and a centrifugal force is applied to the sample S and the reagents R1 to R3, the sample S and the reagent R1 remain in the detection tank 102, the reagent R2 flows into the first temporary tank 108b, and the reagent R3 remains in the first temporary tank 108c. During centrifugation, the liquid in the detection tank 102 and the first temporary tank 108c does not flow out of the detection tank 102 and the first temporary tank 108c via the pathway due to the design of the pathway layout with the angle of rotation setting, but the liquid is oscillated, thereby facilitating the mixing of the sample S and the reagent R1 in the detection tank 102 and accelerating the reaction.

Figure 7D:
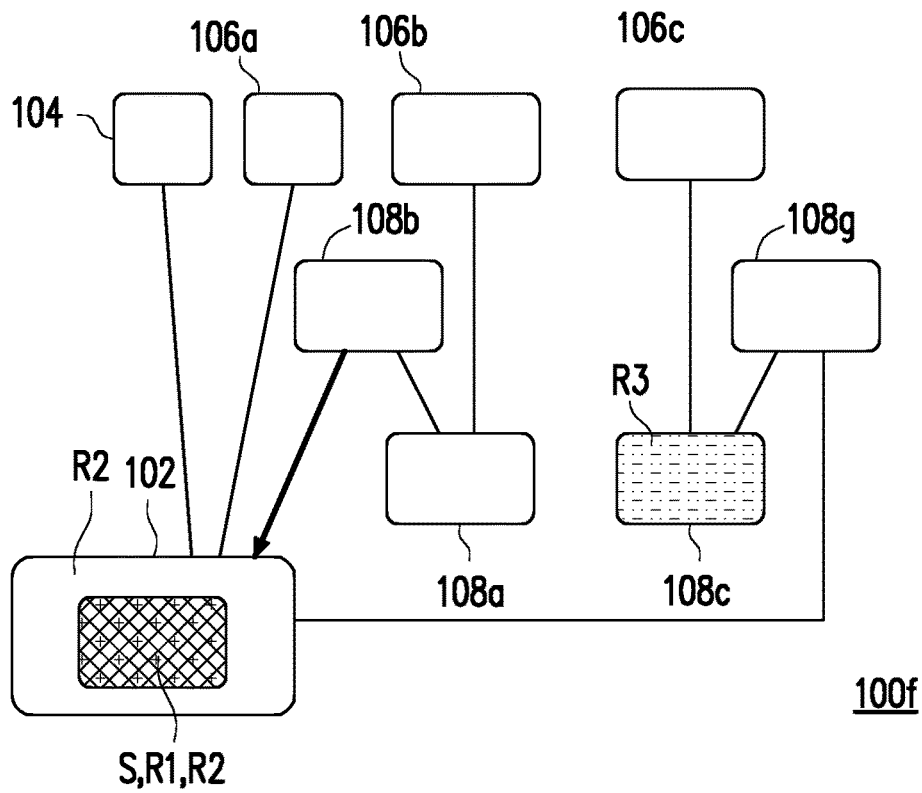

Referring to FIG. 7D, when the detection cartridge 100e is set to be located at the first angle of rotation (e.g., 0 degrees) and a centrifugal force is applied to the sample S and the reagents R1 to R3, the sample S and the reagent R1 remain in the detection tank 102, the reagent R2 flows into the detection tank 102, and the reagent R3 remains in the first temporary tank 108c. In this step, the reagent R2 flowing into the detection tank 102 may participate in the reaction in the detection tank 102.

Figure 7E:
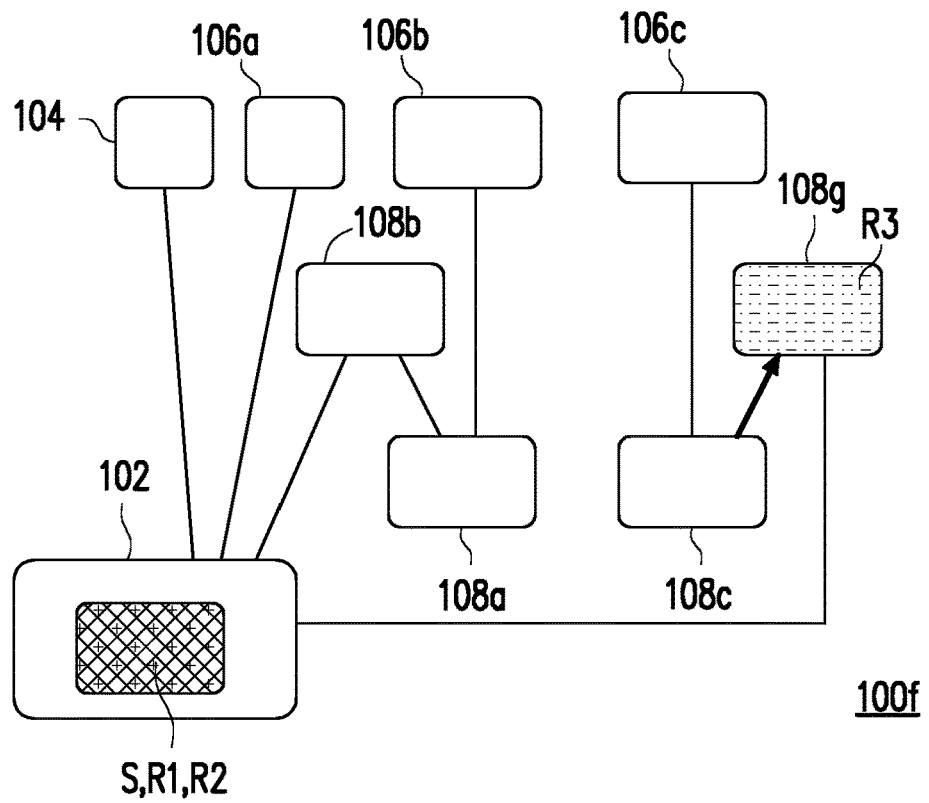

Referring to FIG. 7E, when the detection cartridge 100e is set to be located at the third angle of rotation (e.g., 90 degrees) and a centrifugal force is applied to the sample S and the reagents R1 to R3, the sample S and the reagents R1 and R2 remain in the detection tank 102, and the reagent R3 flows into the first temporary tank 108g. In this step, the centrifugal force may oscillate the liquid in the detection tank 102 to facilitate the reaction.

Figure 7F:
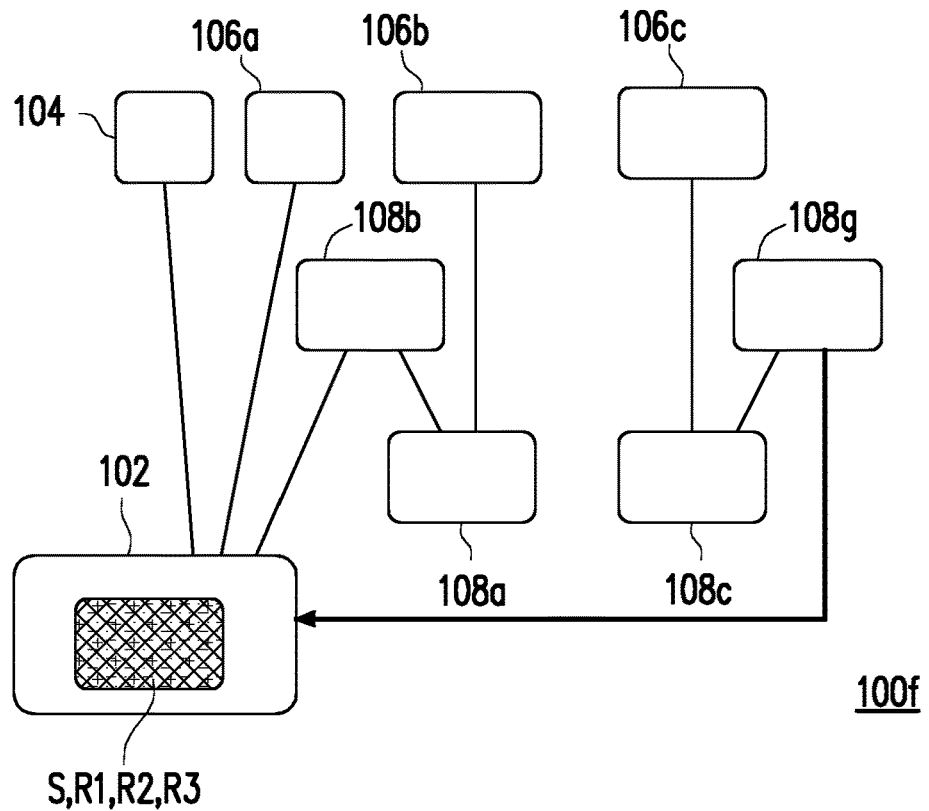

Referring to FIG. 7F, when the detection cartridge 100f is set to be located at the first angle of rotation (e.g., 0 degrees) and a centrifugal force is applied to the sample S and the reagents R1 to R3, the sample S and the reagents R1 and R2 remain in the detection tank 102, and the reagent R3 flows into the detection tank 102. In this step, the reagent R3 flowing into the detection tank 102 may participate in the reaction in the detection tank 102 to form a test object. For the composition of the test object, refer to the foregoing embodiments, and the description is not repeated herein.

Next, the test object contained in the detection tank 102 is detected to obtain a detection result.

As described above, in the above detection method, the quantity of the angles of rotation set by the detection cartridge 100*f* is three, i.e., there is one extra third angle of rotation than the quantity of the angles of rotation set by the detection cartridge 100*a*. In this way, it is possible to add a pathway that only changes the position of the liquid when the detection cartridge 100*f* is set to be located at the third angle of rotation, thereby reducing the quantity of the temporary tanks on the third flow path.

According to the above embodiments, in the detection cartridge 100*f*, the detection method, and the detection device, by increasing the quantity of the angles of rotation set by the detection cartridge 100*f*, the quantity of the temporary tanks required for the detection cartridge 100*f* may be reduced, thereby simplifying the complicatedity of the detection cartridge process.

FIG. 8A to FIG. 8F are flowcharts of a detection method of another embodiment of the invention.

Figure 8A:
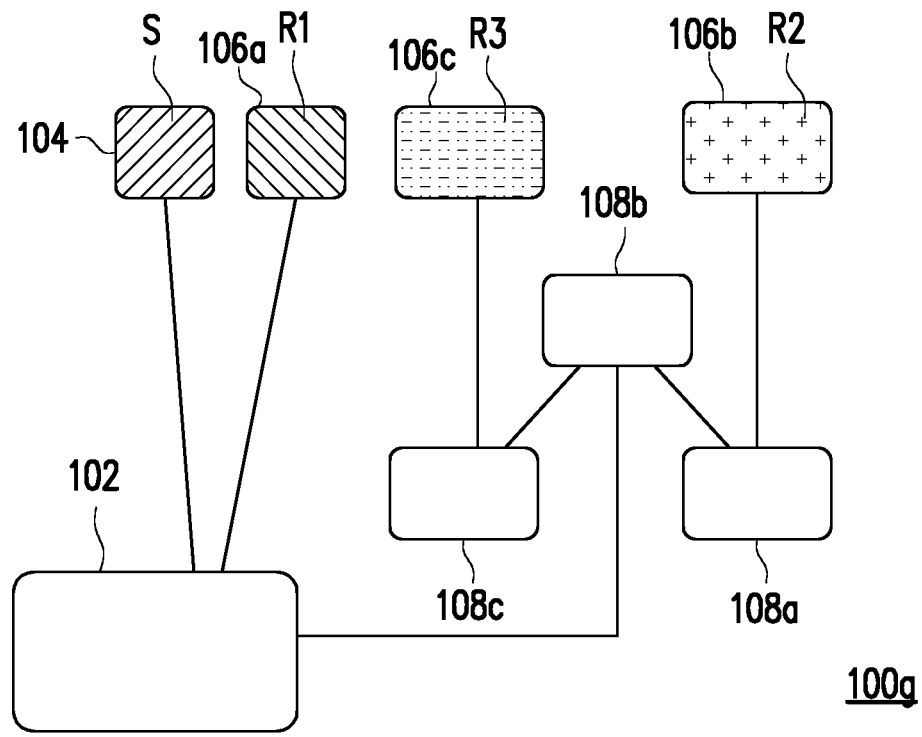
FIG. 8A to FIG. 8F are flowcharts of a detection method of another embodiment of the invention.
Figure 8B:
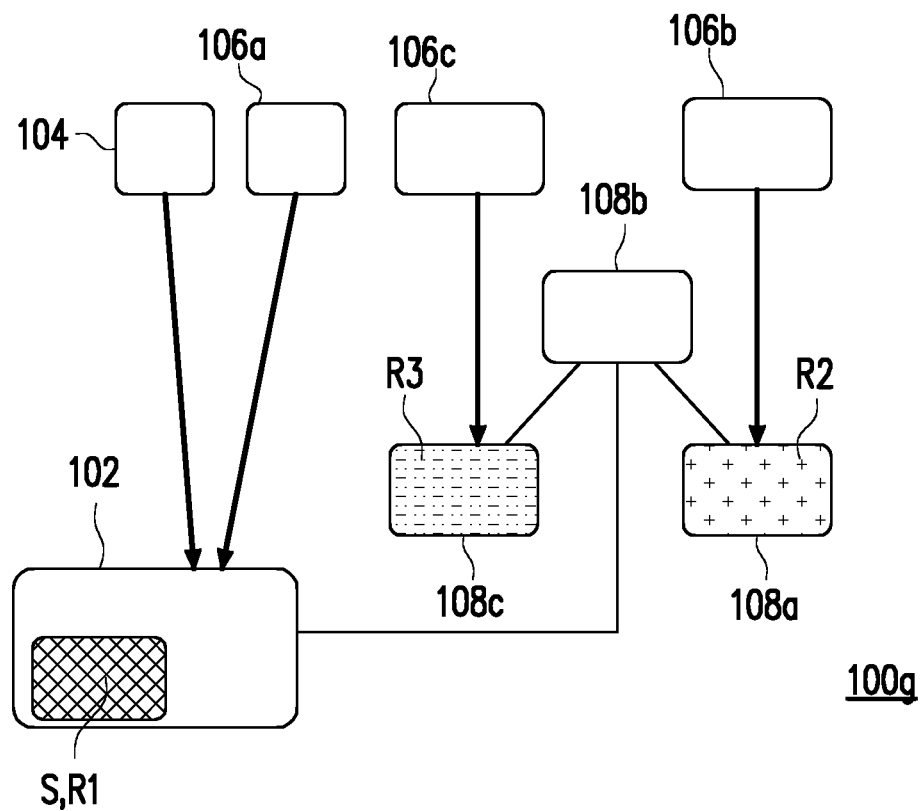
Figure 8C:
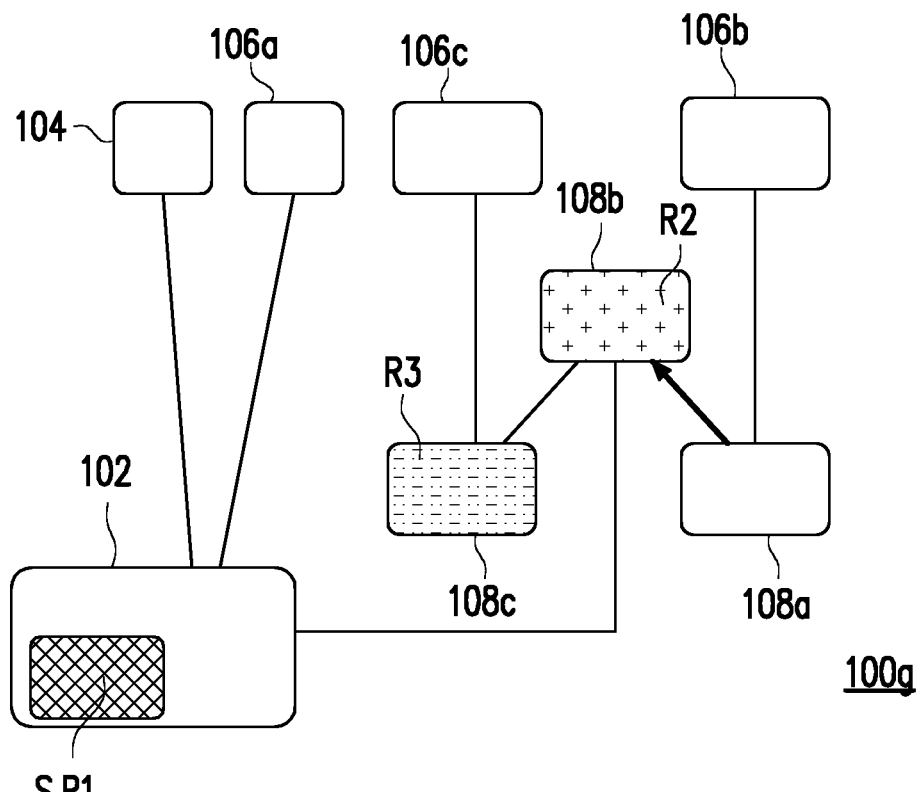
Figure 8D:
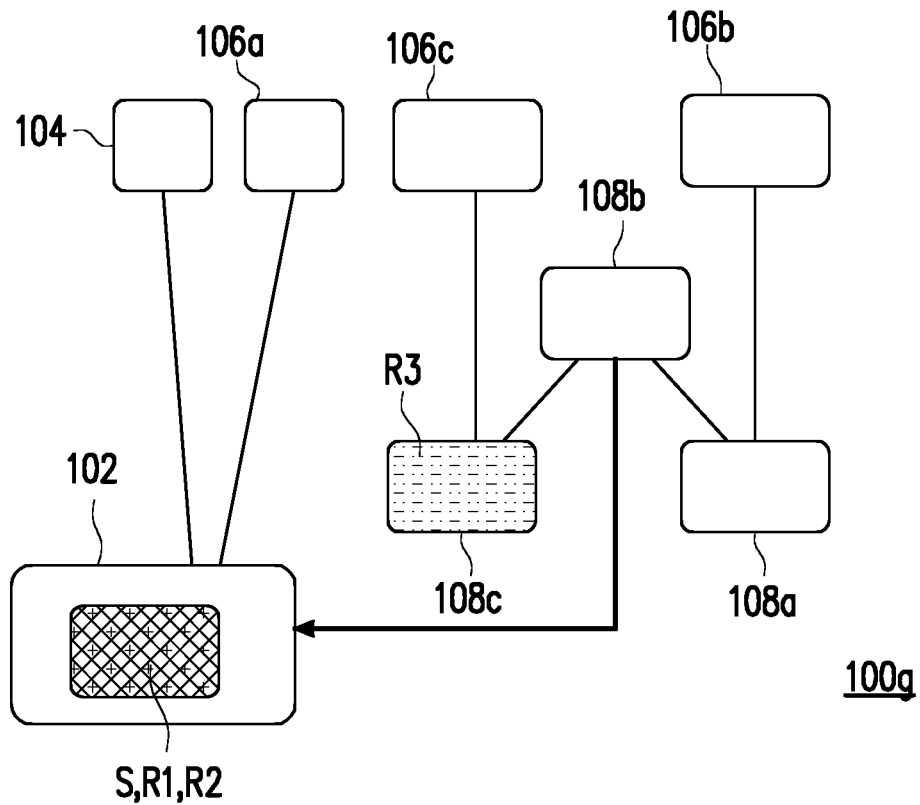
Figure 8E:
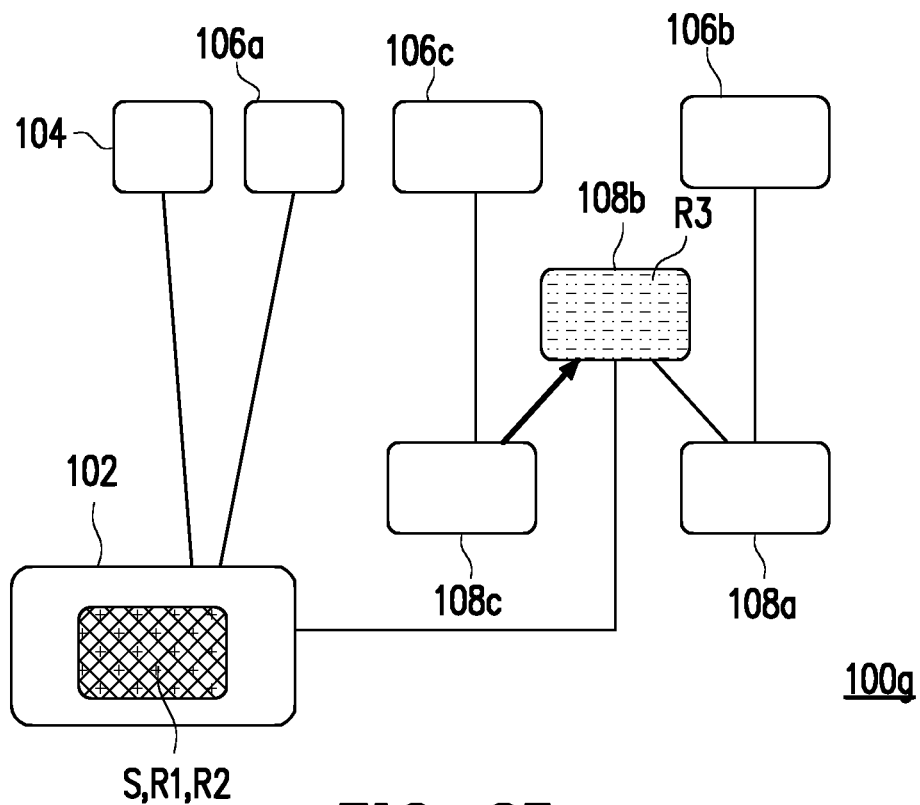

Referring to FIG. 7A and FIG. 8A simultaneously, the differences between a detection cartridge 100*g* of FIG. 8A and the detection cartridge 100*f* of FIG. 7A are as follows. The detection cartridge 100*g* does not have the first temporary tank 108*g* in the detection cartridge 100*f*, and the second flow path and the third flow path of the detection cartridge 100*g* may have a shared path. In detail, the first temporary tank 108*c* of the detection cartridge 100*g* is in communication with the first temporary tank 108*b*, and the second flow path and the third flow path share the path from the first temporary tank 108*b* to the detection tank 102.

Hereinafter, the detection method using the above detection cartridge 100*f* is described with reference to FIG. 8A to FIG. 8F.

Figure 8F:
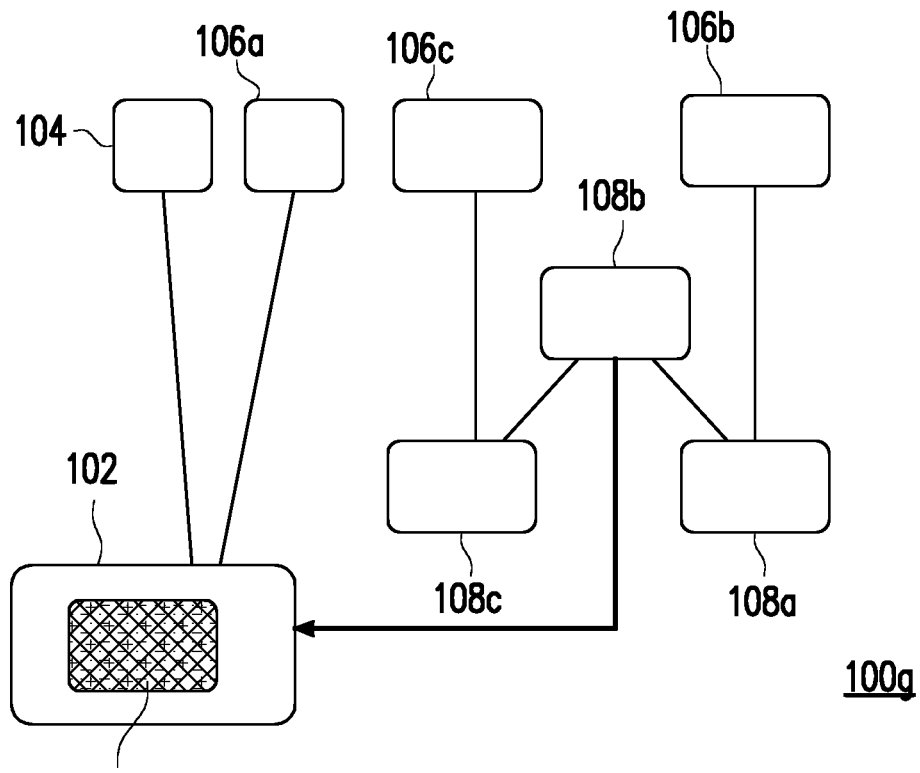

Referring to FIG. 7A to FIG. 7F and FIG. 8A to FIG. 8F simultaneously, when the detection cartridge 100*g* is used for detection, the angle of rotation at which the detection cartridge 100*g* is located is the same as that of the detection cartridge 100*f*. The differences between the detection method of FIG. 8A to FIG. 8F and the detection method of FIG. 7A to FIG. 7F are as follows. After the reagent R3 flows to the temporary tank 108*c* (FIG. 8B), it remains in the temporary tank 108*c* (FIG. 8C to FIG. 8D), then flows into the temporary tank 108*b* (FIG. 8E), and then flows into the detection tank 102 via the shared path of the second flow path and the third flow path (i.e., the path from the temporary tank 108*b* to the detection tank 102) (FIG. 8F).

According to the above embodiments, in the detection cartridge 100*f*, the detection method, and the detection device, compared to the detection cartridge 100*f*, since the second flow path and the third flow path of the detection cartridge 100*g* have a shared path, the quantity of the temporary tanks required for the detection cartridge 100*g* may be further reduced, which simplifies the complicatedity of the detection cartridge process.

FIG. 9A to FIG. 9G are flowcharts of a detection method of another embodiment of the invention.

Figure 9A:
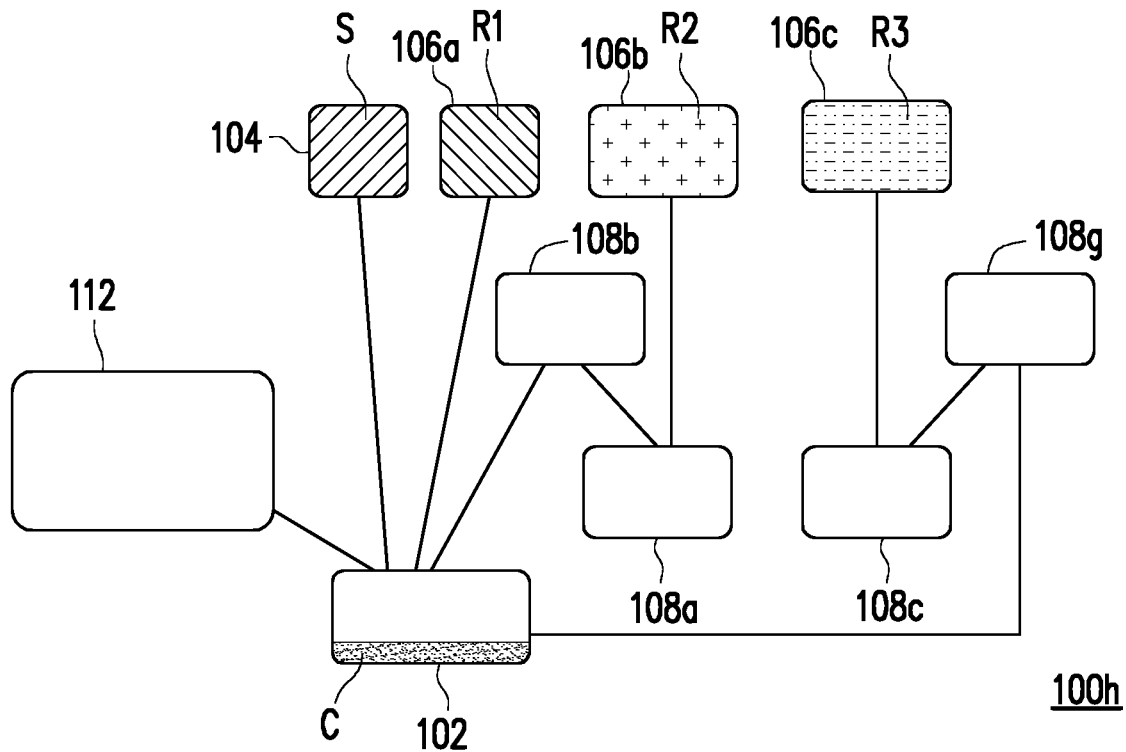
FIG. 9A to FIG. 9G are flowcharts of a detection method of another embodiment of the invention.

Referring to FIG. 7A and FIG. 9A simultaneously, the differences between a detection cartridge 100*h* of FIG. 9A and the detection cartridge 100*f* of FIG. 7A are as follows. The detection cartridge 100*h* further includes the waste tank 112, and the detection tank 102 of the detection cartridge 100*h* may have the capture unit C. The waste tank 112 of the detection cartridge 100*h* is in communication with the detection tank 102 and is not located on the pathway in which the first flow path, the second flow path, the third flow path, and the sample tank 104 are in communication with the detection tank 102. The capture unit C of the detection cartridge 100*h* may be connected to the inner wall (e.g., the bottom surface) of the detection tank 102, but the invention is not limited thereto. The composition of the capture unit C has been detailed in the embodiment of the detection cartridge 100*c* (FIG. 4A) and is not repeated herein.

Hereinafter, the detection method using the above detection cartridge 100*h* is described with reference to FIG. 9A to FIG. 9G.

Referring to FIG. 9A, the detection cartridge 100*h* is provided. The sample S is placed in the sample tank 104, and the reagents R1 to R3 are respectively placed in the containers 106*a* to 106*c*.

Figure 9B:
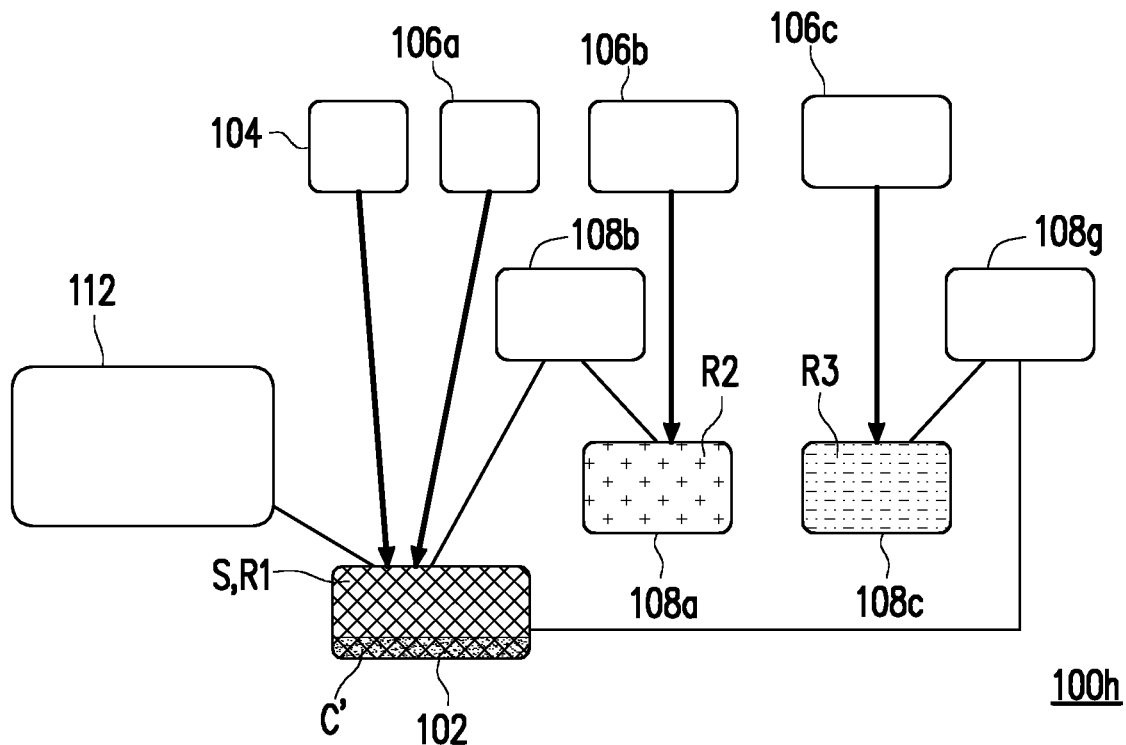

Referring to FIG. 9B, when the detection cartridge 100*h* is set to be located at the first angle of rotation (e.g., 0 degrees) and a centrifugal force is applied to the sample S and the reagents R1 to R3, the sample S flows into the detection tank 102, the reagent R1 flows into the detection tank 102, the reagent R2 flows into the first temporary tank 108*a*, and the reagent R3 flows into the first temporary tank 108*c*. At this time, the sample S, the reagent R1, and the capture unit C flowing into the detection tank 102 may interact to form the capture unit complicated C' connected to the detection tank 102. The composition of the capture unit complicated C' has been detailed in the embodiment of the detection cartridge 100*c* (FIG. 4B). In addition, the manner of mounting the detection cartridge 100*h* on the centrifuge device is provided in the foregoing embodiments and is not repeated herein.

Figure 9C:
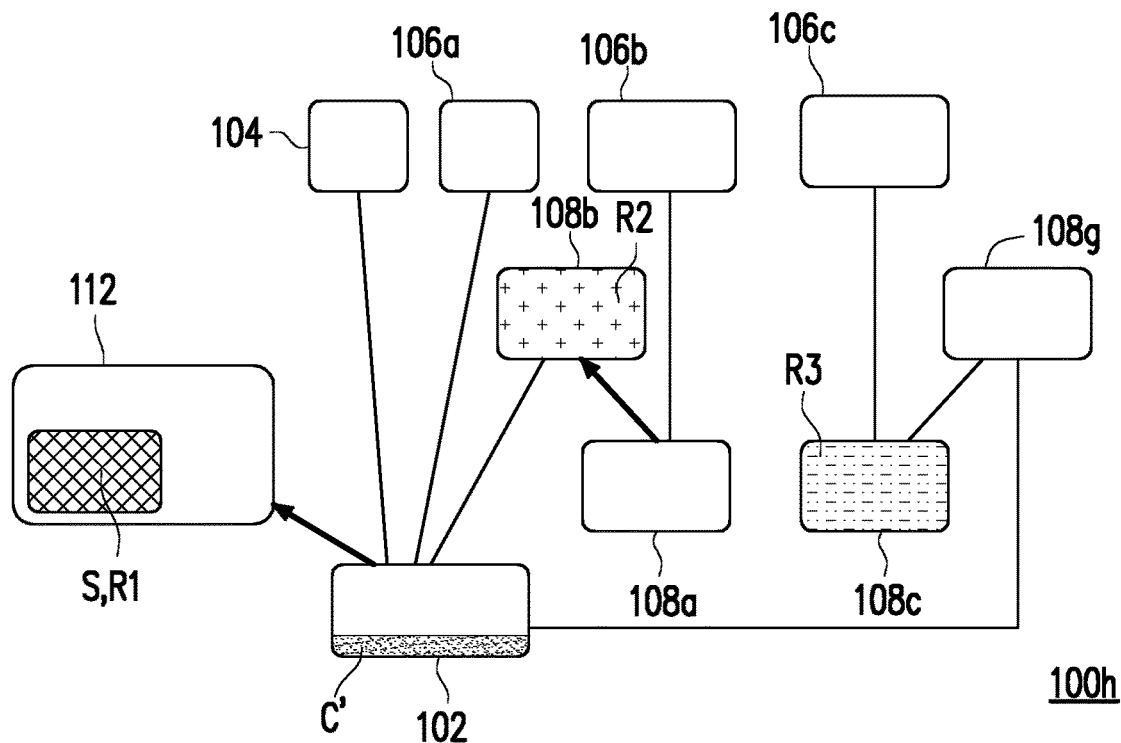

Referring to FIG. 9C, when the detection cartridge 100*h* is set to be located at a second angle of rotation (e.g., −60 degrees) and a centrifugal force is applied to the sample S and the reagents R1 to R3, the sample S and the reagent R1 flow into the waste tank 112, the reagent R2 flows into the first temporary tank 108*b*, and the reagent R3 remains in the first temporary tank 108*c*. In this step, the liquid is removed from the detection tank 102, which prevents the subsequent reaction of the capture unit complicated C' in the detection tank 102 from being disturbed. In addition, during centrifugation, the liquid in the first temporary tank 108*c* does not flow out of the first temporary tank 108*c* via the pathway due to the pathway layout design with the angle of rotation setting.

Figure 9D:
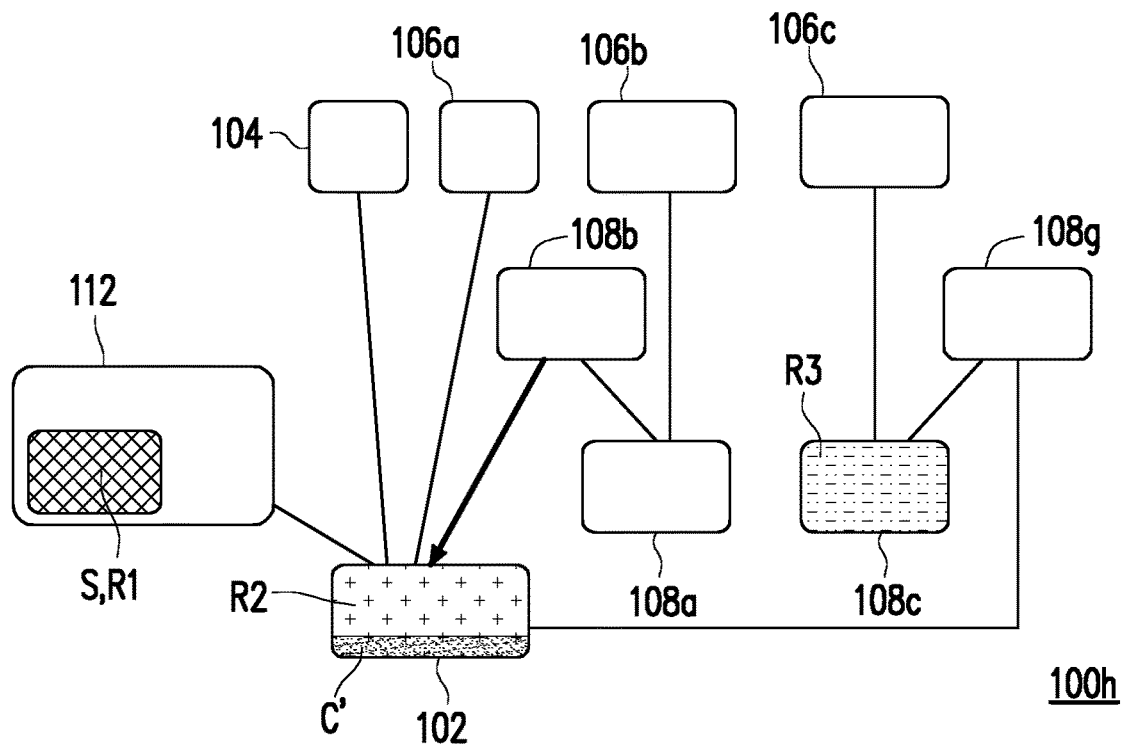

Referring to FIG. 9D, when the detection cartridge 100*h* is set to be located at the first angle of rotation (e.g., 0 degrees) and a centrifugal force is applied to the sample S and the reagents R1 to R3, the sample S and the reagent R1 remain in the waste tank 112, the reagent R2 flows into the detection tank 102, and the reagent R3 remains in the first temporary tank 108*c*. In an embodiment, the reagent R2 flowing into the detection tank 102 may react with the capture unit complicated C'. In another embodiment, the reagent R2 may be a cleaning solution or buffer that does not react with the capture unit complicated C'. During centrifugation, the liquid in the waste tank 112 does not flow out of the waste tank 112 via the pathway due to the design of the pathway layout with the angle of rotation setting.

Figure 9E:
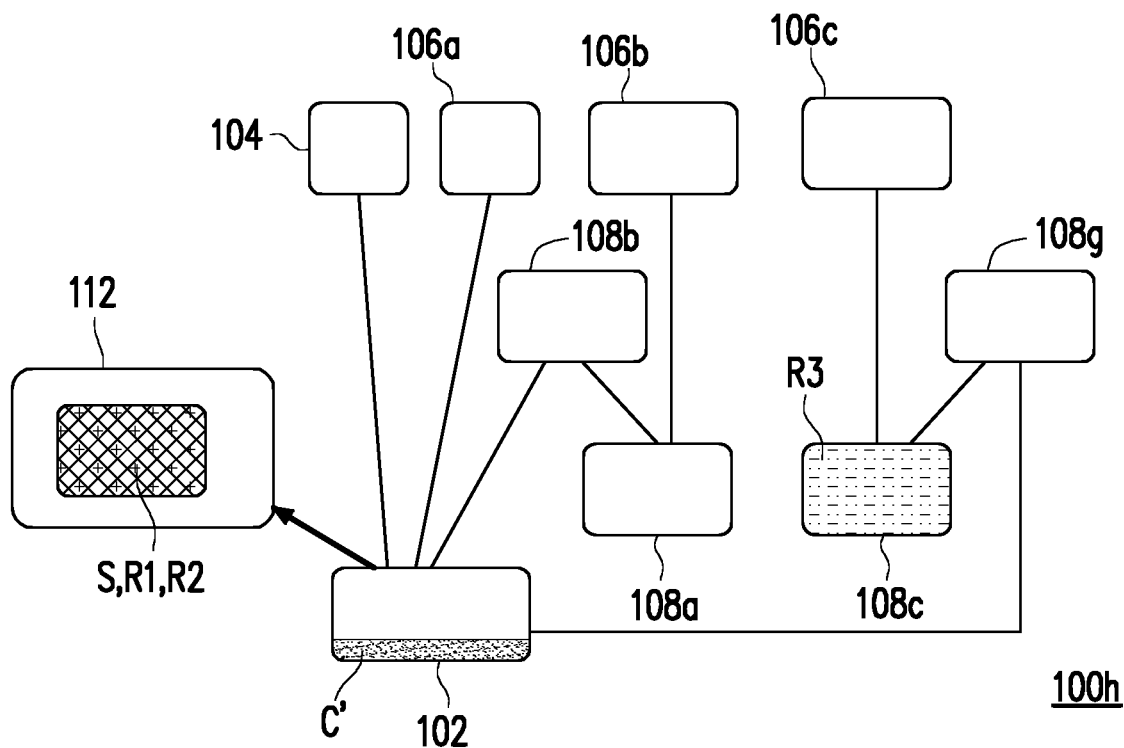

Referring to FIG. 9E, when the detection cartridge 100*h* is set to be located at the second angle of rotation (e.g., −60 degrees) and a centrifugal force is applied to the sample S and the reagents R1 to R3, the sample S and the reagent R1 remain in the waste tank 112, the reagent R2 flows into the waste tank 112, and the reagent R3 remains in the first temporary tank 108c. In this step, the liquid is removed from the detection tank 102, which prevents the subsequent reaction of the capture unit complicated C' in the detection tank 102 from being disturbed.

Figure 9F:
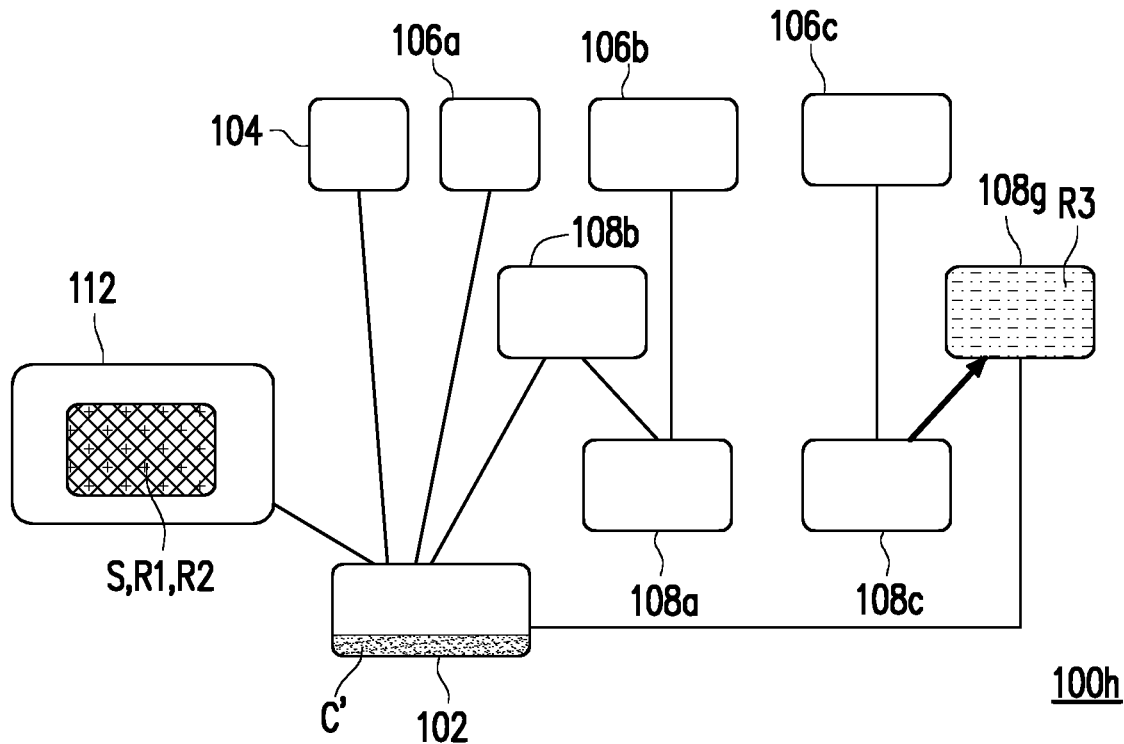

Referring to FIG. 9F, when the detection cartridge 100h is set to be located at the third angle of rotation (e.g., 90 degrees) and a centrifugal force is applied to the sample S and the reagents R1 to R3, the sample S and the reagents R1 and R2 remain in the waste tank 112, and the reagent R3 flows into the first temporary tank 108g.

Figure 9G:
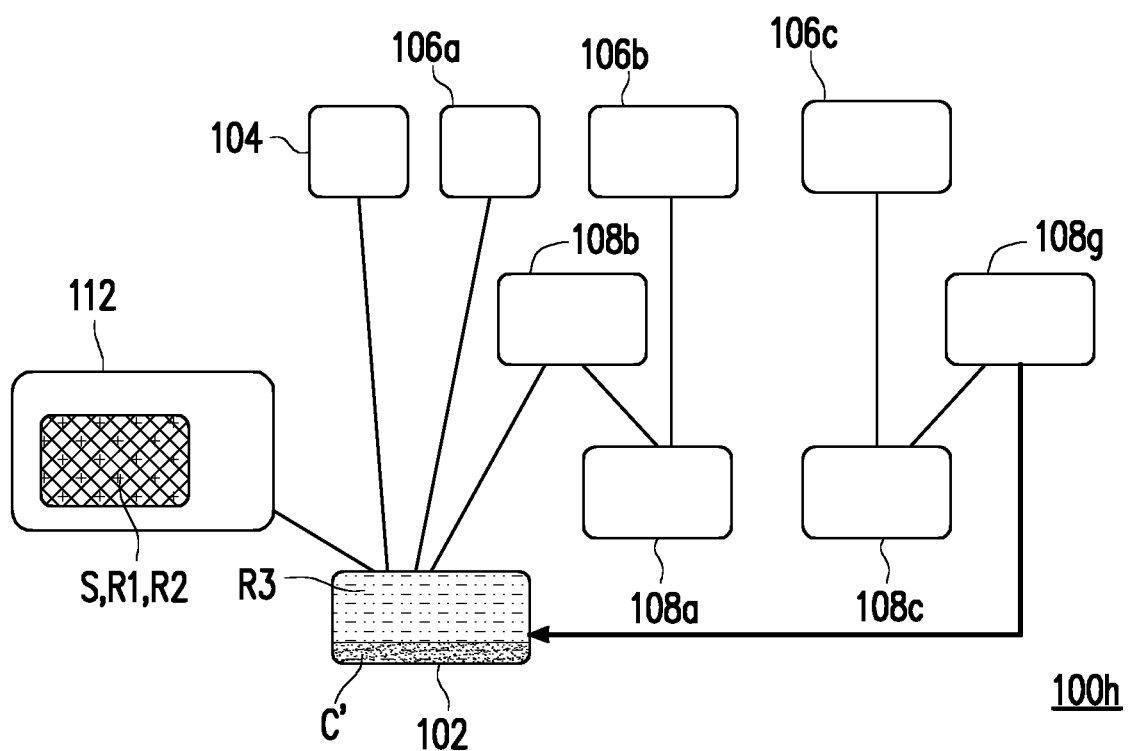

Referring to FIG. 9G, when the detection cartridge 100h is set to be located at the first angle of rotation (e.g., 0 degrees) and a centrifugal force is applied to the sample S and the reagents R1 to R3, the sample S and the reagents R1 and R2 remain in the waste tank 112, and the reagent R3 flows into the detection tank 102. In this step, the reagent R3 flowing into the detection tank 102 may react with the capture unit complicated C' to form a test object. For the composition of the test object, refer to the foregoing embodiments, and the description is not repeated herein.

Next, the test object contained in the liquid in the detection tank 102 is detected to obtain a detection result.

According to the above embodiments, in the detection cartridge 100h, the detection method, and the detection device, since the detection cartridge 100h includes the waste tank 112 for storing waste liquid, the interaction between the reagents may be prevented from interfering with the multi-stage reaction, thereby improving detection accuracy.

FIG. 10A to FIG. 10G are flowcharts of a detection method of another embodiment of the invention.

Figure 10A:
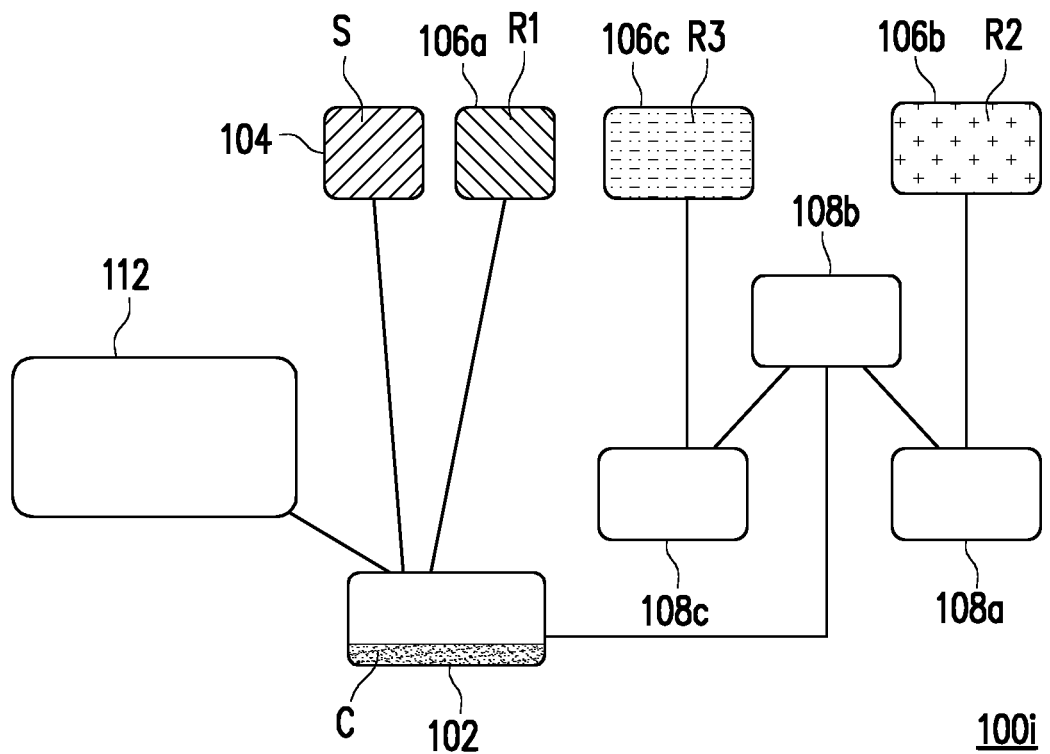
FIG. 10A to FIG. 10G are flowcharts of a detection method of another embodiment of the invention.
Figure 10B:
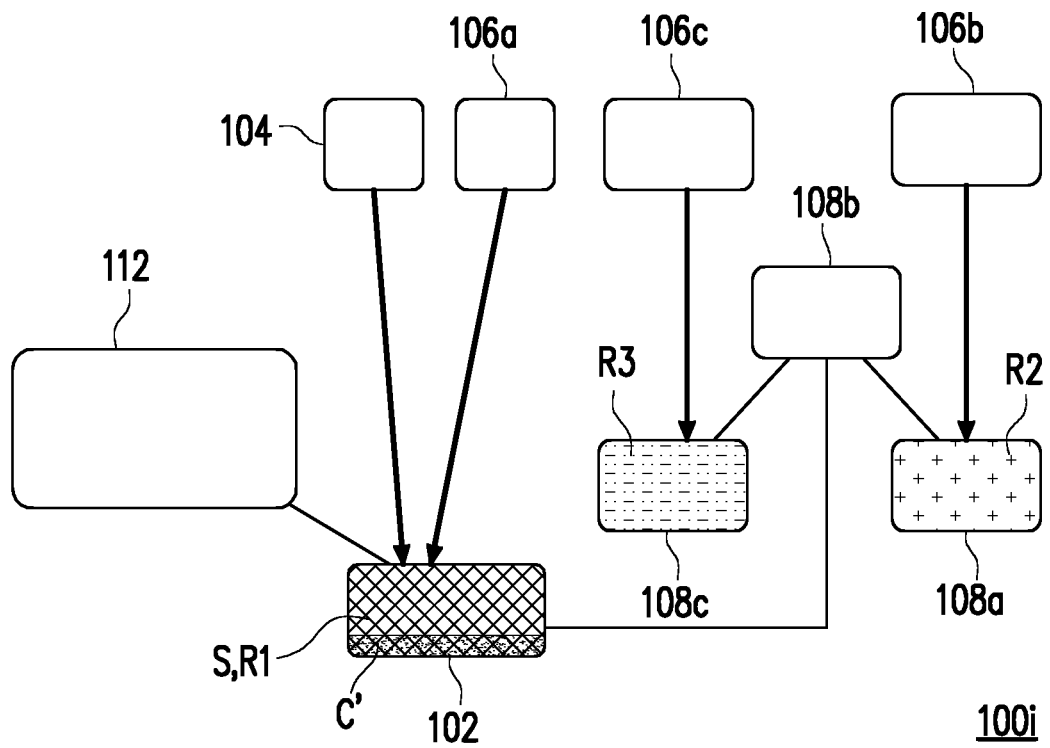
Figure 10C:
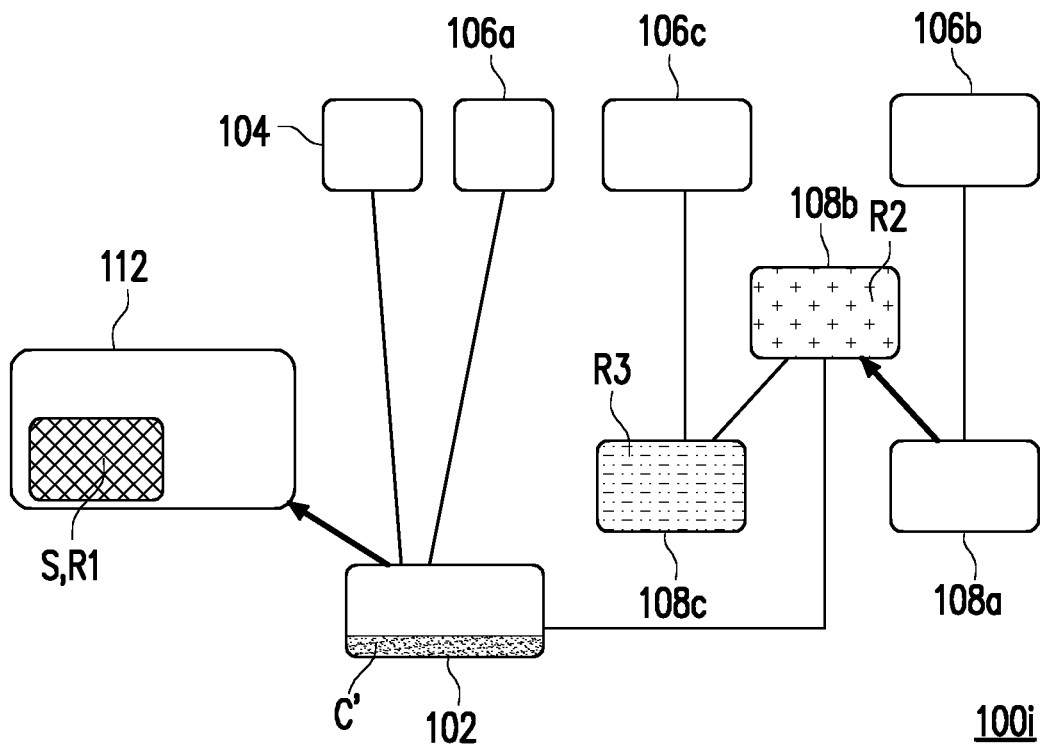
Figure 10D:
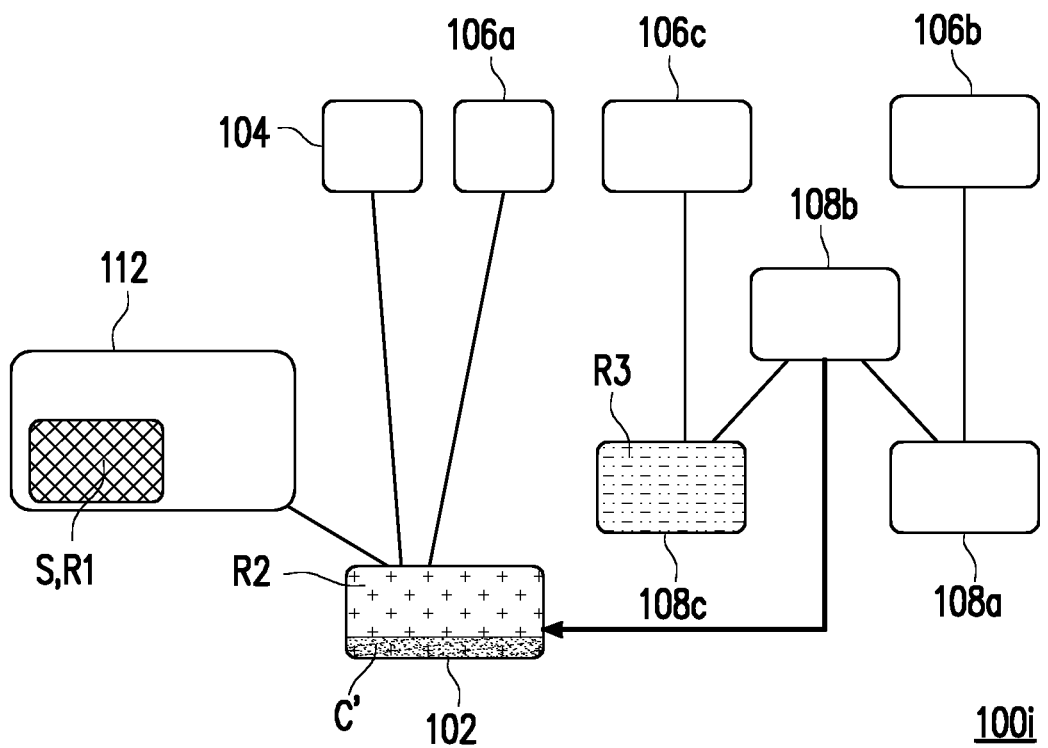
Figure 10E:
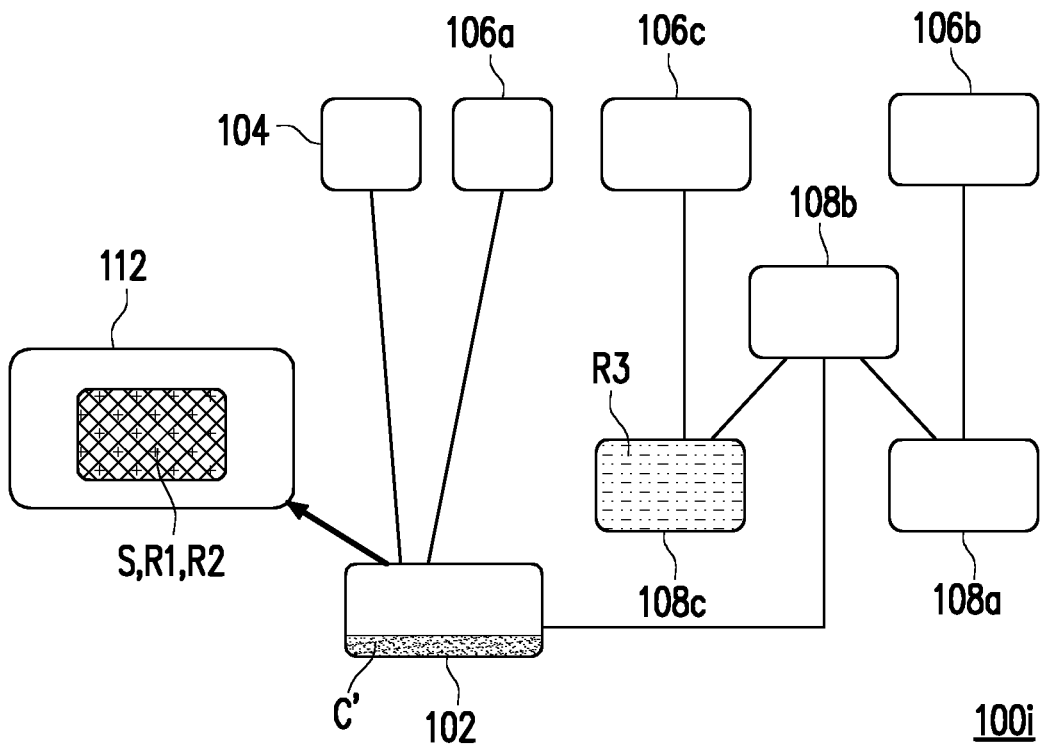
Figure 10F:
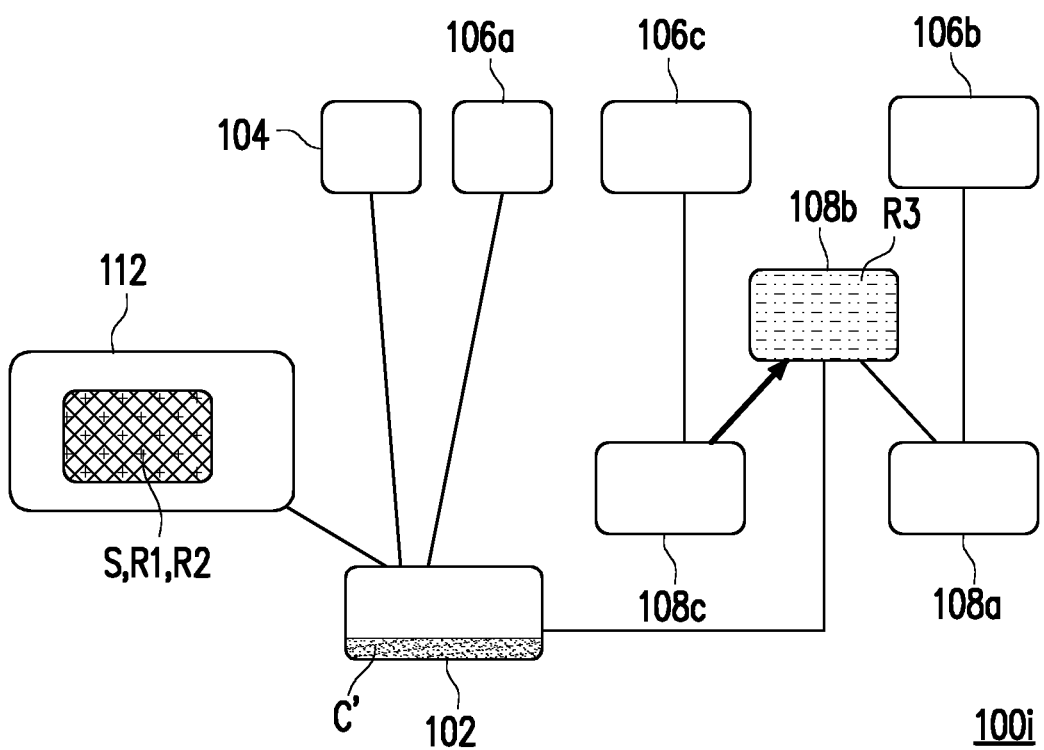

Referring to FIG. 9A and FIG. 10A simultaneously, the differences between a detection cartridge 100i of FIG. 10A and the detection cartridge 100h of FIG. 9A are as follows. The detection cartridge 100h does not have the first temporary tank 108g in the detection cartridge 100i, and the second flow path and the third flow path of the detection cartridge 100i may have a shared path. In detail, the first temporary tank 108c of the detection cartridge 100i is in communication with the first temporary tank 108b, and the second flow path and the third flow path share the path from the first temporary tank 108b to the detection tank 102.

Hereinafter, the detection method using the above detection cartridge 100i is described with reference to FIG. 10A to FIG. 10G.

Figure 10G:
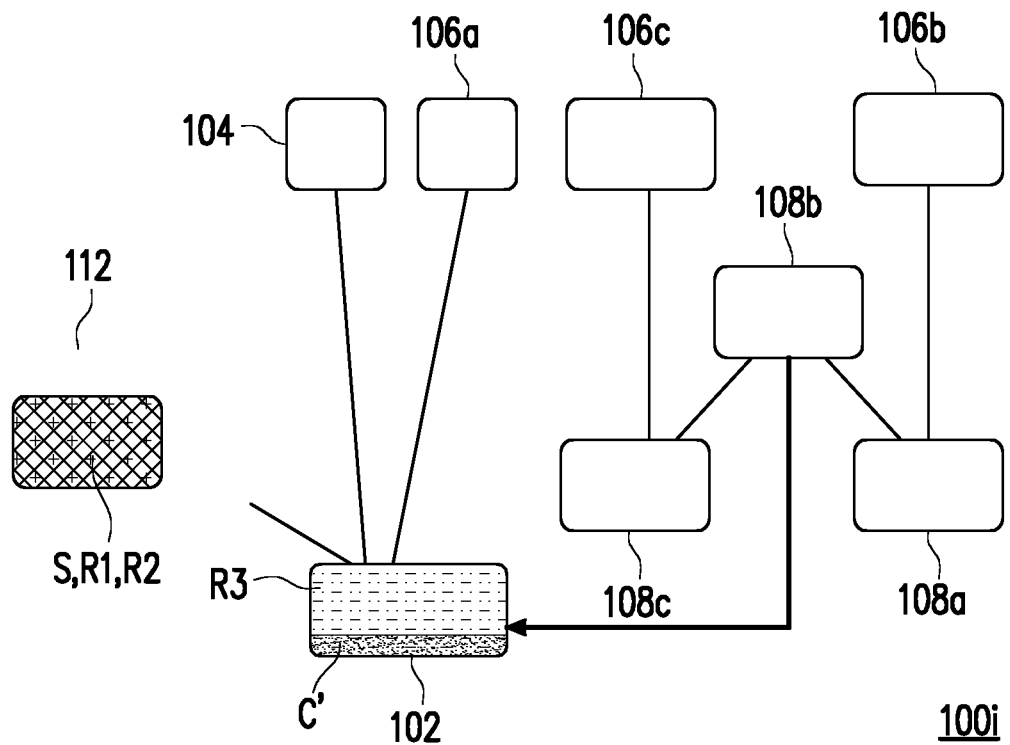

Referring to FIG. 9A to FIG. 9G and FIG. 10A to FIG. 10G simultaneously, when the detection cartridge 100i is used for detection, the angle of rotation at which the detection cartridge 100i is located is the same as that of the detection cartridge 100h. The differences between the detection method of FIG. 10A to FIG. 10G and the detection method of FIG. 9A to FIG. 9G are as follows. After the reagent R3 flows to the first temporary tank 108c (FIG. 10B), it remains in the first temporary tank 108c (FIG. 10C to FIG. 10E), then flows into the first temporary tank 108b (FIG. 10F), and then flows into the detection tank 102 via the shared path of the second flow path and the third flow path (i.e., the path from the first temporary tank 108b to the detection tank 102) (FIG. 10G).

According to the above embodiments, in the detection cartridge 100i, the detection method, and the detection device, compared to the detection cartridge 100h, since the second flow path and the third flow path of the detection cartridge 100i have a shared path, the quantity of the temporary tanks required for the detection cartridge 100i may be further reduced, which simplifies the complicatedity of the detection cartridge process.

Figure 11A:
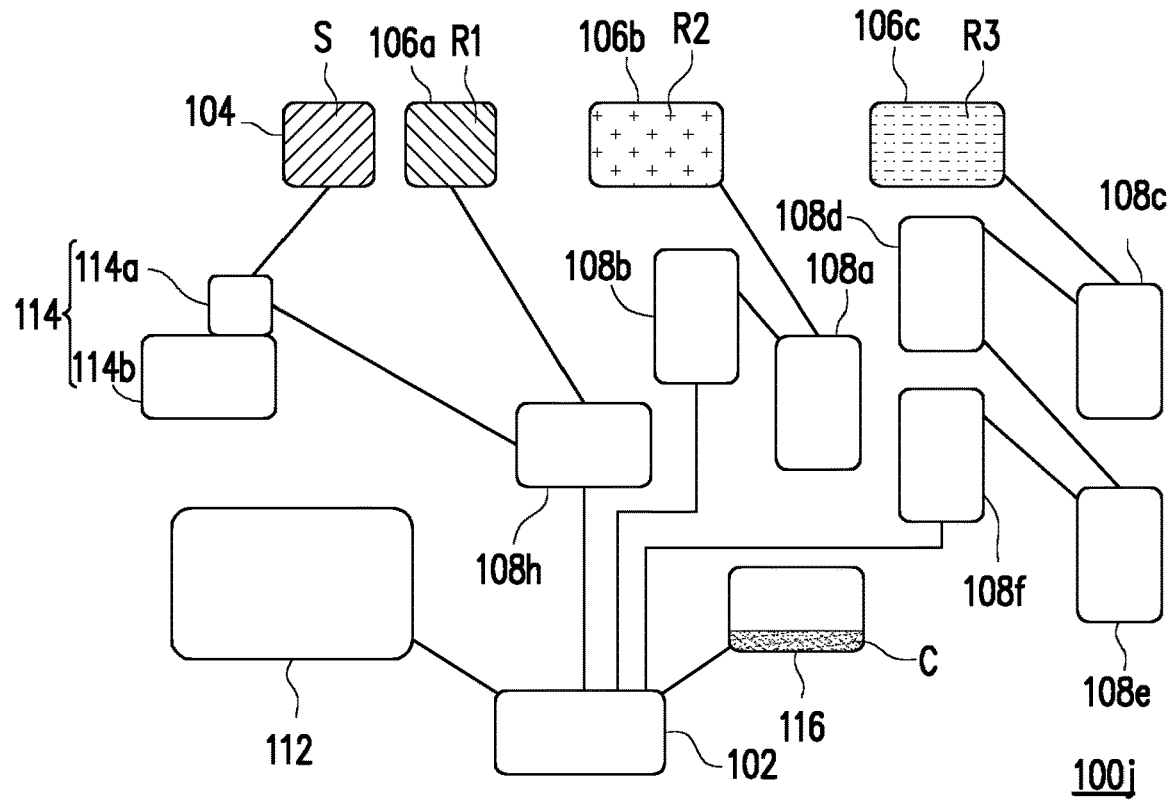
FIG. 11A to FIG. 11N are flowcharts of a detection method of another embodiment of the invention.
Figure 11B:
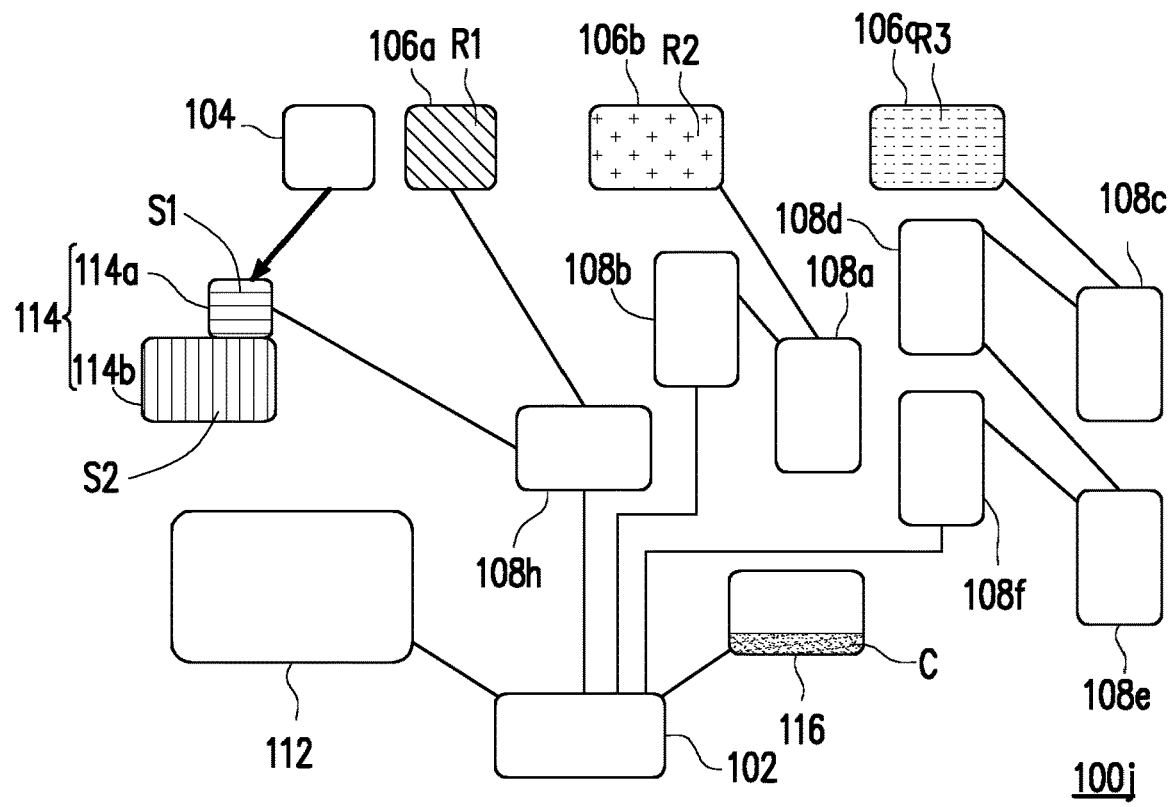
Figure 11C:
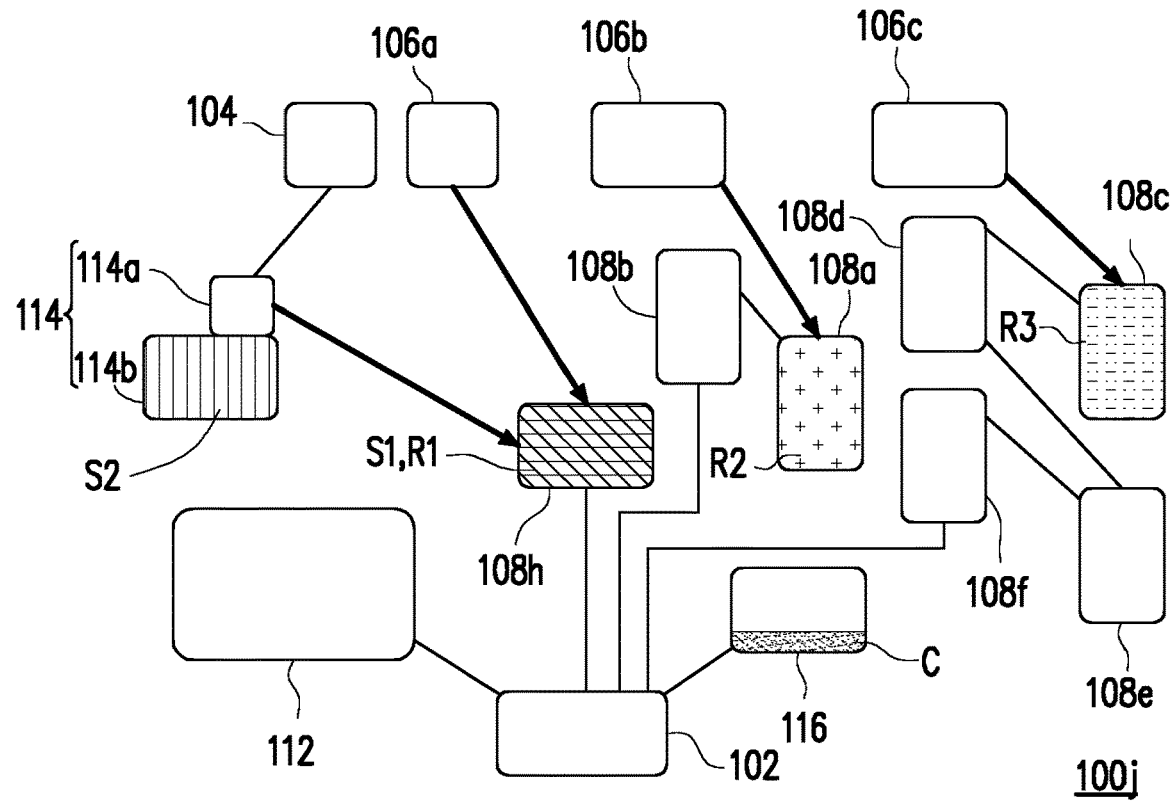
Figure 11D:
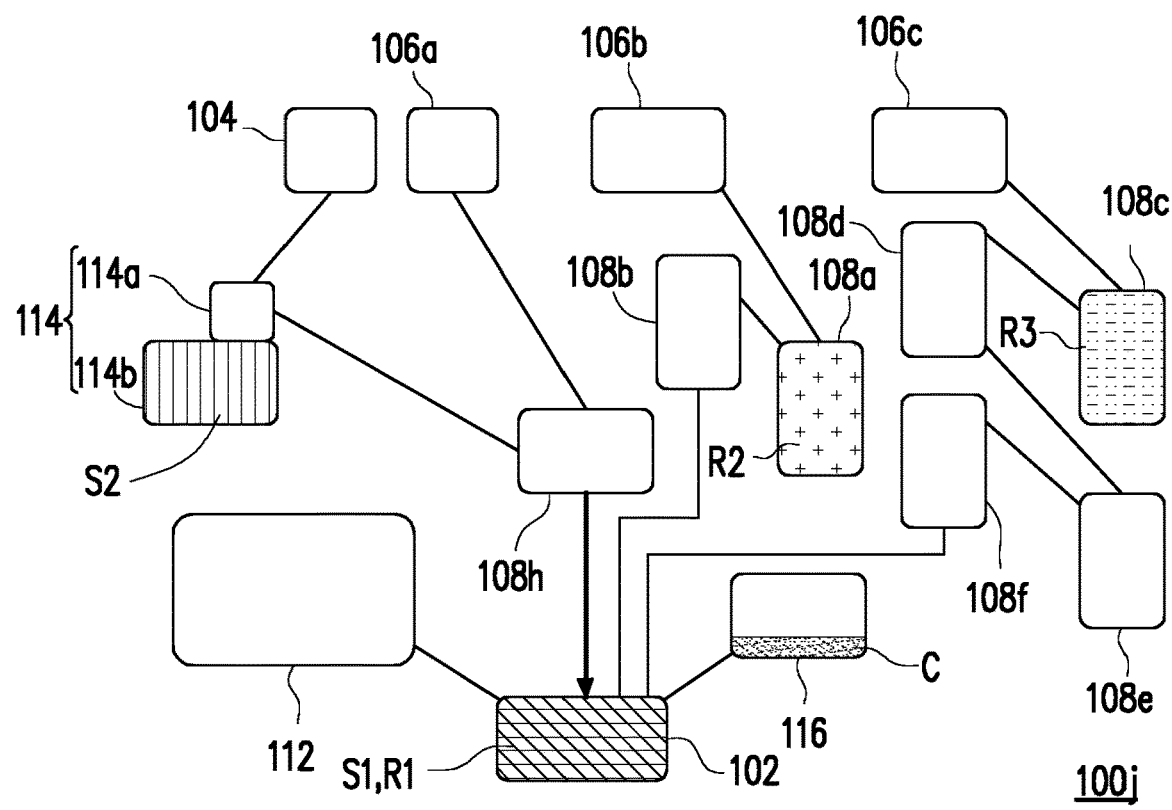
Figure 11E:
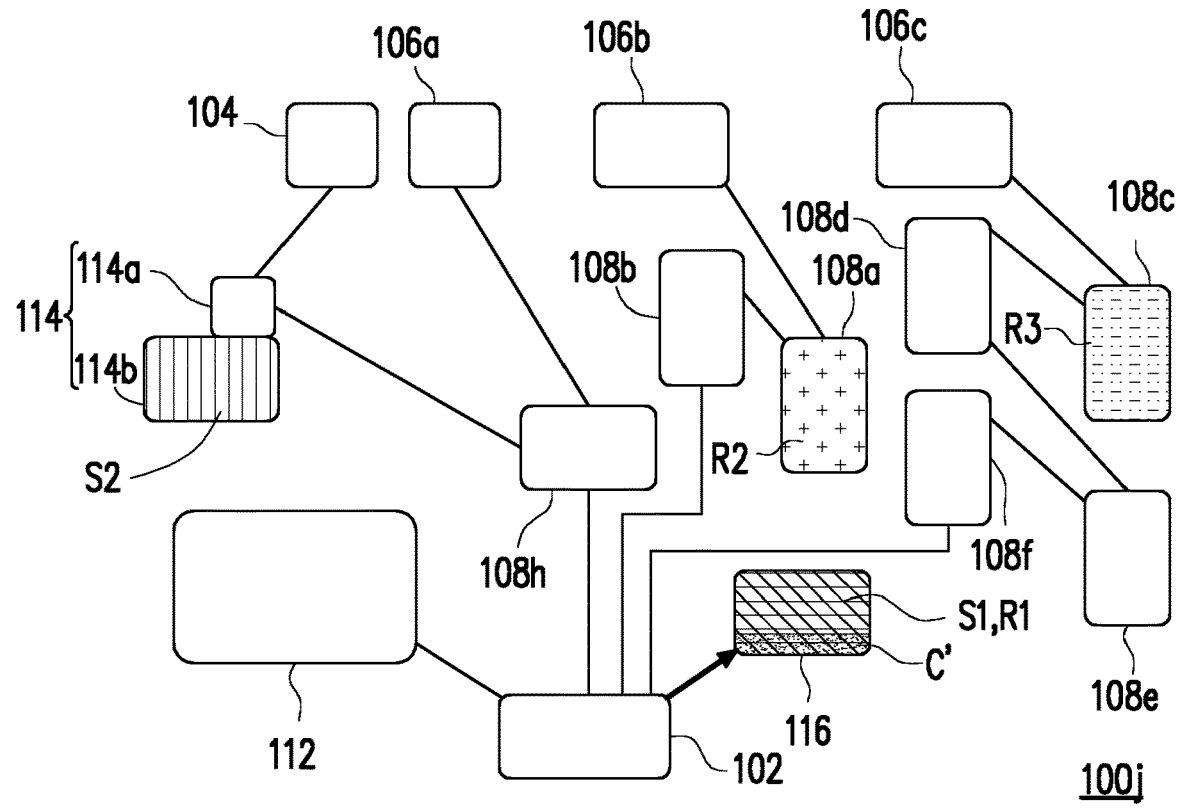
Figure 11F:
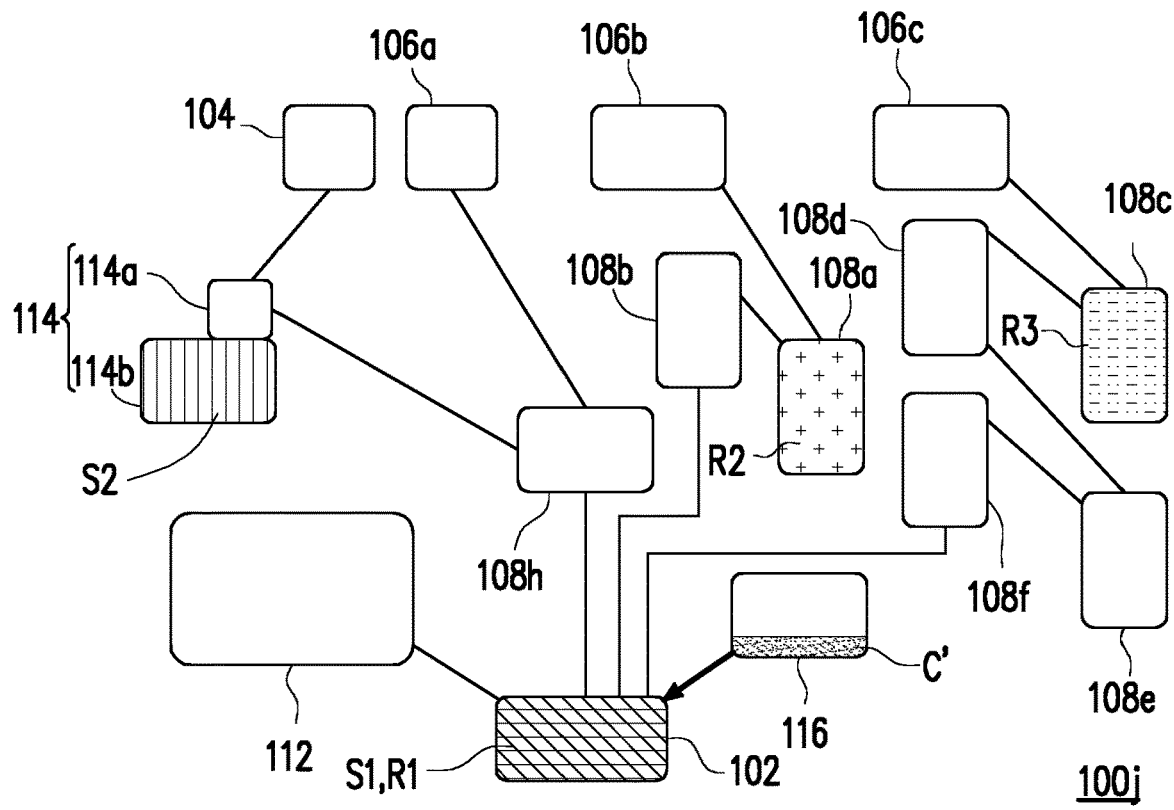
Figure 11G:
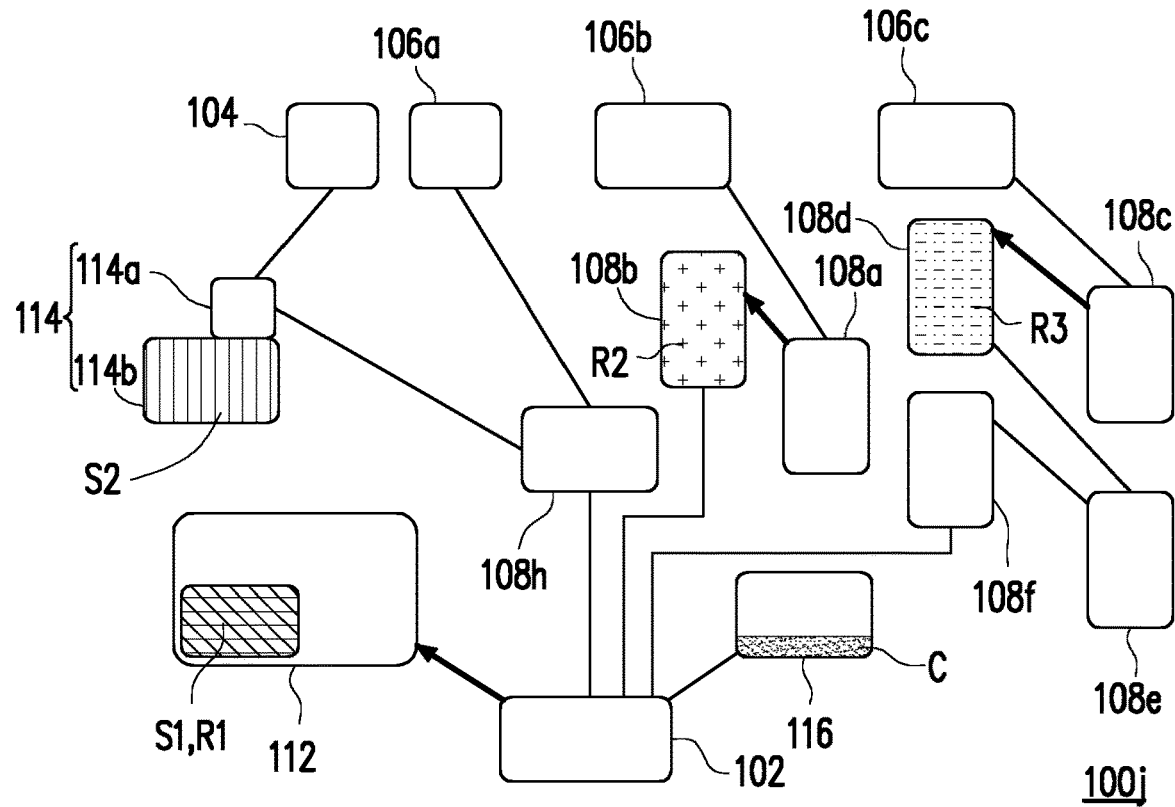
Figure 11H:
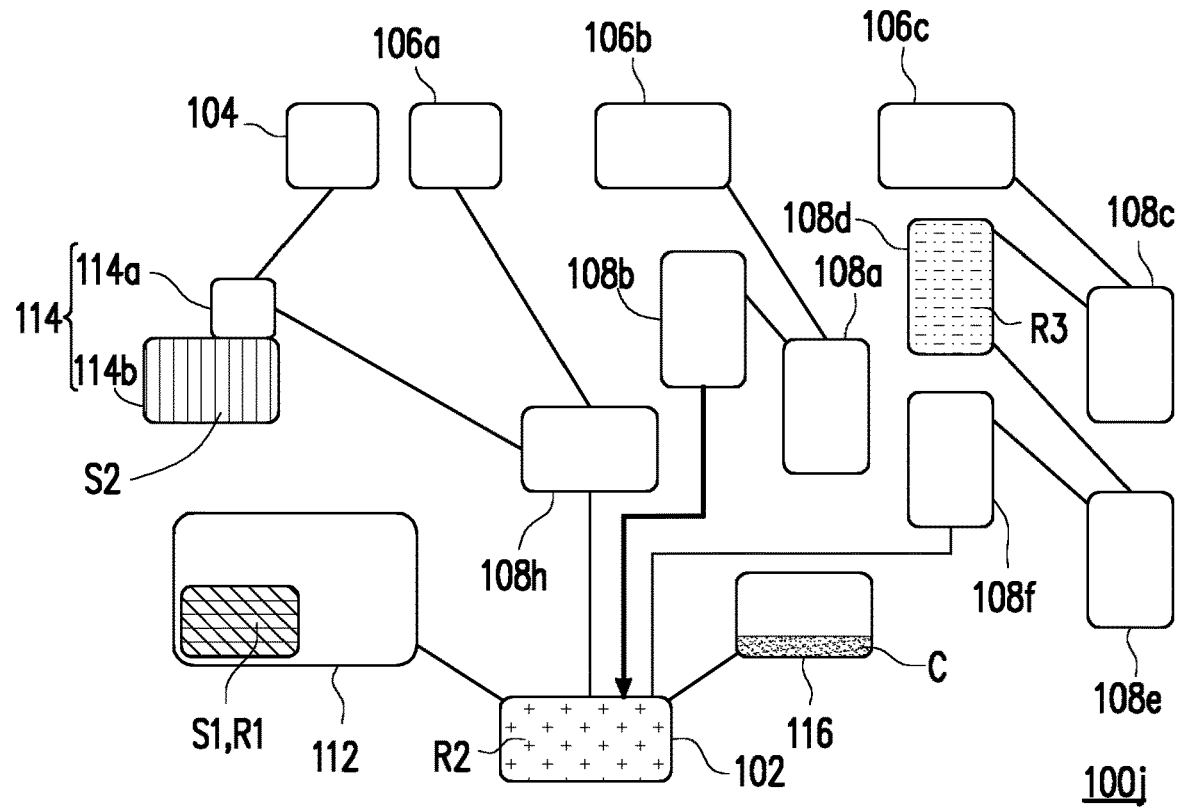
Figure 11I:
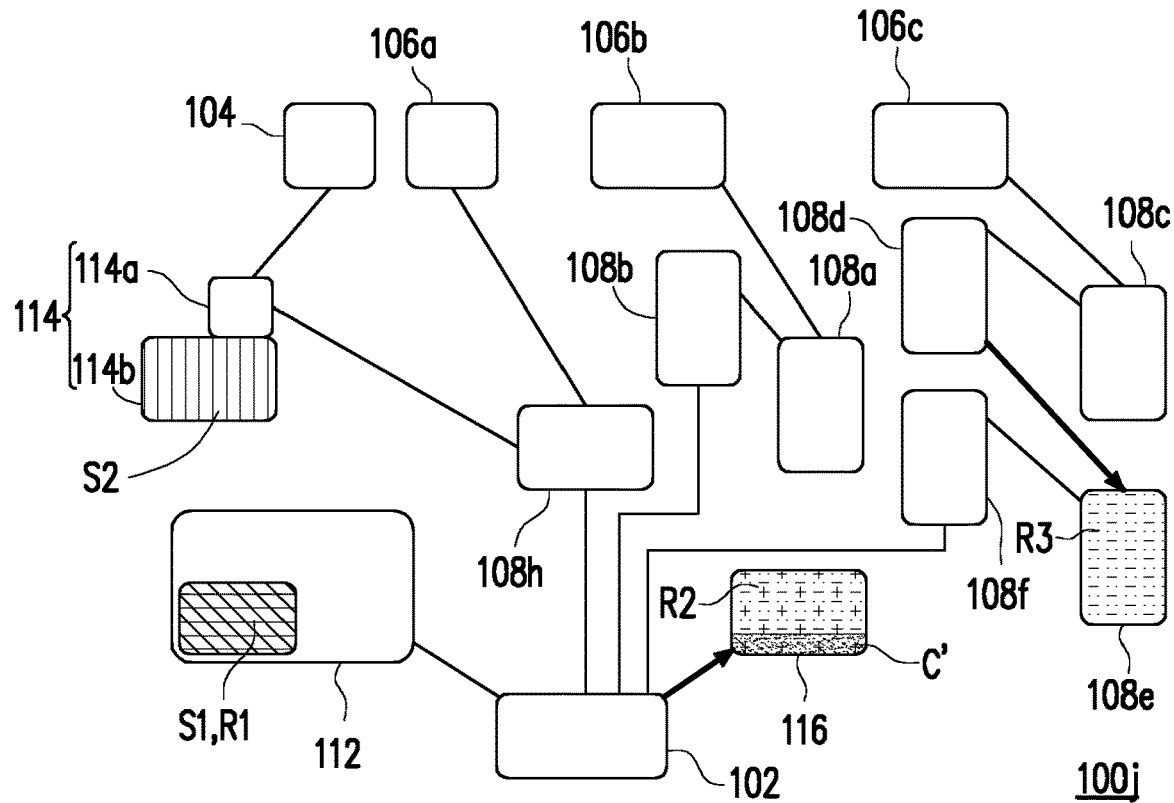
Figure 11J:
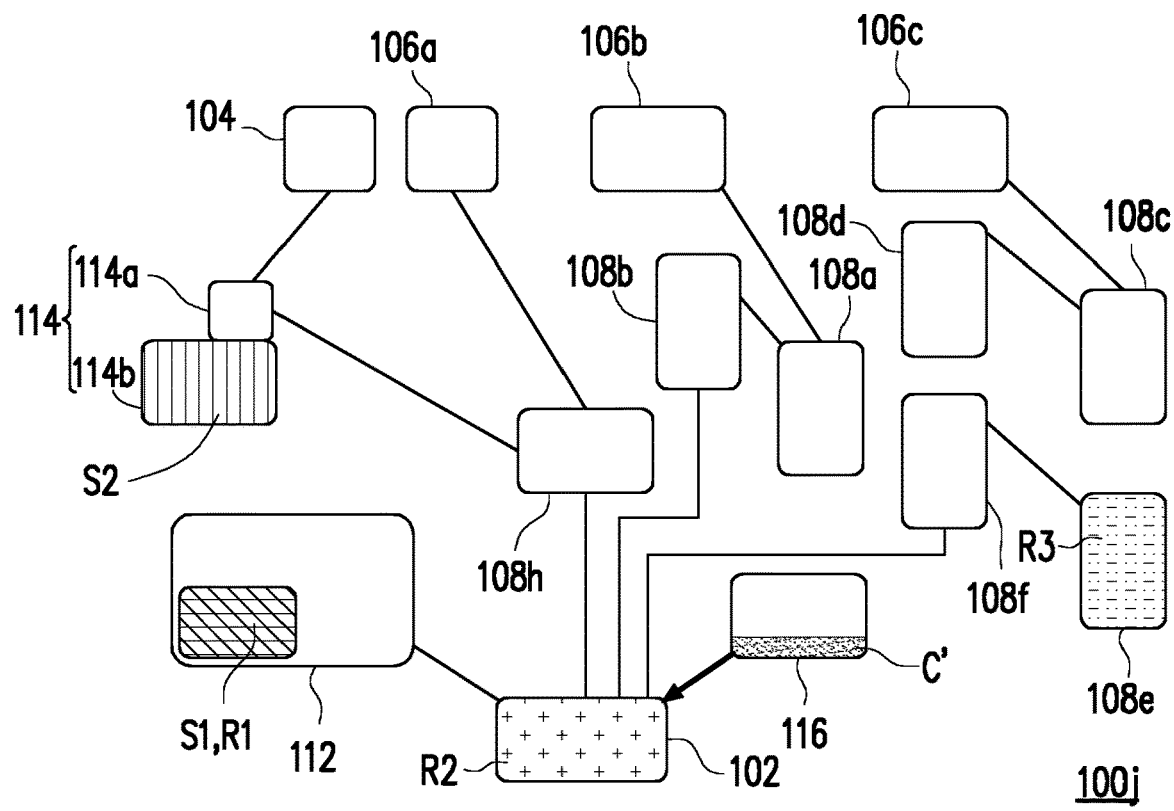
Figure 11K:
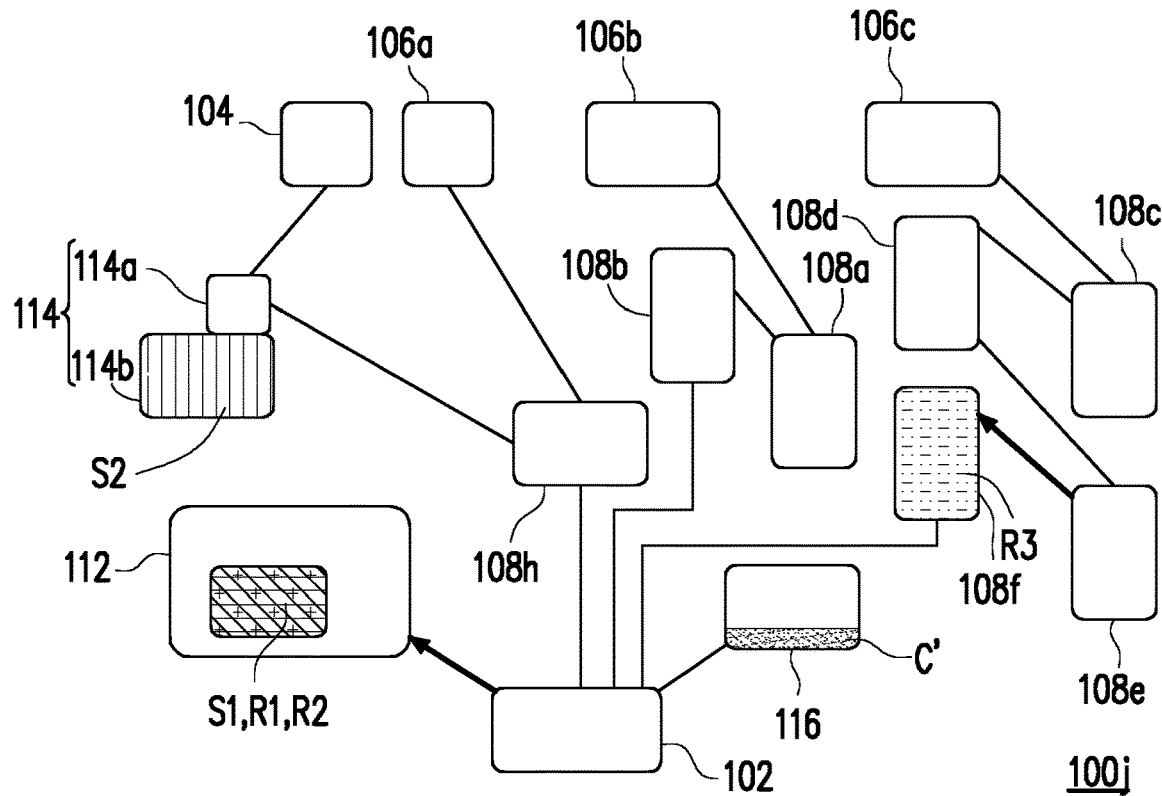
Figure 11L:
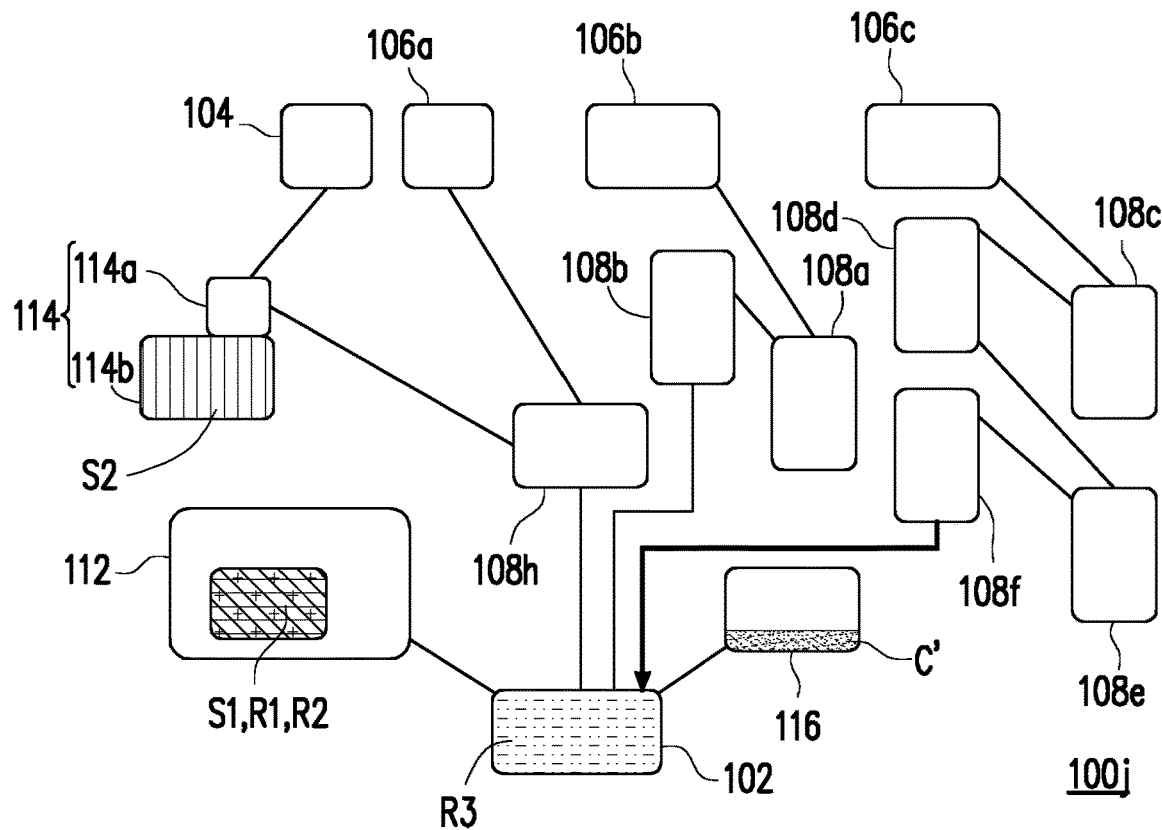
Figure 11M:
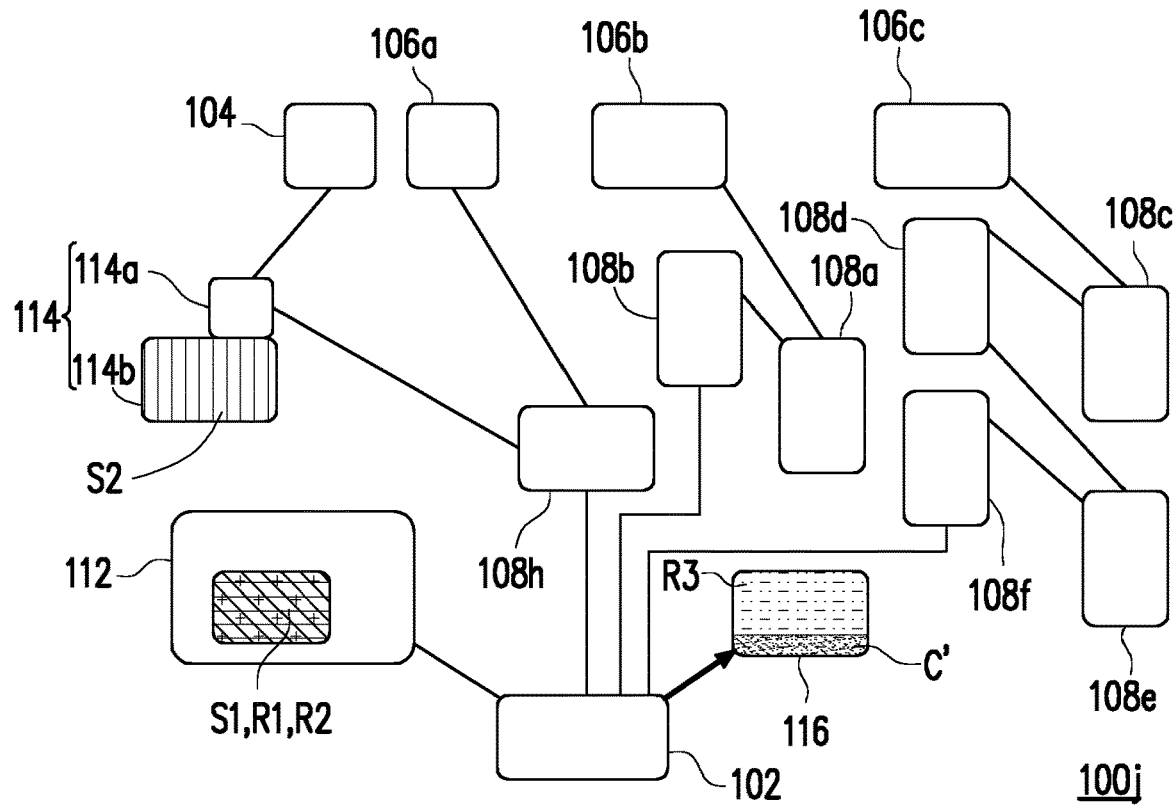
Figure 11N:
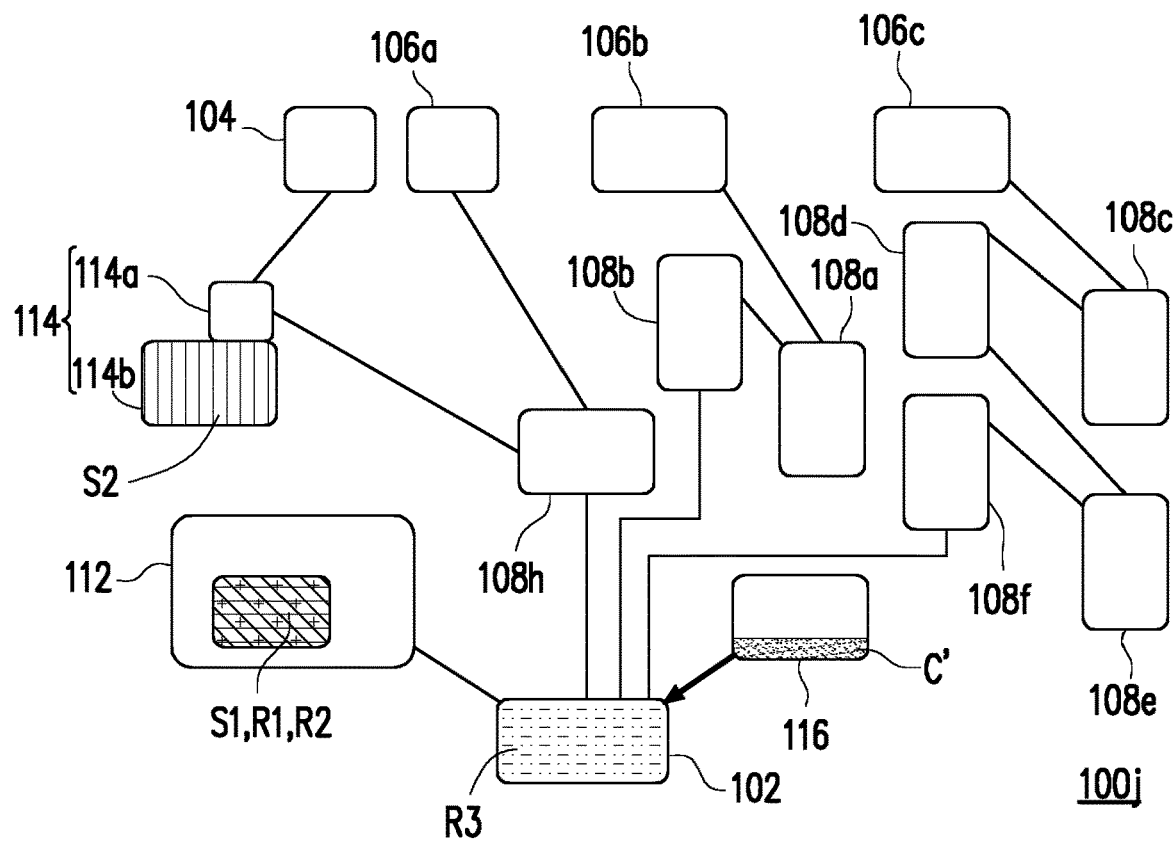

FIG. 11A to FIG. 11N are flowcharts of a detection method of another embodiment of the invention.

Referring to FIG. 4A and FIG. 11A simultaneously, the differences between a detection cartridge 100j of FIG. 11A and the detection cartridge 100c of FIG. 4A are as follows. The detection cartridge 100j further includes the centrifugal tank 114, the first temporary tank 108h, and the second temporary tank 116, and the capture unit C is connected to an inner wall (e.g., a bottom surface) of the second temporary tank 116, but the invention is not limited thereto. The composition of the capture unit C has been detailed in the embodiment of the detection cartridge 100c (FIG. 4A) and is not repeated herein.

The centrifuge tank 114 is in communication with the sample tank 104 and the detection tank 102. The centrifuge tank 114 includes a sampling portion 114a and a separation portion 114b, and the sampling portion 114a is in communication with the sample tank 104. The container 106a of the detection cartridge 100j, the sampling portion 114a of the centrifuge tank 114, and the detection tank 102 are respectively in communication with the first temporary tank 108h. Specifically, the sample tank 104, the sampling portion 114a of the centrifuge tank 114, the first temporary tank 108h, and the detection tank 102 may be sequentially disposed on the flow path of the sample tank 104 in communication with the detection tank 102. The container 106a, the detection tank 108h, and the detection tank 102 may be sequentially disposed on the first flow path. That is, the sample tank 104 of the detection cartridge 100j is in communication with the detection tank 102 via the sampling portion 114a of the centrifuge tank 114 and the first temporary tank 108h, and the container 106a is in communication with the detection tank 102 via the first temporary tank 108h. The second temporary tank 116 of the detection cartridge 100j is in communication with the detection tank 102.

Hereinafter, the detection method using the above detection cartridge 100j is described with reference to FIG. 11A to FIG. 11N.

Referring to FIG. 11A, the detection cartridge 100j is provided. The sample S is placed in the sample tank 104, and the reagents R1 to R3 are respectively placed in the containers 106a to 106c.

Referring to FIG. 11B, when the detection cartridge 100j is set to be located at a second angle of rotation (e.g., −60 degrees) and a centrifugal force is applied to the sample S and the reagents R1 to R3, the sample S flows into the centrifuge tank 114, and the reagents R1 to R3 remain in the containers 106a to 106c. At this time, after the sample S flowing into the centrifuge tank 114 is centrifuged, it is divided into two layers of samples S1 and S2 depending on the component density in the sample S. The sample S1 is located in the sampling portion 114a of the centrifuge tank 114, and the sample S2 is located in the separation portion 114b of the centrifuge tank 114. For example, the sample S is, for example, whole blood, the sample S1 is, for example, plasma, and the sample S2 is, for example, a blood cell. Those skilled in the art may know the composition of the sample S1 and the sample S2 according to the sample type and the centrifugal speed, and the invention is not limited thereto. In addition, the manner of mounting the detection cartridge 100j on the centrifuge device is provided in the foregoing embodiments and is not repeated herein.

Referring to FIG. 11C, when the detection cartridge 100j is set to be located at a third angle of rotation (e.g., 90 degrees) and a centrifugal force is applied to the samples S1 and S2 and the reagents R1 to R3, the sample S1 flows into the first temporary tank 108h, the reagent R1 flows into first temporary tank 108h, the reagent R2 flows into the first temporary tank 108a, and the reagent R3 flows into the first temporary tank 108c. In this step, the sample S1 flowing into the first temporary tank 108h is mixed with the reagent R1. At the time of centrifugation, the sample S2 in the separation portion 114b of the centrifuge tank 114 does not flow out of the separation portion 114b due to the structural design of the centrifuge tank 114 with the angle of rotation setting. In the present embodiment, the sample S2 continues to remain in the separation portion 114b of the centrifuge tank 114, and the description thereof is omitted below.

Referring to FIG. 11D, when the detection cartridge 100j is set to be located at a first angle of rotation (e.g., 0 degrees) and a centrifugal force is applied to the sample S1 and the reagents R1 to R3, the sample S1 and the reagent R1 flows into the detection tank 102, the reagent R2 remains in the first temporary tank 108a, and the reagent R3 remains in the first temporary tank 108c.

Referring to FIG. 11E, when the detection cartridge 100j is set to be located at a third angle of rotation (e.g., 90 degrees) and a centrifugal force is applied to the sample S1 and the reagents R1 to R3, the sample S1 and the reagent R1 flow into the second temporary tank 116, the reagent R2 remains in the first temporary tank 108a, and the reagent R3 remains in the first temporary tank 108c. At this time, the sample S, the reagent R1, and the capture unit C may interact to form the capture unit complicated C' connected to the second temporary tank 116. The composition of the capture unit complicated C' has been detailed in the embodiment of the detection cartridge 100c (FIG. 4B) and is not repeated herein.

Referring to FIG. 11F, when the detection cartridge 100j is set to be located at a first angle of rotation (e.g., 0 degrees) and a centrifugal force is applied to the sample S1 and the reagents R1 to R3, the sample S1 and the reagent R1 flow back into the detection tank 102, the reagent R2 remains in the first temporary tank 108a, and the reagent R3 remains in the first temporary tank 108c. In this step, the liquid is removed from the second temporary tank 116, which prevents the subsequent reaction of the capture unit complicated C' of the second temporary tank 116 from being disturbed.

Referring to FIG. 11G, when the detection cartridge 100j is set to be located at a second angle of rotation (e.g., –60 degrees) and a centrifugal force is applied to the sample S1 and the reagents R1 to R3, the sample S1 and the reagent R1 flow into the waste tank 112, the reagent R2 flows into the first temporary tank 108b, and the reagent R3 flows into the first temporary tank 108d. In this step, the liquid is removed from the detection tank 102 to avoid interference with subsequent detections.

Referring to FIG. 11H, when the detection cartridge 100j is set to be located at the first angle of rotation (e.g., 0 degrees) and a centrifugal force is applied to the sample S1 and the reagents R1 to R3, the sample S1 and the reagent R1 remain in the waste tank 112, the reagent R2 flows into the detection tank 102, and the reagent R3 remains in the first temporary tank 108d. In this step, the liquid in the waste tank 112 does not flow out of the waste tank 112 via the pathway due to the design of the pathway layout with the angle of rotation setting.

Referring to FIG. 11I, when the detection cartridge 100j is set to be located at a third angle of rotation (e.g., 90 degrees) and a centrifugal force is applied to the sample S1 and the reagents R1 to R3, the sample S1 and the reagent R1 remain in the waste tank 112, the reagent R2 flows into the second temporary tank 116, and the reagent R3 flows into the first temporary tank 108e. In an embodiment, the reagent R2 flowing into the second temporary tank 116 may react with the capture unit complicated C'. In another embodiment, the reagent R2 may be a cleaning solution or buffer that does not react with the capture unit complicated C'.

Referring to FIG. 11J, when the detection cartridge 100j is set to be located at the first angle of rotation (e.g., 0 degrees) and a centrifugal force is applied to the sample S1 and the reagents R1 to R3, the sample S1 and the reagent R1 remain in the waste tank 112, the reagent R2 flows back into the detection tank 102, and the reagent R3 remains in the first temporary tank 108e. In this step, the liquid is removed from the second temporary tank 116, which prevents the subsequent reaction of the capture unit complicated C' of the second temporary tank 116 from being disturbed.

Referring to FIG. 11K, when the detection cartridge 100j is set to be located at the second angle of rotation (e.g., –60 degrees) and a centrifugal force is applied to the sample S1 and the reagents R1 to R3, the sample S1 and the reagent R1 remain in the waste tank 112, the reagent R2 flows into the waste tank 112, and the reagent R3 flows into the first temporary tank 108f. In this step, the liquid is removed from the detection tank 102 to avoid interference with subsequent detections.

Referring to FIG. 11L, when the detection cartridge 100j is set to be located at the first angle of rotation (e.g., 0 degrees) and a centrifugal force is applied to the sample S1 and the reagents R1 to R3, the sample S1 and the reagents R1 and R2 remain in the waste tank 112, and the reagent R3 flows into the detection tank 102.

Referring to FIG. 11M, when the detection cartridge 100j is set to be located at the third angle of rotation (e.g., 90 degrees) and a centrifugal force is applied to the sample S1 and the reagents R1 to R3, the sample S1 and the reagents R1 and R2 remain in the waste tank 112, and the reagent R3 flows into the second temporary tank 116. In this step, the reagent R3 flowing into the second temporary stank 116 may be reacted with the capture unit complicated C' to form a test object. For the composition of the test object, reference may be made to the foregoing embodiments, and the description thereof is not repeated herein. The test object is located in the reagent R3.

Referring to FIG. 11N, when the detection cartridge 100j is set to be located at the first angle of rotation (e.g., 0 degrees) and a centrifugal force is applied to the sample S1 and the reagents R1 to R3, the sample S1 and the reagents R1 and R2 remain in the waste tank 112, and the reagent R3 flows back into the detection tank 102.

Next, the test object contained in the liquid in the detection tank 102 is detected to obtain a detection result.

It may be seen from the above that the step of the reagents R1 to R3 flowing into the detection tank 102 via the first flow path, the second flow path, and the third flow path respectively may include the following steps. The reagent R1 in the first flow path is made to flow into the detection tank 102. The reagent R1 in the detection tank 102 is made to flow into the second temporary tank 116. The reagent R1 in the second temporary tank 116 is returned to the detection tank 102. The reagent R1 of the detection tank 102 is made to flow into the waste tank 112. The reagent R2 in the second flow path is made to flow into the detection tank 102. The reagent R2 in the detection tank 102 is made to flow into the second temporary tank 116. The reagent R2 in the second temporary tank 116 is returned to the detection tank 102. The reagent R2 of the detection tank 102 is made to flow into the waste tank 112. The reagent R3 in the third flow path is made to flow into the detection tank 102. The reagent R3 in the detection tank 102 is made to flow into the second temporary tank 116. The reagent R3 in the second temporary tank 116 is returned to the detection tank 102.

Based on the above embodiments, in the detection cartridge 100*i*, the detection method, and the detection device, since the detection cartridge 100*i* has the second temporary tank 116 and the capture unit C is connected to the second temporary tank 116, the reagents R1 to R3 all flow through the detection tank before reacting with the capture unit complicated C'. Therefore, the numerical changes of the reagents R1 to R3 before and after the reaction may be respectively measured to obtain a dynamic detection result, thereby improving the accuracy of the detection.

Figure 12A:
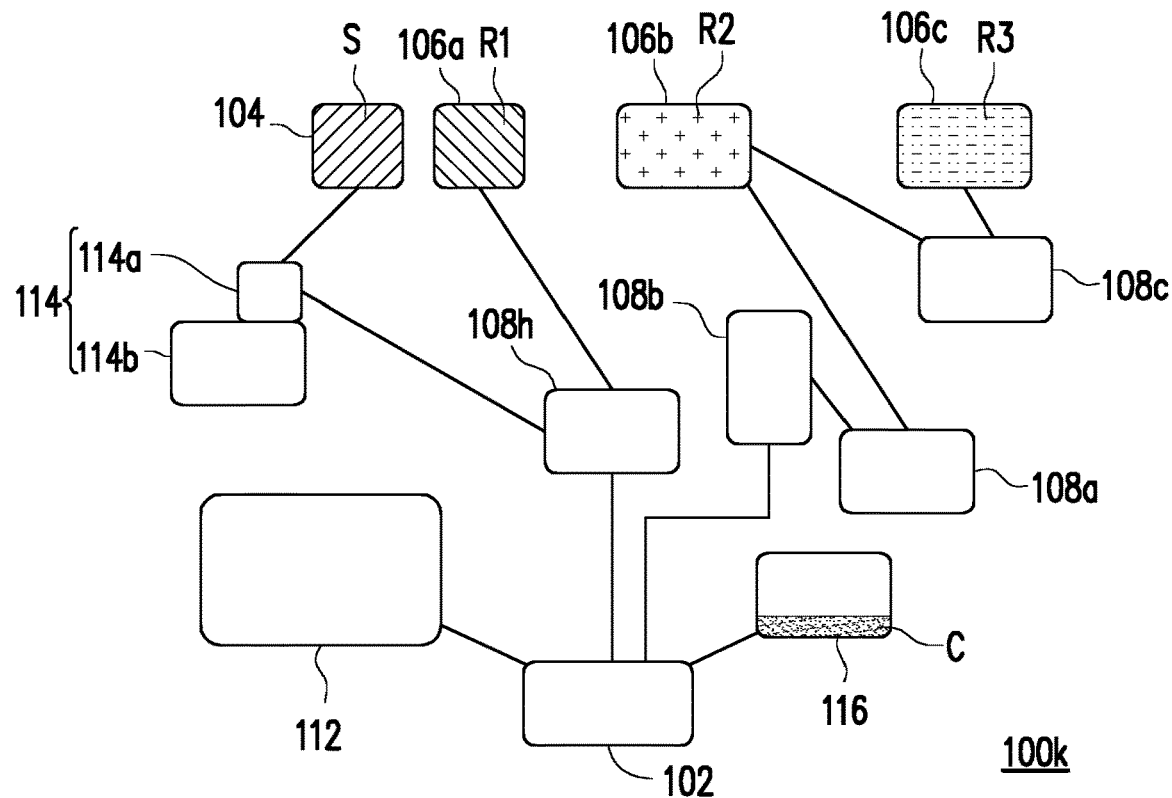
FIG. 12A to FIG. 12N are flowcharts of a detection method of another embodiment of the invention.
Figure 12B:
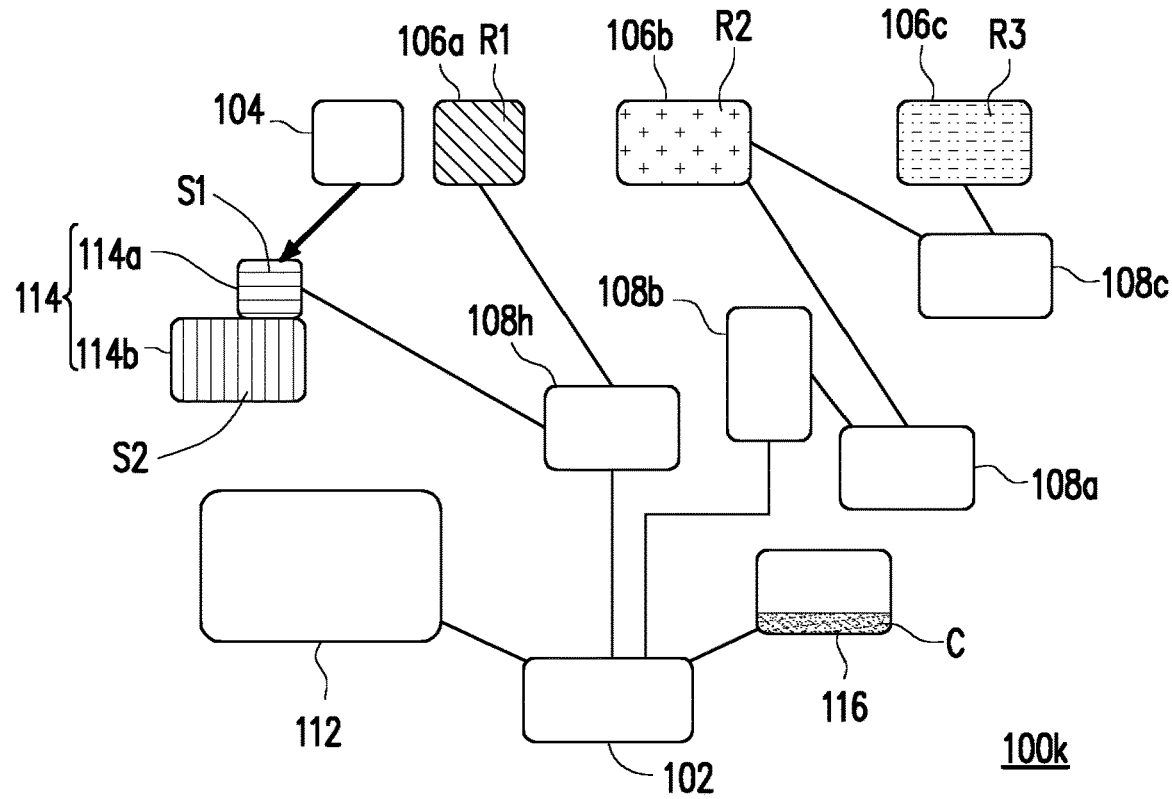
Figure 12C:
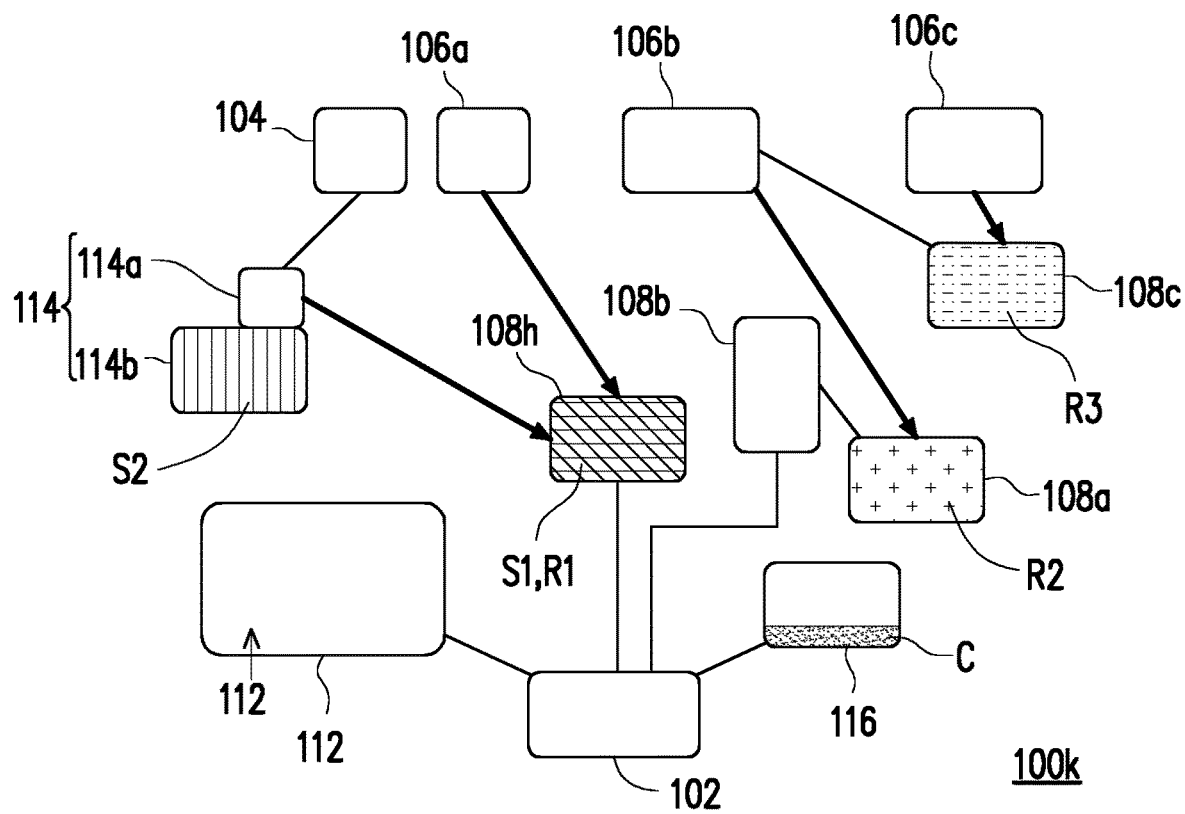
Figure 12D:
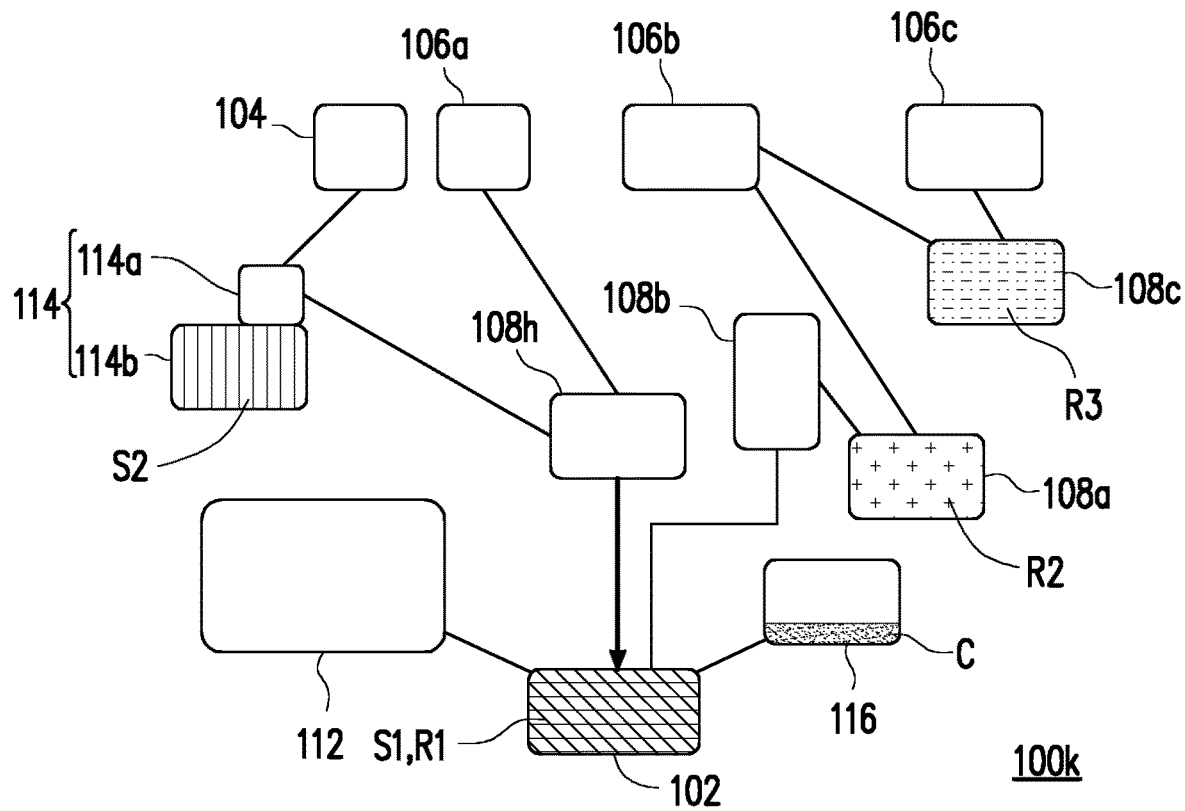
Figure 12E:
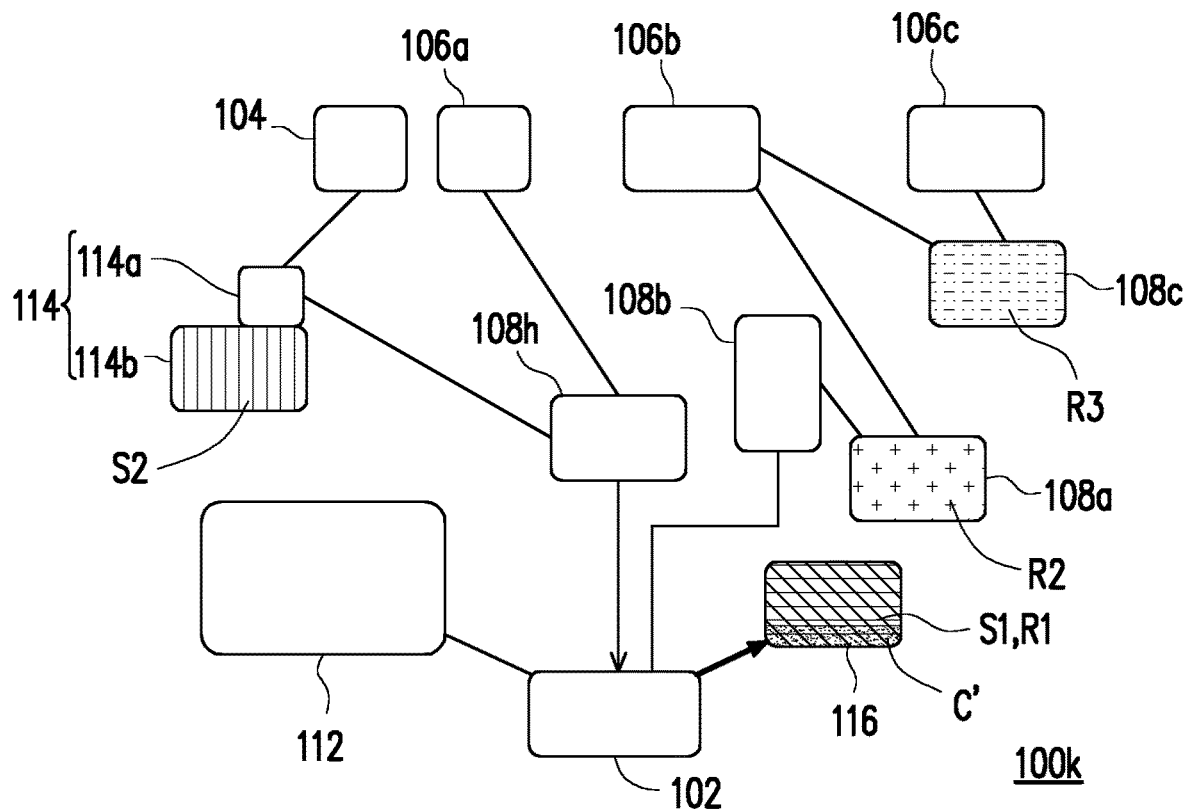
Figure 12F:
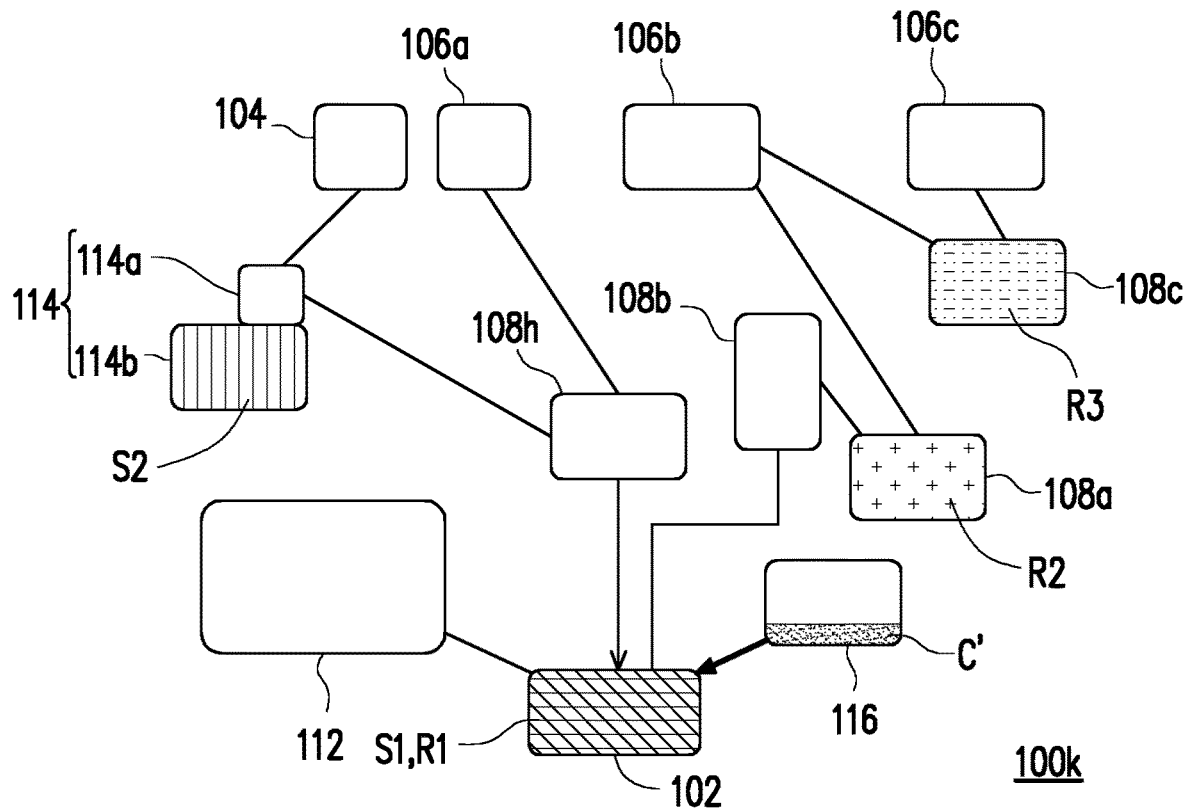
Figure 12G:
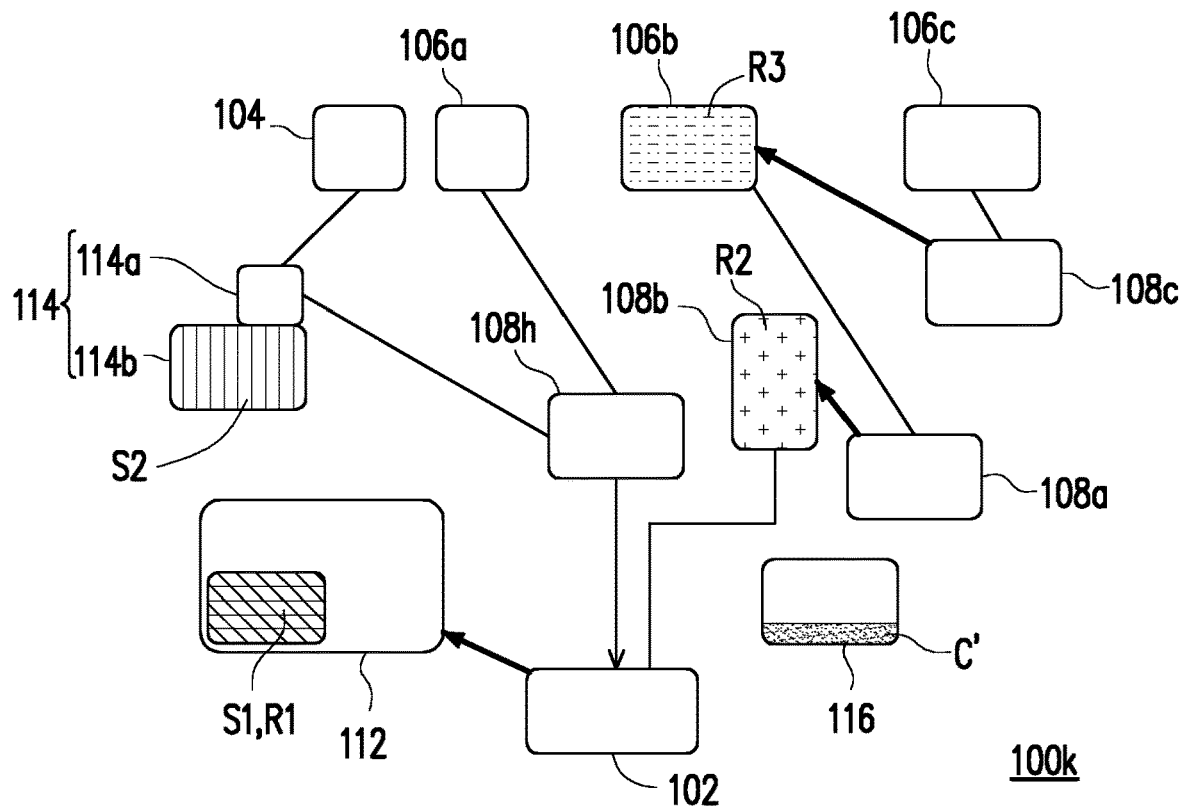
Figure 12H:
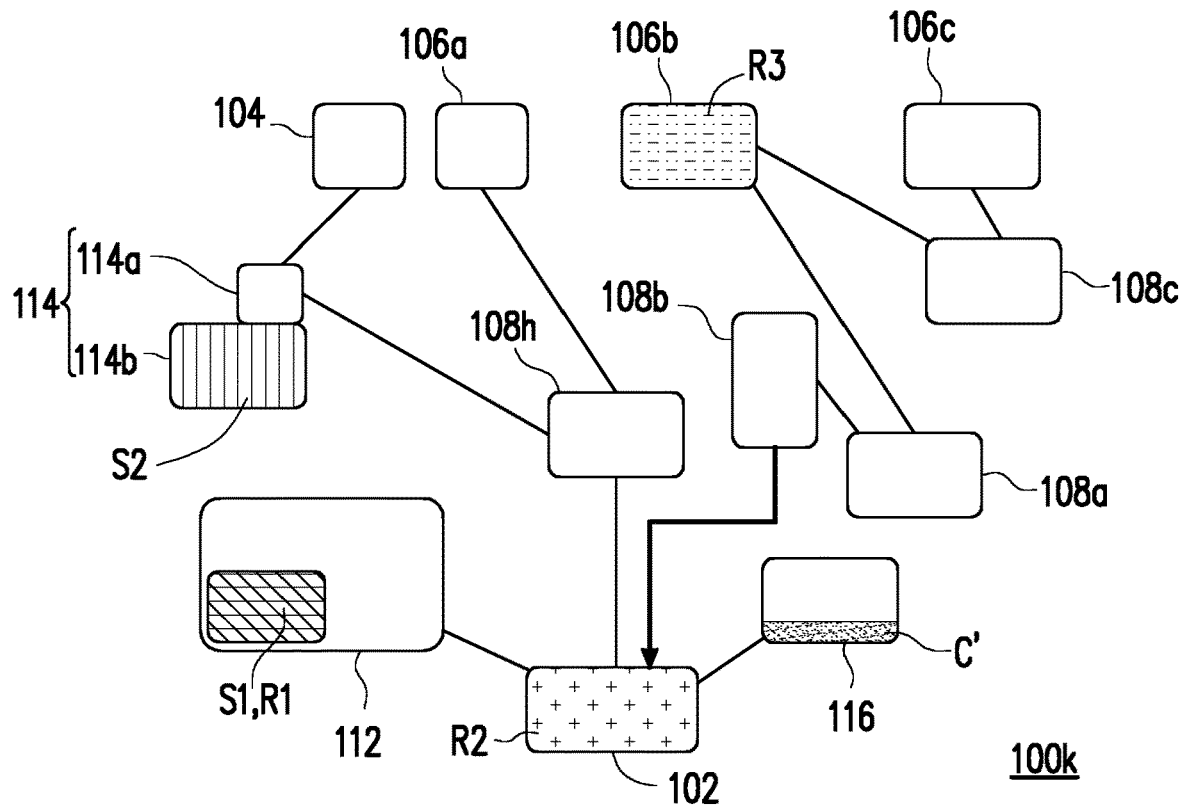
Figure 12I:
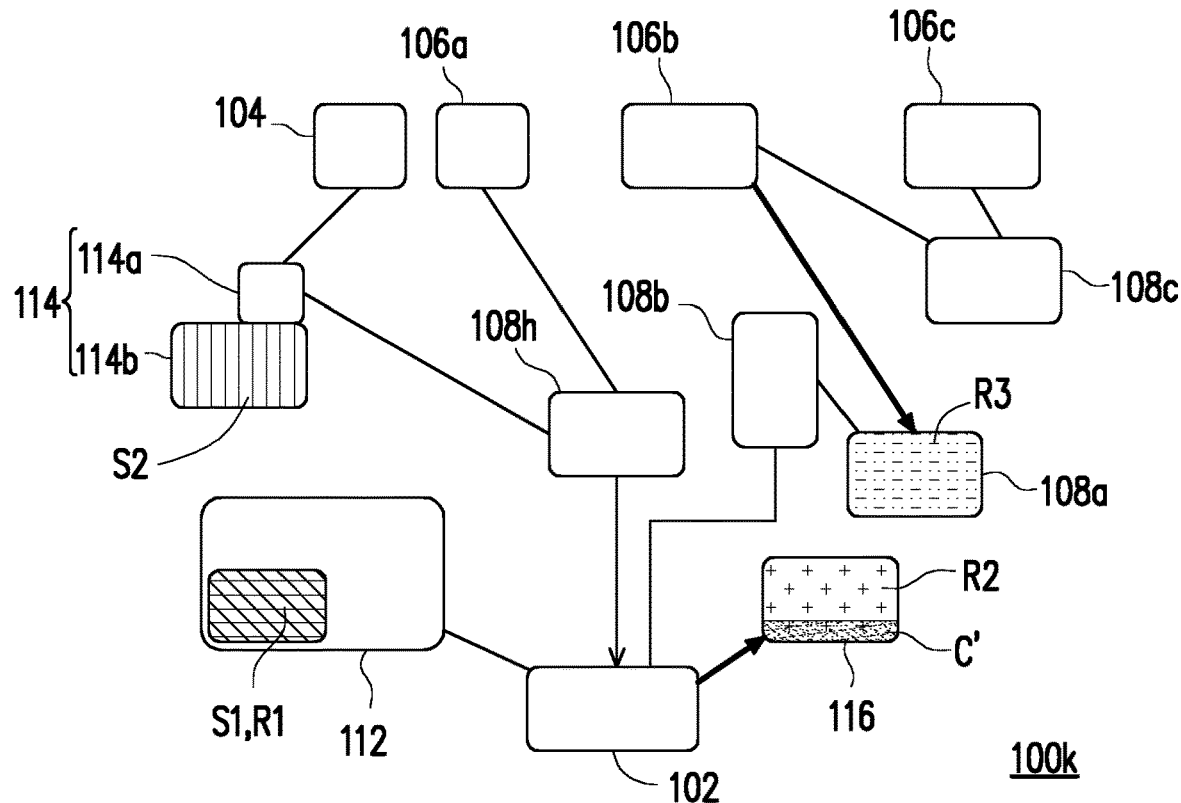
Figure 12J:
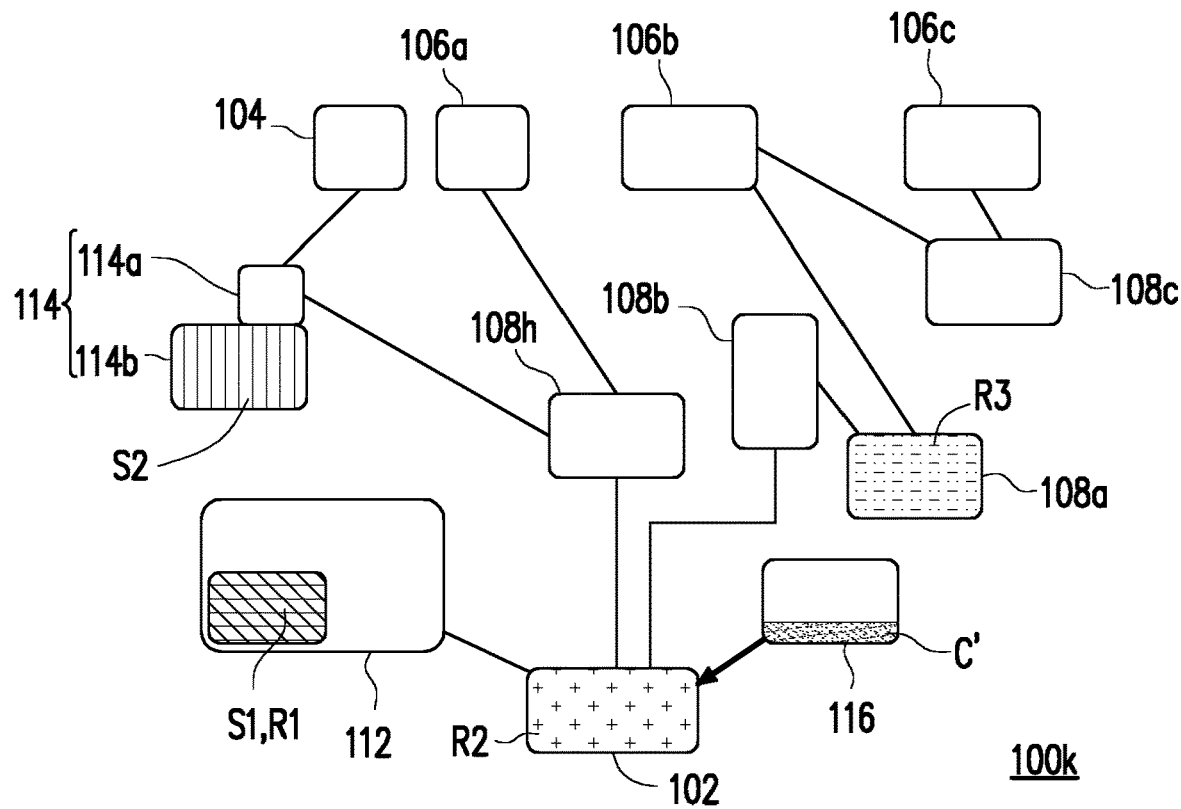
Figure 12K:
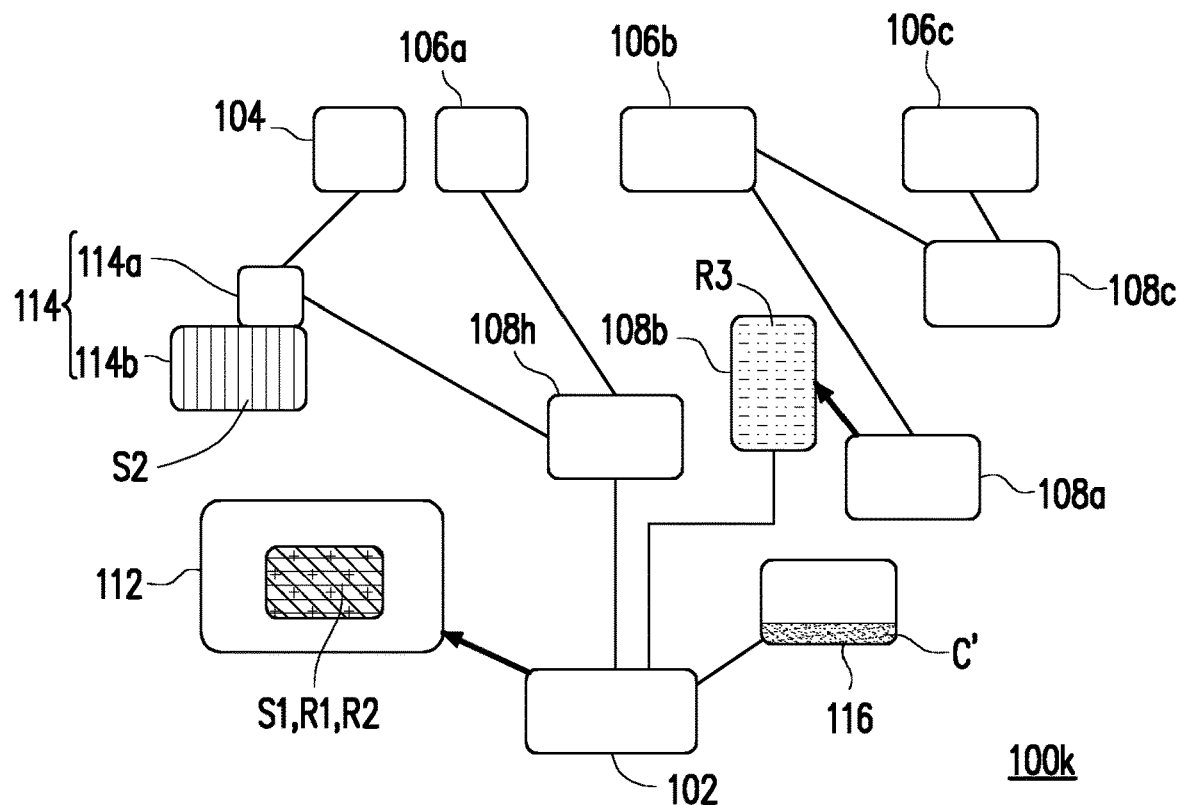
Figure 12L:
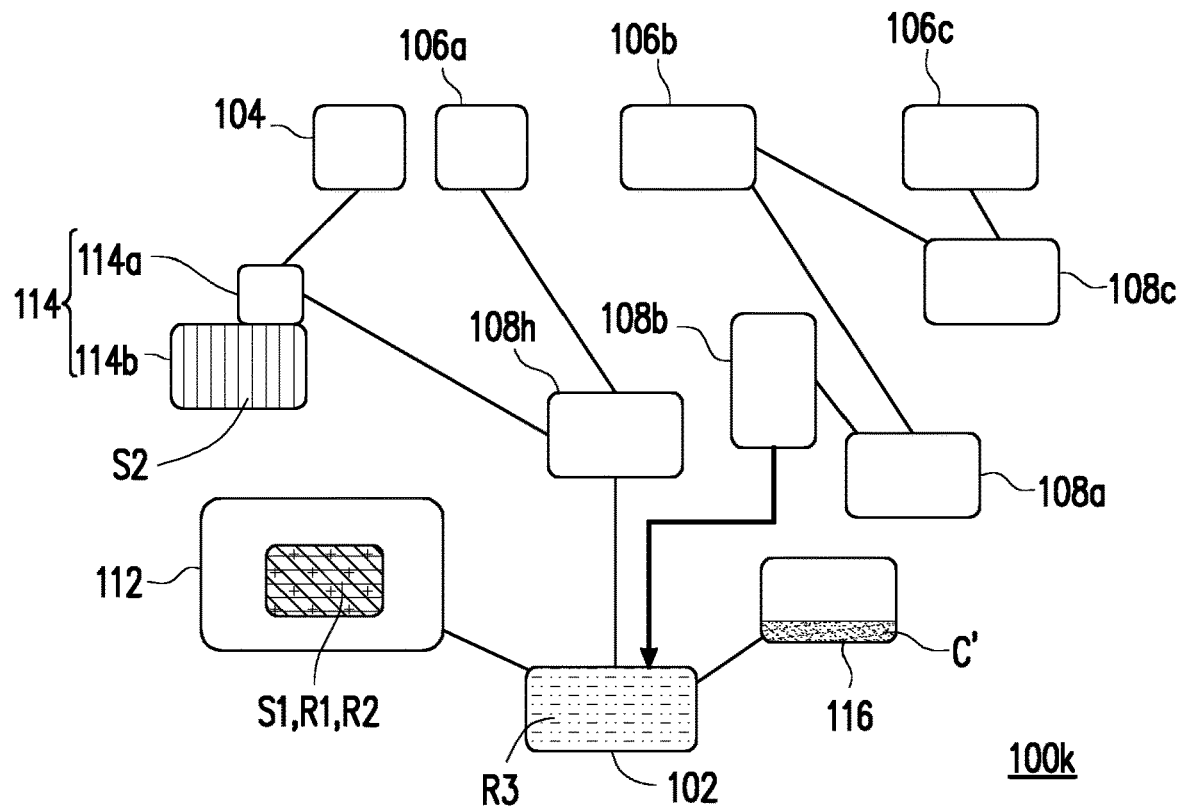
Figure 12M:
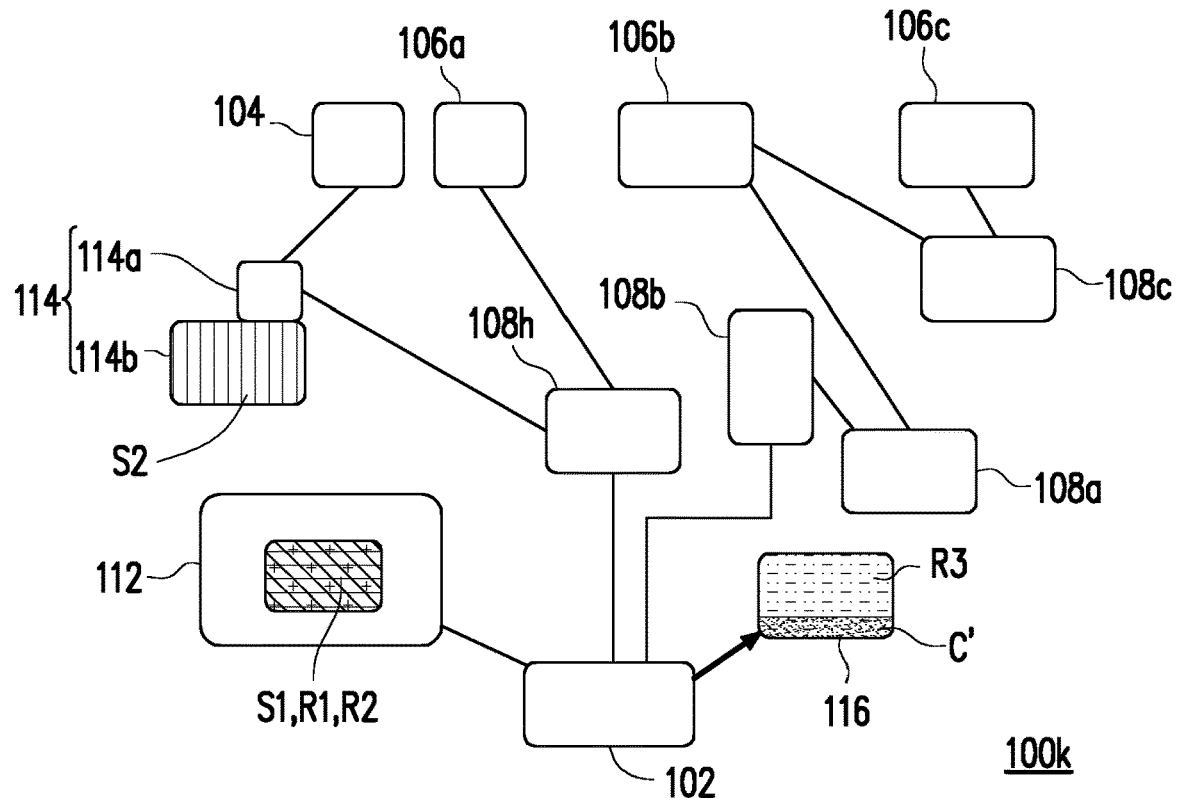
Figure 12N:
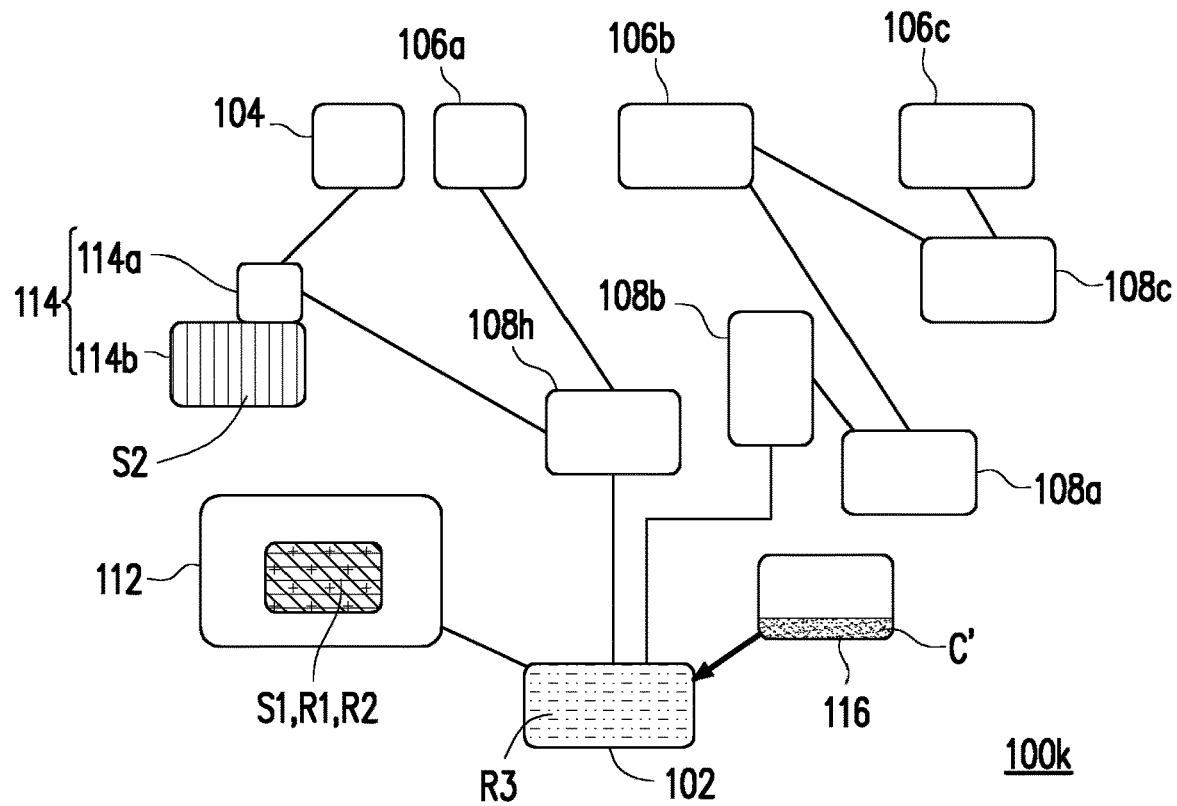

FIG. 12A to FIG. 12N are flowcharts of a detection method of another embodiment of the invention.

Referring to FIG. 11A and FIG. 12A simultaneously, the differences between a detection cartridge 100*k* of FIG. 12A and the detection cartridge 100*j* of FIG. 11A are as follows. The detection cartridge 100*k* does not have the first temporary tanks 108*d* to 108*f* in the detection cartridge 100*j*, and the second flow path and the third flow path of the detection cartridge 100*k* may have a shared path. Further, in the detection cartridge 100*k*, the container 106*b* is located on a shared path between the first temporary tank 108*c* and the detection tank 102. In detail, the first temporary tank 108*c* of the detection cartridge 100*k* is in communication with the container 106*b*, and the second flow path and the third flow path share the path from the container 106*b* to the detection tank 102.

Hereinafter, the detection method using the above detection cartridge 100*k* is described with reference to FIG. 12A to FIG. 12N.

Referring to FIG. 11A to FIG. 11N and FIG. 12A to FIG. 12N simultaneously, when the detection cartridge 100*k* is used for detection, the angle of rotation at which the detection cartridge 100*k* is located is the same as that of the detection cartridge 100*j*. The differences between the detection method of FIG. 12A to FIG. 12N and the detection method of FIG. 11A to FIG. 11N are as follows. After the reagent R3 flows to the first temporary tank 108*c* (FIG. 12C), it will remain in the first temporary tank 108*c* (FIG. 12D to FIG. 12F), then first flows into the container 106*b* (FIG. 12G), and then flows into the detection tank 102 via the shared path of the second flow path and the third flow path (i.e., the path from the container 106*b* to the detection tank 102) (FIG. 12H to FIG. 12L).

Based on the above embodiments, in the detection cartridge 100*k*, the detection method, and the detection device of the above embodiments, since the second flow path and the third flow path of the detection cartridge 100*k* have a shared path, the quantity of the temporary tanks required for the detection cartridge 100*k* may be reduced, thereby simplifying the complicatedity of the detection cartridge process.

Figure 13A:
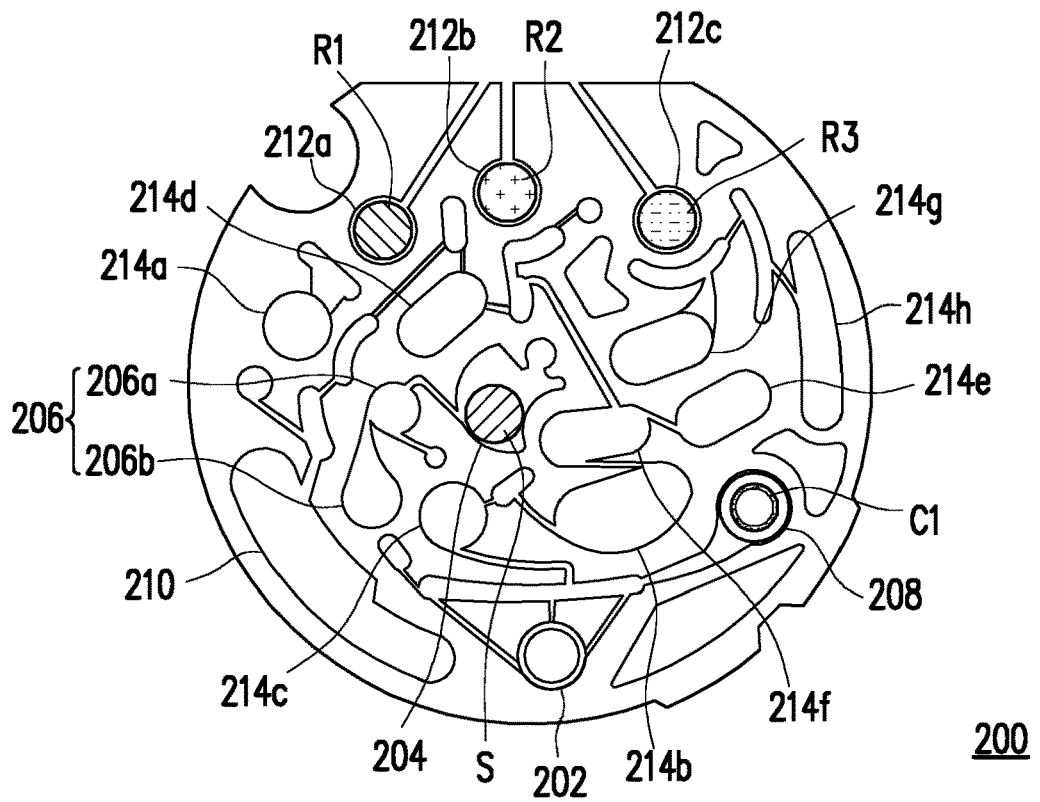
FIG. 13A to FIG. 13Q are flowcharts of a detection method of another embodiment of the invention.
Figure 13B:
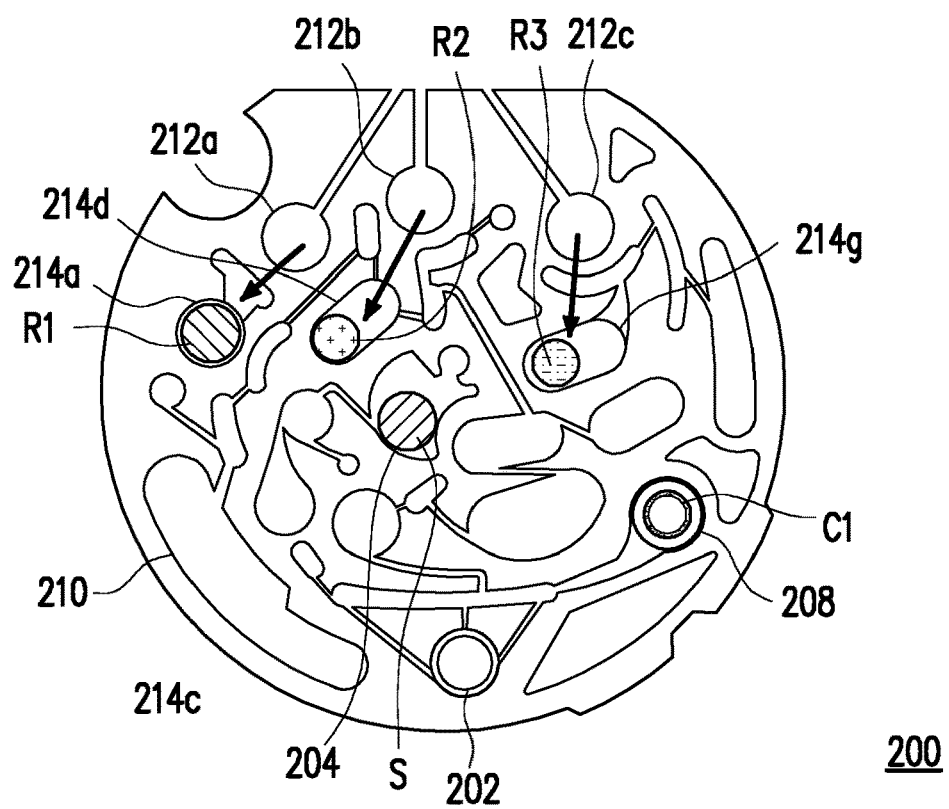
Figure 13C:
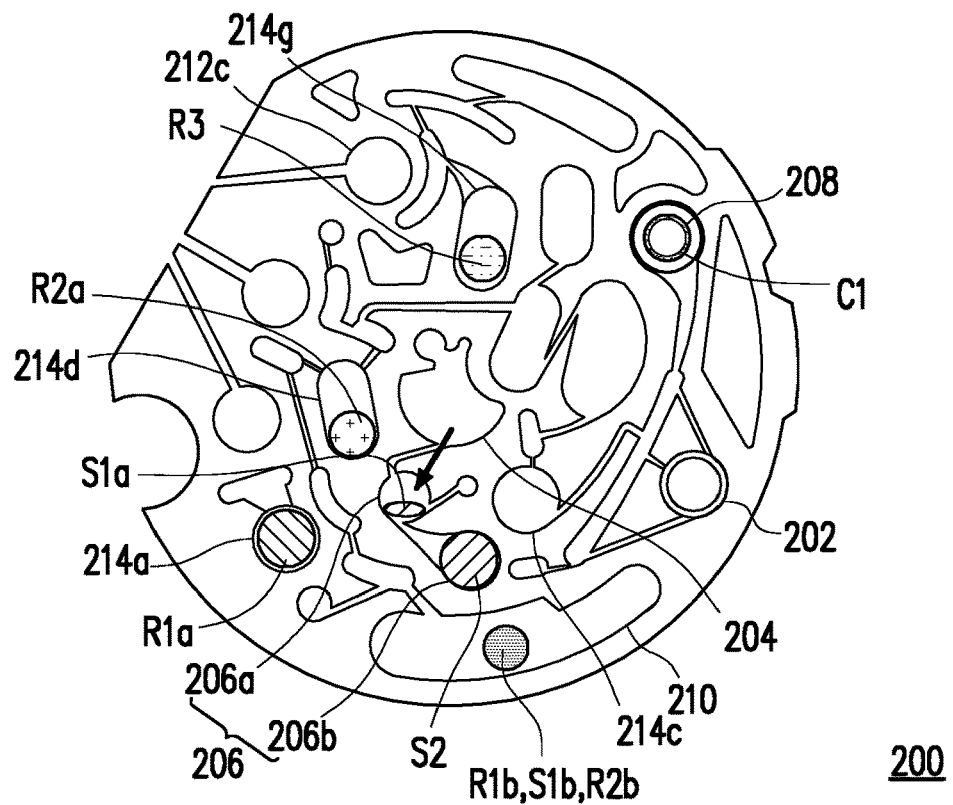
Figure 13D:
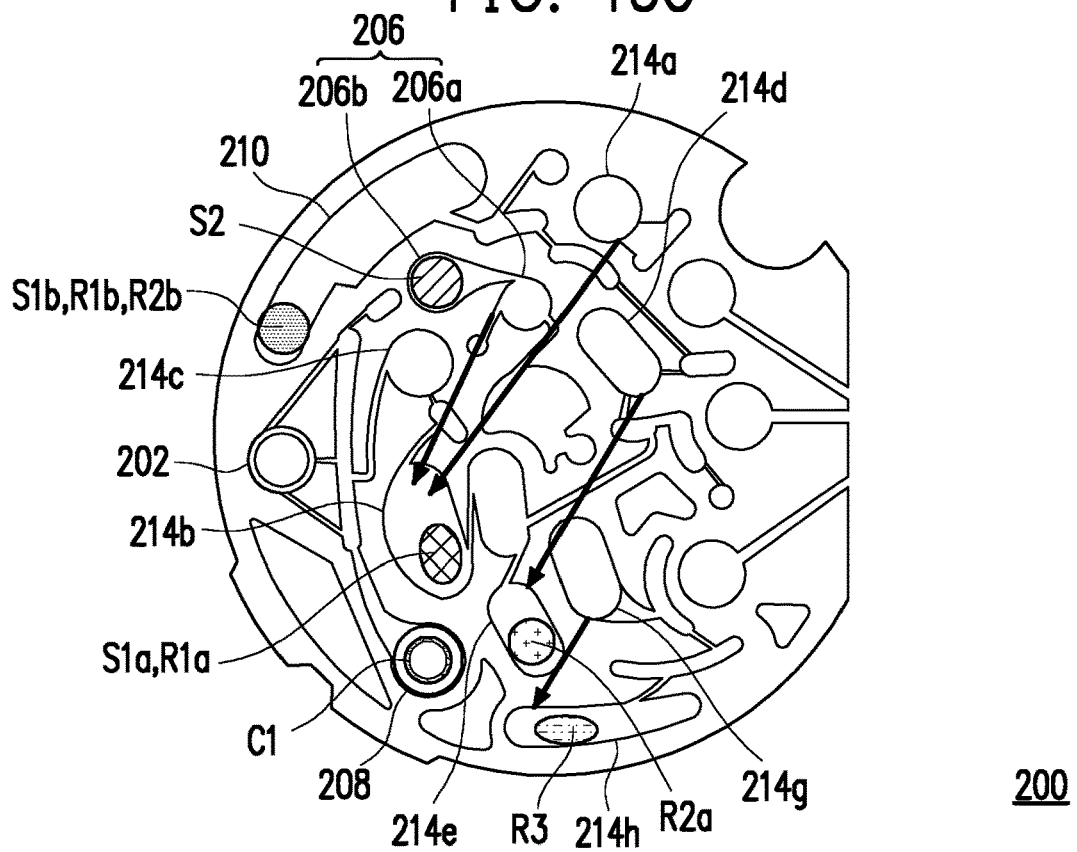
Figure 13E:
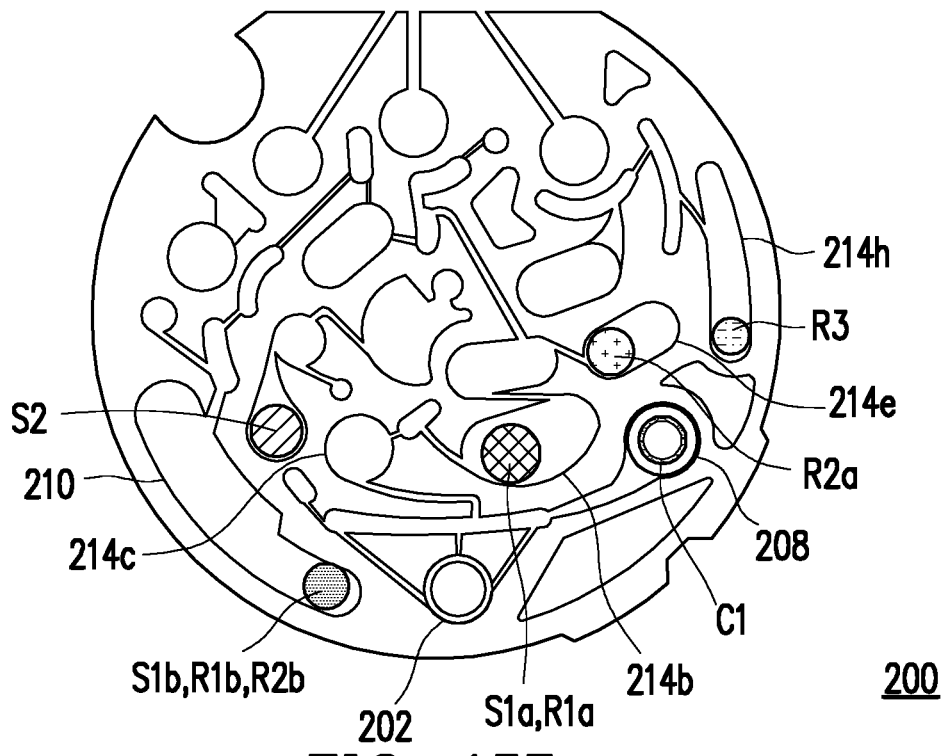
Figure 13F:
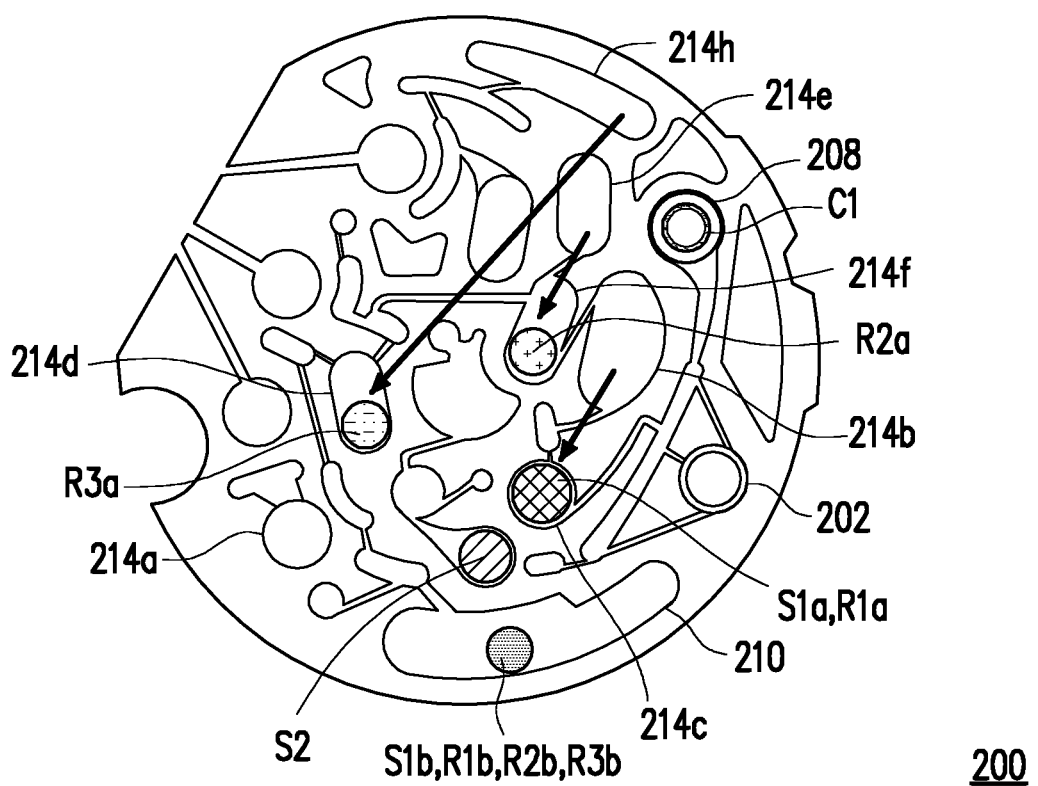
Figure 13G:
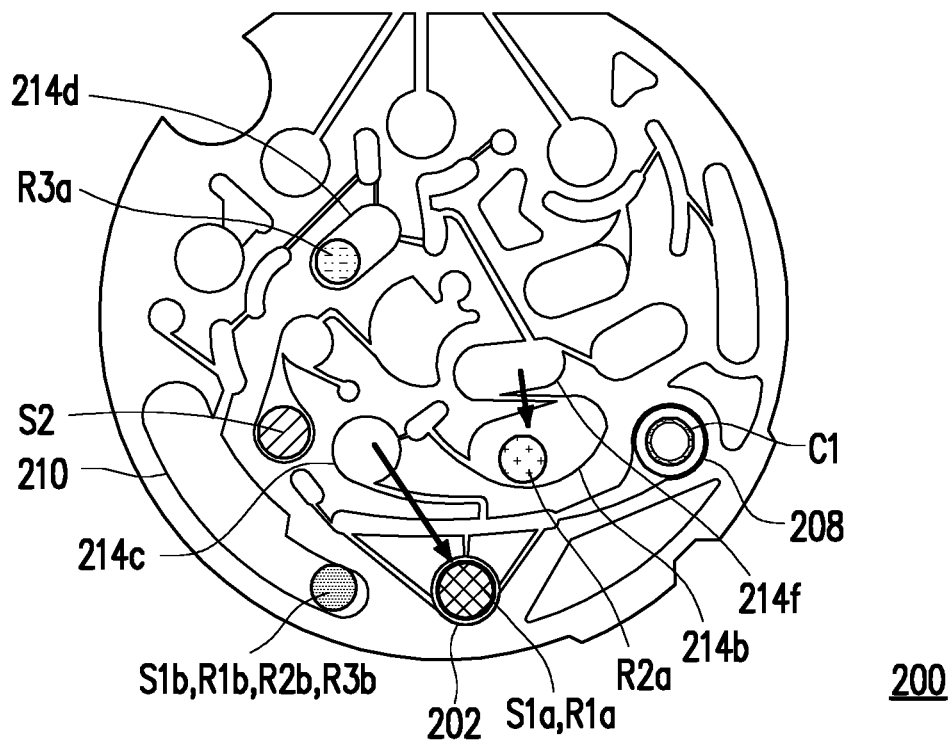
Figure 13H:
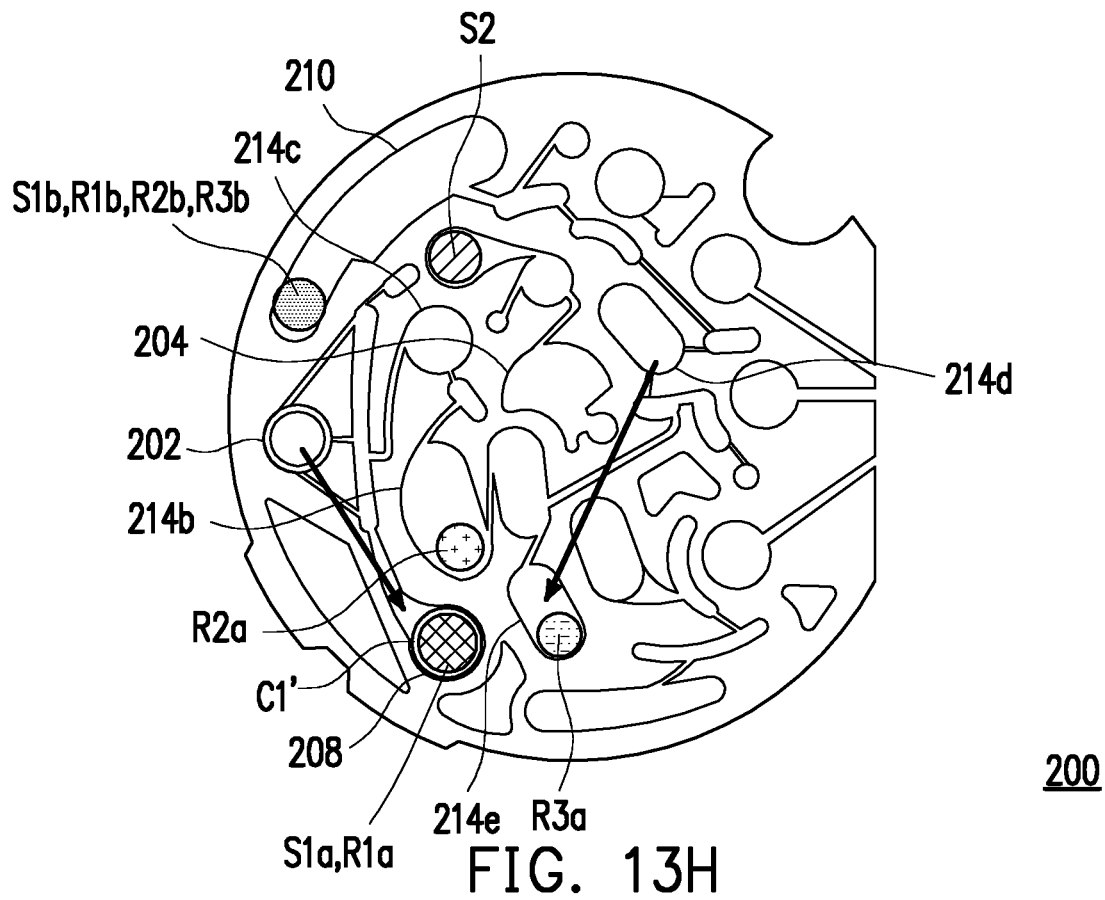
Figure 13I:
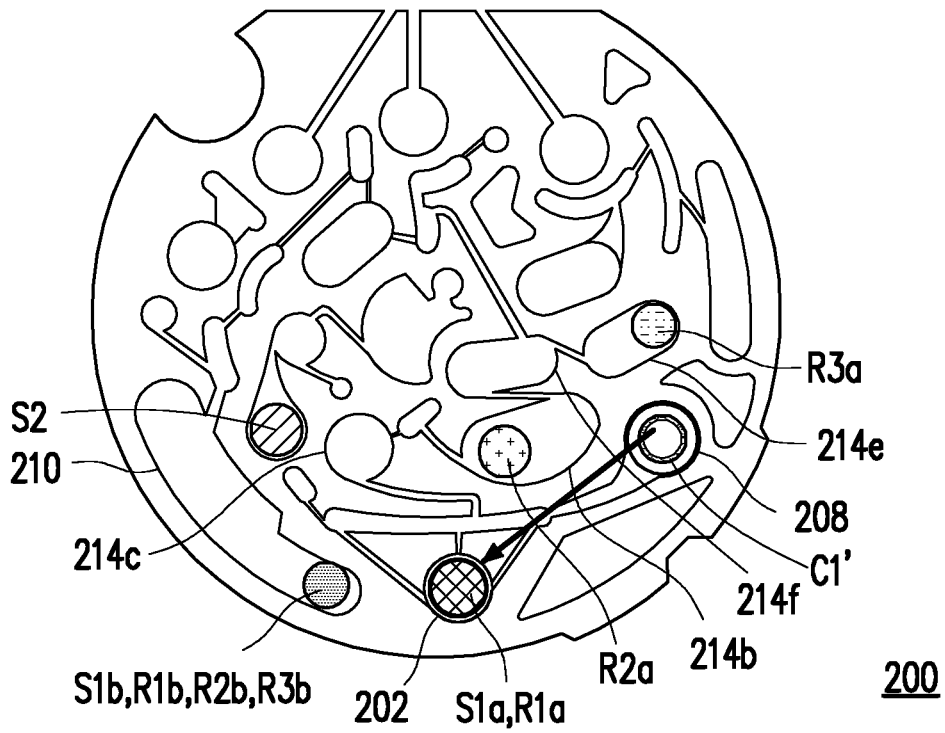
Figure 13J:
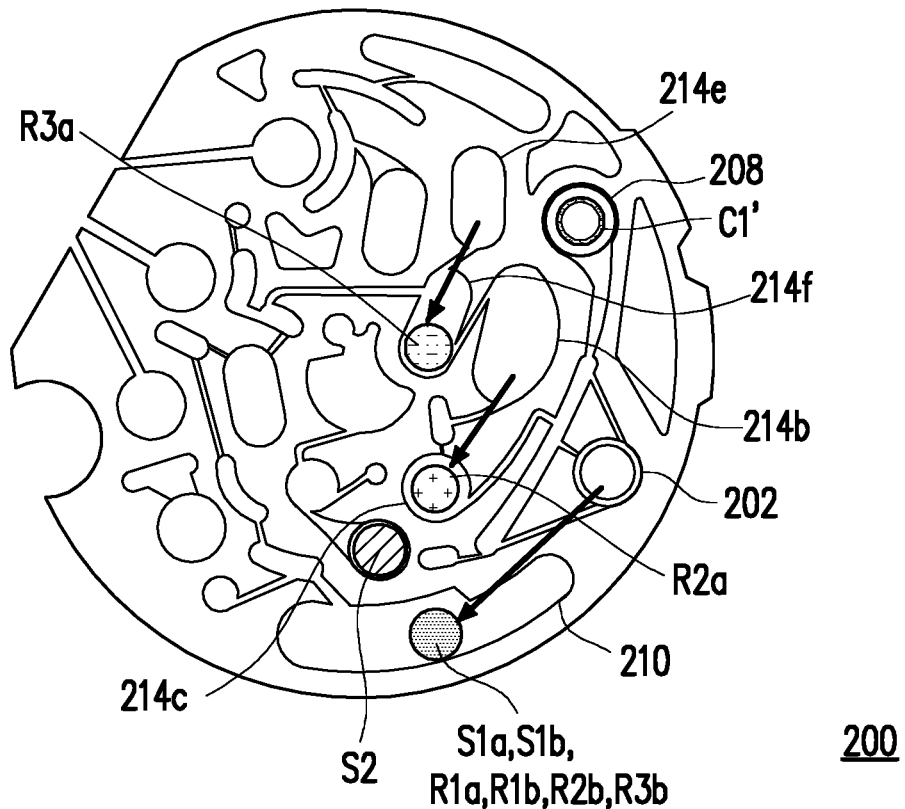
Figure 13K:
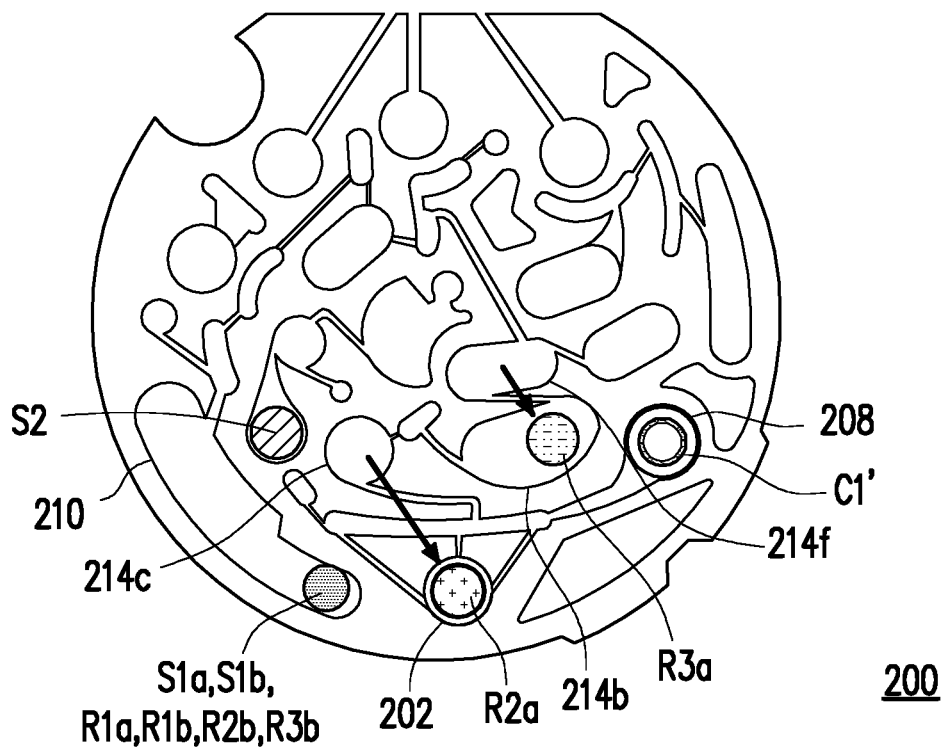
Figure 13L:
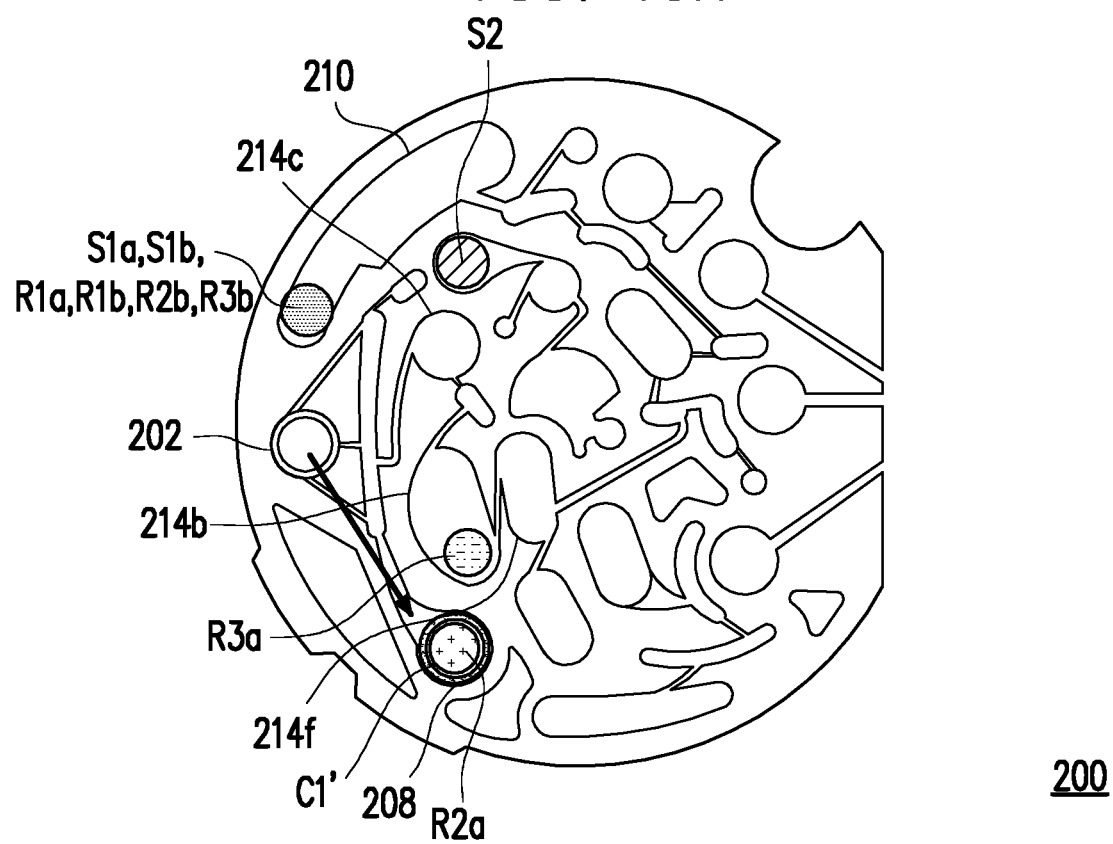
Figure 13M:
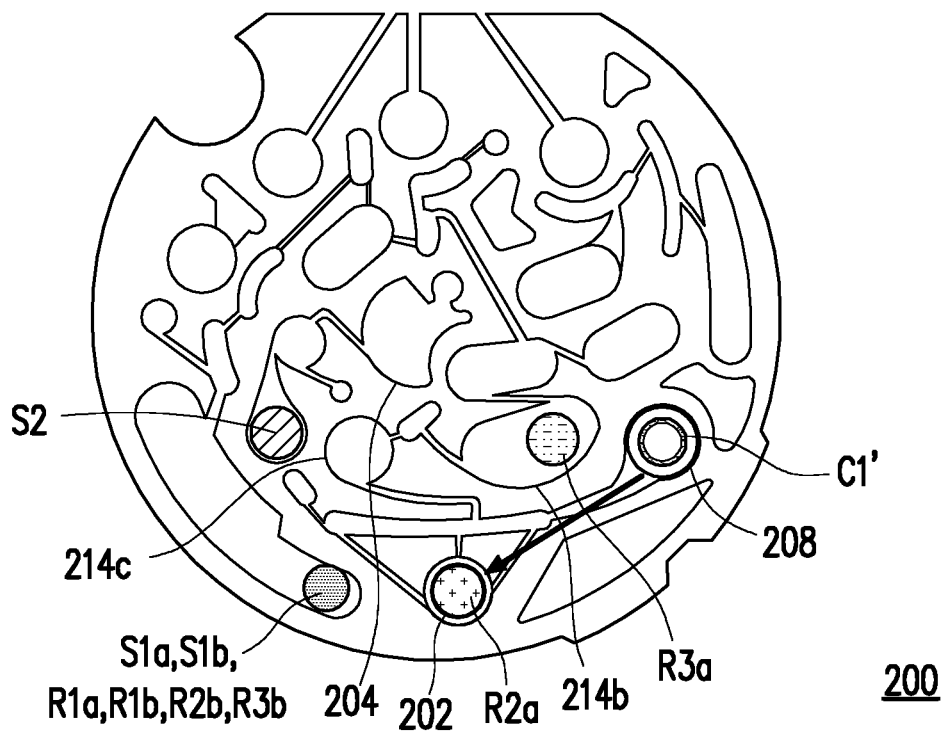
Figure 13N:
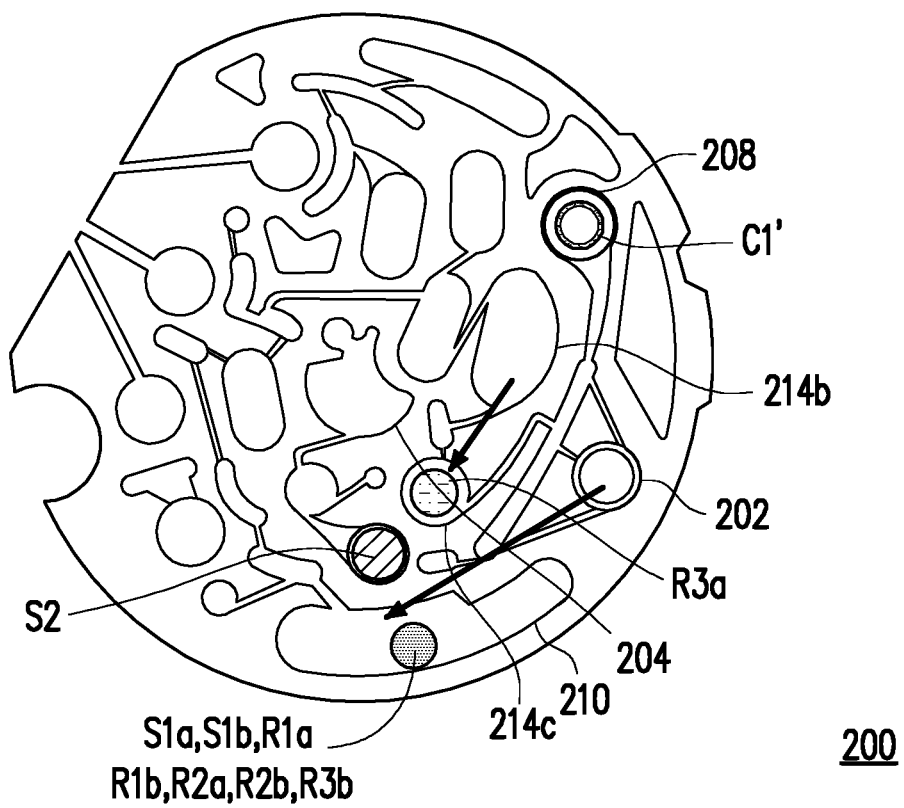
Figure 13O:
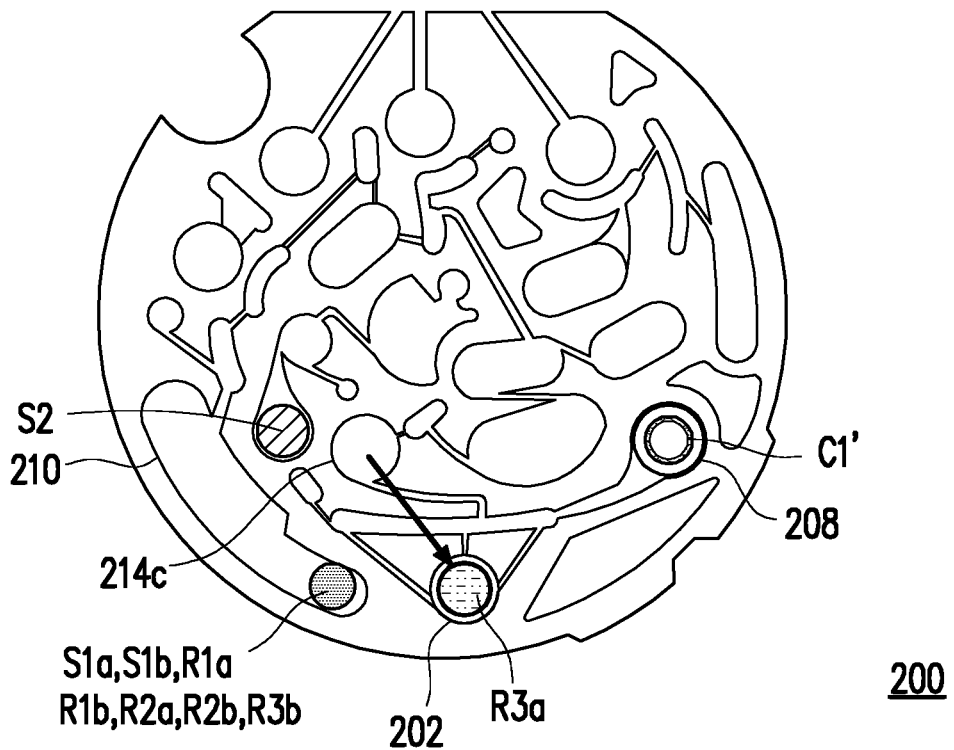
Figure 13P:
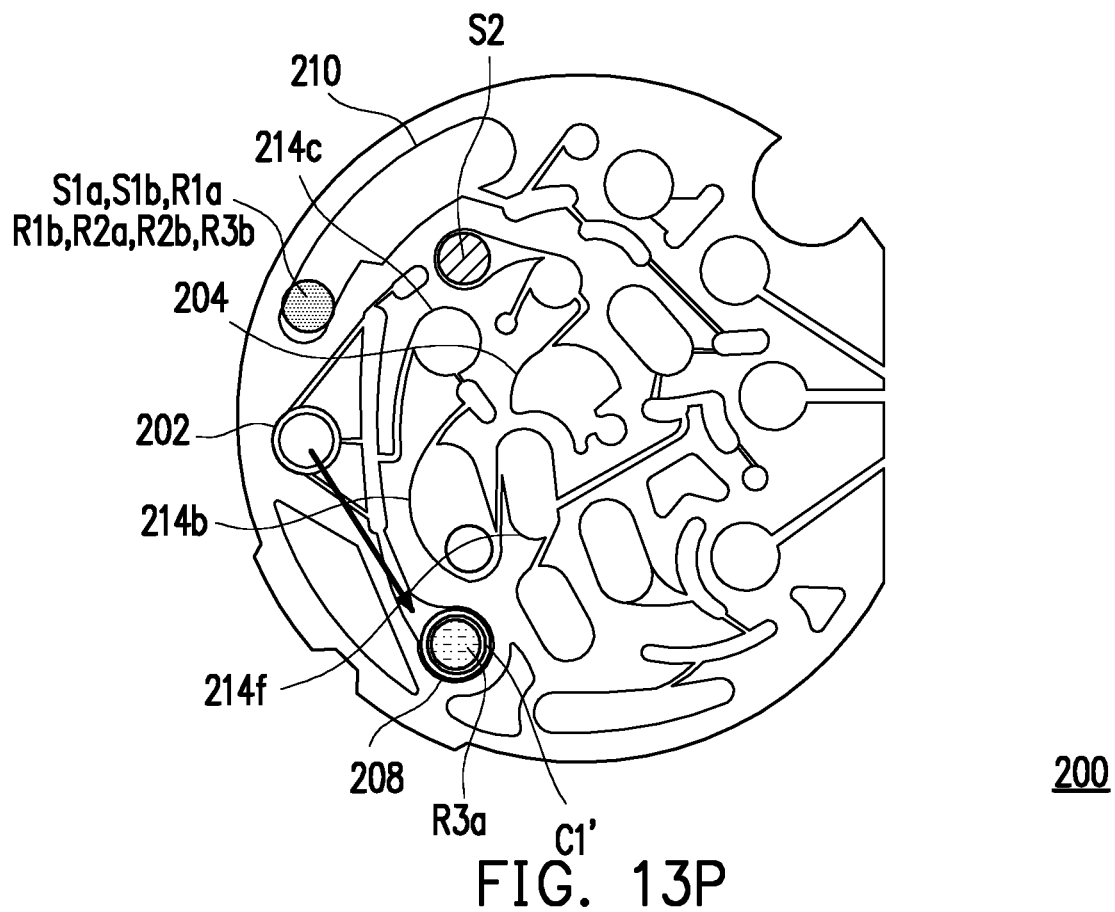
Figure 13Q:
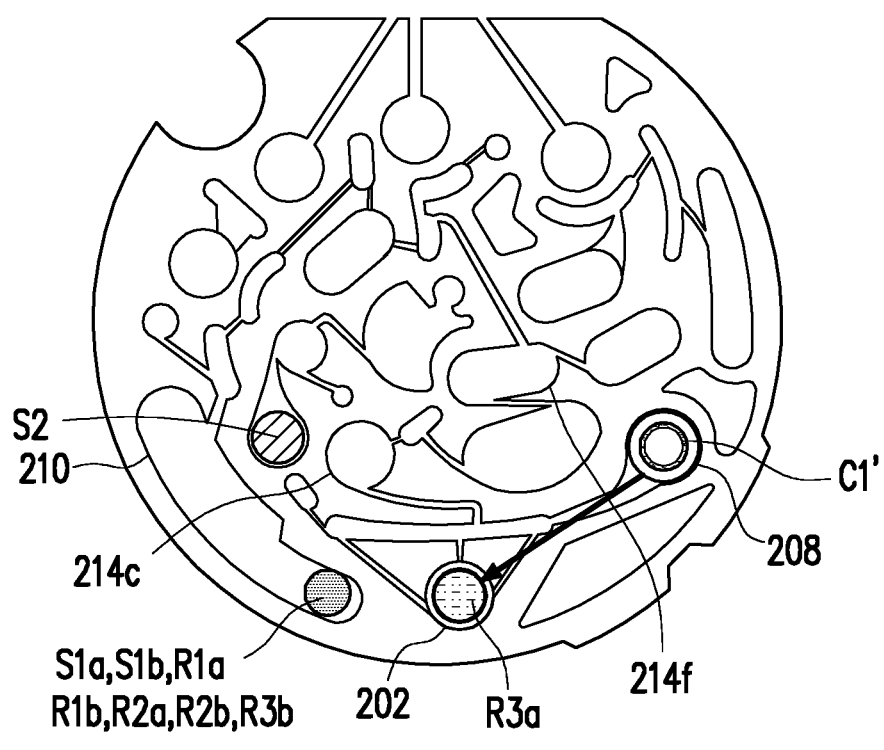

FIG. 13A to FIG. 13Q are flowcharts of a detection method of another embodiment of the invention.

Referring to FIG. 13A, a detection cartridge 200 includes a detection tank 202, a sample tank 204, a centrifuge tank 206, a second temporary tank 208, a capture unit C1, a waste tank 210, containers 212*a* to 212*c*, and first temporary tanks 214*a* to 214*h*.

In addition, FIG. 13A shows the front surface of the detection cartridge 200. The detection cartridge 200 not only includes a pathway located on the front surface of the detection cartridge 200, but further includes a pathway located on the back surface of the detection cartridge 200, and the pathway may be in communication with the above tank body according to the product design method.

The sample tank 204 is in communication with the detection tank 202. The centrifuge tank 206 is in communication between the detection tank 202 and the sample tank 204, and the centrifuge tank 206 includes a sampling portion 206*a* and a separation portion 206*b*. The second temporary tank 208 is in communication with the detection tank 202. The capture unit C1 is coupled to the inner wall of the second temporary tank 208 (e.g., on the bottom surface). For relevant descriptions of the capture unit C1, refer to the capture unit C (FIG. 4A), and the description is not repeated herein. The waste tank 210 is in communication with the detection tank 202. The container 212*a* is in communication with the detection tank 202 via a first flow path. The container 212*b* is in communication with the detection tank 202 via a second flow path. The container 212*c* is in communication with the detection tank 202 via a third flow path. The temporary tanks 214*a* to 214*h* are in communication with the detection tank 202.

Specifically, the container 212*a*, the first temporary tank 214*a*, the first temporary tank 214*b*, the first temporary tank 214*c*, and the detection tank 202 are sequentially disposed on the first flow path. The container 212*b*, the first temporary tank 214*d*, the first temporary tank 214*e*, the first temporary tank 214*f*, the first temporary tank 214*b*, the first temporary tank 214*c*, and the detection tank 202 are sequentially disposed on the second flow path. The container 212*c*, the first temporary tank 214*g*, the first temporary tank 214*h*, the first temporary tank 214*d*, the first temporary tank 214*e*, the first temporary tank 214*f*, the first temporary tank 214*b*, the first temporary tank 214*c*, and the detection tank 202 are sequentially disposed on the third flow path. The first temporary tank 214*b* and the first temporary tank 214*c* are located between the centrifuge tank 206 and the detection tank 202. In other words, the first flow path, the second flow path, and the third flow path of the detection cartridge 200 and the flow path of the sample tank 204 in communication with the detection tank 202 have a shared path. That is, the first flow path and the second flow path and the pathway of the sample tank 204 in communication with the detection tank 202 share the path from the first temporary tank 214*b* to the detection tank 202, and the second flow path and the third flow path share the path from the first temporary tank 214*d* to the detection tank 202.

The centrifuge tank 206 and at least one of the first temporary tanks 214*a* to 214*h* are respectively in communication with the waste tank 210, so that the balance of the tank space and the centrifugal force may be used to quantify the liquid, and the excess liquid flows into the waste tank 210 to ensure that the content of the test object after the reaction falls within the detectable range, and the detection results of different batches may also be comparable. In the present embodiment, the sampling portion 206*a* of the centrifuge tank 206 and the first temporary tanks 214*a* and 214*d* are respectively in communication with the waste tank 210, but the invention is not limited thereto.

Hereinafter, the detection method using the above detection cartridge 200 is described with reference to FIG. 13A to FIG. 13Q. In the present embodiment, the detection method of the detection cartridge 200 above is exemplified by an enzyme immunochromatization method. The sample S is exemplified by a whole blood sample, the reagent R1 is exemplified by an enzyme-labeled antibody solution, the reagent R2 is exemplified by a cleaning solution, the reagent R3 is exemplified by a coloring solution containing an enzyme receptor, and the capture unit C1 is exemplified by a specific antibody, wherein the enzyme immunochromatography method may be used to quantify the relative concentration of the target antigen in the blood, but the invention is not limited thereto. In other embodiments, the detection method using the detection cartridge 200 may also be a detection method other than the enzyme immunochromatography method, and the types of the sample S, the reagent R1, the reagent R2, and the reagent R3 may be selected according to the type of the detection method.

Referring to FIG. 13A, the detection cartridge 200 is provided. A whole blood (the sample S) is placed in the sample tank 204, and an enzyme-labeled antibody solution (the reagent R1), a washing solution (the reagent R2), and a coloring solution (the reagent R3) containing an enzyme receptor are respectively placed in the containers 212a to 212c.

Referring to FIG. 13B, when the detection cartridge 200 is set to be located at a first angle of rotation (e.g., 0 degrees) and a centrifugal force is applied, the whole blood (the sample S) remains in the sample tank 204, the enzyme-labeled antibody solution (the reagent R1) flows into the first temporary tank 214a, the cleaning liquid (the reagent R2) flows into the first temporary tank 214d, and the coloring solution (the reagent R3) flows into the first temporary tank 214g. In addition, the manner of mounting the detection cartridge 200 on the centrifuge device is provided in the foregoing embodiments and is not repeated herein.

Referring to FIG. 13C, when the detection cartridge 200 is set to be located at a second angle of rotation (e.g., −60 degrees) and the centrifugal force is applied, the whole blood (the sample S) flows into the centrifuge tank 206, a quantitative enzyme-labeled antibody solution (a reagent R1a) in the enzyme-labeled antibody solution (the reagent R1) remains in the first temporary tank 214a, a quantitative cleaning solution (a reagent R2a) in the cleaning solution (the reagent R2) remains in the first temporary tank 214d, and the coloring solution (the reagent R3) remains in the first temporary tank 214g. Further, the remaining enzyme-labeled antibody solution (a reagent R1b) in the enzyme-labeled antibody solution and the remaining cleaning solution (a reagent R2b) in the washing solution (the reagent R2) flow into the waste tank 210.

At this time, after the whole blood (the sample S) flowing into the centrifuge tank 206 is centrifuged, a quantitative plasma (a sample S1a) is located in the sampling portion 206a of the centrifuge tank 206, the excess plasma (a sample S1b) flows into the waste tank 210, and the blood cell (the sample S2) is located in the separation portion 206b of the centrifuge tank 206.

Referring to FIG. 13D, when the detection cartridge 200 is set to be located at a third angle of rotation (e.g., 90 degrees) and a centrifugal force is applied, a quantitative plasma (the sample S1a) flows into the temporary tank 214b, a quantitative enzyme-labeled antibody solution (the reagent R1a) flows into the first temporary tank 214b, a quantitative cleaning solution (the reagent R2a) flows into the first temporary tank 214e, and the coloring solution (the reagent R3) flows into the first temporary tank 214h. At this time, the plasma (the sample S1a) flowing into the first temporary tank 214b is mixed with the enzyme-labeled antibody solution (the reagent R1a), and the target antigen in the plasma (the sample S1a) and the enzyme-labeled antibody in the enzyme-labeled antibody solution (the reagent R1a) may produce a reaction. At the time of centrifugation, the blood cell (the sample S2) in the separation portion 206b of the centrifuge tank 206 does not flow out of the separation portion 114b, and the plasma (the sample S1b) in the waste tank 210, the enzyme-labeled antibody solution (the reagent R1b), and the cleaning solution (the reagent R2b) also do not flow out of the waste tank 210 due to the structural design of the centrifuge tank 206 with the angle of rotation setting, and the description is omitted below.

Referring to FIG. 13E, when the detection cartridge 200 is set to be located at the first angle of rotation (e.g., 0 degrees) and a centrifugal force is applied, the mixture of plasma (the sample S1a) and enzyme-labeled antibody solution (the reagent R1a) remains at the first temporary tank 214b, the cleaning solution (the reagent R2a) remains in the first temporary tank 214e, and the coloring solution (the reagent R3) remains in the first temporary tank 214h. In this step, the centrifugal force applied to the liquid in the first temporary tank 214b does not cause the liquid to flow out of the first temporary tank 214b, but oscillates the liquid therein, thereby assisting the mixture of plasma (the sample S1a) in the temporary tank 214b and enzyme-labeled antibody solution (the reagent R1a) to be continuously mixed and reacted.

Referring to FIG. 13F, when the detection cartridge 200 is set to be located at a second angle of rotation (e.g., −60 degrees) and a centrifugal force is applied, a mixture of plasma (the sample S1a) and enzyme-labeled antibody solution (the reagent R1a) flows into the first temporary tank 214c, the cleaning solution (the reagent R2a) flows into the first temporary tank 214f, and the coloring solution (the reagent R3) flows into the first temporary tank 214d. In this step, a quantitative coloring solution (the reagent R3a) in the coloring solution (the reagent R3) remains in the first temporary tank 214d, and the remaining coloring solution (the reagent R3b) flows into the waste tank 210. At this time, a mixture of plasma (the sample S1a) and enzyme-labeled antibody solution (the reagent R1a) is continuously mixed and reacted.

Referring to FIG. 13G, when the detection cartridge 200 is set to be located at a first angle of rotation (e.g., 0 degrees) and a centrifugal force is applied, a mixture of plasma (the sample S1a) and enzyme-labeled antibody solution (the reagent R1a) flows into the detection tank 202, the cleaning solution (the reagent R2a) flows into the first temporary tank 214b, and the coloring solution (the reagent R3a) remains in the first temporary tank 214d. In this step, a mixture of plasma (the sample S1a) and enzyme-labeled antibody solution (the reagent R1a) is continuously mixed and reacted.

Referring to FIG. 13H, when the detection cartridge 200 is set to be located at a third angle of rotation (e.g., 90 degrees) and a centrifugal force is applied, a mixture of plasma (the sample S1a) and enzyme-labeled antibody solution (the reagent R1a) flows into the second temporary tank 208, the cleaning solution (the reagent R2a) remains in the first temporary tank 214b, and the coloring solution (the reagent R3a) flows into the first temporary tank 214e. At this time, the mixture of plasma (the sample S1a) flowing into the second temporary tank 208 and enzyme-labeled antibody solution (the reagent R1a) interacts with a specific antibody (the capture unit C1) to form an enzyme-labeled antibody antigen-antibody complicated (the capture unit complicated C1') connected to the second temporary tank 208.

Referring to FIG. 13I, when the detection cartridge 200 is set to be located at a first angle of rotation (for example, 0 degrees) and a centrifugal force is applied, a mixture of plasma (the sample S1a) reacted with the specific antibody (the capture unit C1) and enzyme-labeled antibody solution (the reagent R1a) flows back to the detection tank 202, the cleaning solution (the reagent R2a) remains in the first temporary tank 214b, and the coloring solution (the reagent R3a) remains in the first temporary tank 214e. In this step, the liquid is removed from the second temporary tank 208, which prevents the subsequent reaction of the enzyme-labeled antibody antigen-antibody complicated (the capture unit complicated C1') of the second temporary tank 208 from being disturbed.

Referring to FIG. 13J, when the detection cartridge 200 is set to be located at a second angle of rotation (e.g., −60 degrees) and a centrifugal force is applied, a mixture of plasma (the sample S1a) and enzyme-labeled antibody solution (the reagent R1a) flows into the waste tank 210, the cleaning solution (the reagent R2a) flows into the first temporary tank 214c, and the coloring solution (the reagent R3a) flows into the first temporary tank 214f. In this step, the liquid is removed from the detection tank 202 to avoid interference with subsequent detections.

Referring to FIG. 13K, when the detection cartridge 200 is set to be located at a first angle of rotation (e.g., 0 degrees) and a centrifugal force is applied, the cleaning solution (the reagent R2a) flows into the detection tank 202, and the coloring solution (the reagent R3a) flows into the first temporary tank 214b.

Referring to FIG. 13L, when the detection cartridge 200 is set to be located at a third angle of rotation (e.g., 90 degrees) and a centrifugal force is applied, the cleaning solution (the reagent R2a) flows into the second temporary tank 208, and the coloring solution (the reagent R3a) remains in the first temporary tank 214b.

Referring to FIG. 13M, when the detection cartridge 200 is set to be located at a first angle of rotation (e.g., 0 degrees) and a centrifugal force is applied, the cleaning solution (the reagent R2a) flows back into the detection tank 202, and the coloring solution (the reagent R3a) remains in the first temporary tank 214b. In this step, the cleaning solution (the reagent R2a) may remove the mixture of plasma (the sample S1a) and enzyme-labeled antibody solution (the reagent R1a) previously not completely removed from the second temporary tank 208, thereby preventing the subsequent reaction of the enzyme-labeled antibody antigen-antibody complicated (the capture unit complicated C1') of the second temporary tank 208 from being disturbed.

Referring to FIG. 13N, when the detection cartridge 200 is set to be located at a second angle of rotation (e.g., −60 degrees) and a centrifugal force is applied, the cleaning solution (the reagent R2a) flows into the waste tank 210, and the coloring solution (the reagent R3a) flows into the first temporary tank 214c. In this step, the liquid is removed from the detection tank 202 to avoid interference with subsequent detections.

Referring to FIG. 13O, when the detection cartridge 200 is set to be located at a first angle of rotation (e.g., 0 degrees) and a centrifugal force is applied to the coloring solution (the reagent R3a), the coloring solution (the reagent R3a) flows into the detection tank 202.

Referring to FIG. 13P, when the detection cartridge 200 is set to be located at a third angle of rotation (e.g., 90 degrees) and a centrifugal force is applied, the coloring solution (the reagent R3a) flows to the second temporary tank 208. In this step, the enzyme receptor in the coloring solution (the reagent R3a) flowing into the second temporary tank 208 may react with the enzyme of the enzyme-labeled antibody antigen-antibody complicated (the capture unit complicated C1') to change the color or turbidity of the coloring solution (the reagent R3a).

Referring to FIG. 13Q, when the detection cartridge 200 is set to be located at a first angle of rotation (e.g., 0 degrees) and a centrifugal force is applied, the coloring solution (the reagent R3a) flows back to the detection tank 202.

Next, the colored substance contained in the coloring solution (the reagent R3a) in the detection tank 202 or the liquid turbidity thereof is detected, thereby obtaining the relative concentration of the target antigen in the blood.

In other embodiments, the detection cartridge 200 above may be used to obtain dynamic detection results.

Referring to FIG. 13G, when a mixture of plasma (the sample S1a) and enzyme-labeled antibody solution (the reagent R1a) flows into the detection tank 202, the liquid in the detection tank 202 is first detected to obtain a first detection result.

Next, referring to FIG. 13H, when a mixture of plasma (the sample S1a) and enzyme-labeled antibody solution (the reagent R1a) flows into the second temporary tank 208, the mixture of plasma (the sample S1a) flowing into the second temporary tank 208 and enzyme-labeled antibody solution (the reagent R1a) interacts with a specific antibody (the capture unit C1) to form an enzyme-labeled antibody antigen-antibody complicated (a capture unit complicated C1') connected to the second temporary tank 208.

Referring to FIG. 13I, a mixture of plasma (the sample S1a) not reacted with a specific antibody (the capture unit C1) and enzyme-labeled antibody solution (the reagent R1a) flows back to the detection tank 202, and at this point the liquid in the detection tank 202 is detected again to obtain a second detection result. Via the difference between the first detection value and the second detection value, the content of the components in which the mixture of plasma (the sample S1a) and enzyme-labeled antibody solution (the reagent R1a) interacts with the specific antibody (the capture unit C1) is known.

Then, referring to FIG. 13O, when the coloring solution (the reagent R3a) flows into the detection tank 202, the liquid in the detection tank 202 is again detected at this point to obtain a third detection result.

Next, referring to FIG. 13P, an enzyme receptor in the coloring solution (the reagent R3a) flowing into the second temporary tank 208 may react with the enzyme-labeled antibody antigen-antibody complicated (the capture unit complicated C1') to change the color of the coloring solution (the reagent R3a).

Referring to FIG. 13Q, the coloring solution (the reagent R3a) flows back to the detection tank 202. Next, the colored substance contained in the liquid in the detection tank 208 is detected to obtain a fourth detection result. Using the third detection value as the background value, the difference between the third detection value and the fourth detection value is used to calculate the content of the colored substance in the solution, thereby more accurately obtaining the relative concentration of the target antigen in the blood.

Based on the above embodiments, in the detection cartridge 200, the detection method, and the detection device of the above embodiments, the quantity of the temporary tanks on the third flow path of the detection cartridge 200 is set to be greater than the quantity of the temporary tanks of the second flow path, and the quantity of the temporary tanks on the second flow path is set to be greater than the quantity of the temporary tanks on the first flow path, so that the reagents R1 to R3 flow into the detection tank 202 sequentially via three flow paths. Therefore, the detection cartridge 200 and the detection method of the above embodiments may execute multi-stage reaction detection, simplify the complicated operation flow of the detection machine, reduce human error, and improve the convenience of detection. In addition, when dynamic detection is used, the detection result may be more accurate by measuring the change of the values before and after the reaction.

Based on the above, in the detection cartridge, the detection method, and the detection device of the above embodiments, via the design of the quantity of the temporary tanks on the plurality of flow paths, the reagents may flow into the detection tank sequentially. Therefore, the detection cartridge, the detection method, and the detection device of the above embodiments may execute multi-stage reaction detection, simplify the complicated operation flow of the detection machine, reduce human error, and improve the convenience of detection.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A detection cartridge, comprising:
    a detection tank;
    a sample tank in communication with the detection tank;
    N containers in communication with the detection tank, wherein N is a positive integer greater than or equal to 2;
    at least one first temporary tank disposed on at least one of N flow paths between the N containers and the detection tank, wherein a quantity of the temporary tanks on an nth flow path in the N flow paths is at least two greater than that on an (n−1)th flow path, and n is a positive integer that is not less than 2 and is not more than N; and
    a waste tank in direct communication with the detection tank.

2. The detection cartridge of claim 1, wherein the sample tank is not located on the N flow paths.

3. The detection cartridge of claim 1, wherein the at least one first temporary tank is located at a turning point of the N flow paths.

4. The detection cartridge of claim 1, further comprising a centrifuge tank in communication between the sample tank and the detection tank.

5. The detection cartridge of claim 4, wherein the centrifuge tank and the at least one first temporary tank are respectively in communication with the waste tank.

6. The detection cartridge of claim 1, further comprising:
    a second temporary tank in communication with the detection tank; and
    a capture unit connected to an inner wall of the second temporary tank.

7. The detection cartridge of claim 1, further comprising a capture unit connected to an inner wall of the at least one first temporary tank.

8. The detection cartridge of claim 1, wherein some of the N flow paths have a shared path.

9. The detection cartridge of claim 8, wherein an (n−1)th container in the N containers is located on the shared path between a nth container and the detection tank.

10. A detection method, comprising:
    providing a centrifuge device, wherein the centrifuge device comprises a driving unit, a platform connected to the driving unit, and a turntable disposed on the platform, wherein the platform has an axis of rotation;
    mounting the detection cartridge of claim 1 on the turntable;
    placing a sample into the sample tank;
    placing N reagents into the N containers respectively;
    introducing the sample into the detection tank;
    introducing the N reagents into the detection tank sequentially via the N flow paths, wherein in the step of sequentially introducing the N reagents into the detection tank via the N flow paths, a rotating speed and a rotating direction of the platform are controlled to change a relative position of any position on the detection cartridge with respect to the axis of rotation, and a centrifugal force is applied to the sample and the N reagents; and
    detecting a liquid in the detection tank,
    wherein the step of introducing the N reagents into the detection tank sequentially via the N flow paths comprises:
    introducing a liquid in an (n−1)th flow path into the detection tank;
    introducing the liquid in the detection tank into the waste tank; and
    introducing a liquid in an nth flow path into the detection tank.

11. The detection method of claim 10, wherein the detection cartridge has an angle of rotation with respect to a reference direction, and the angle of rotation is set according to a flow path in which a position of a liquid is to be changed in the N flow paths.

12. The detection method of claim 11, wherein the detection cartridge is located at the angle of rotation, and when the centrifugal force is applied to the sample and the N reagents, a position of the liquid in one part of the N flow paths is changed, and the liquid in the other part of the N flow paths remains at the same position.

13. The detection method of claim 10, wherein the detection cartridge further comprises a centrifuge tank in communication between the sample tank and the detection tank.

14. The detection method of claim 10, wherein the detection cartridge further comprises:
    a second temporary tank in communication with the detection tank; and
    a capture unit connected to an inner wall of the second temporary tank.

15. The detection method of claim 14, further comprising, before the liquid in the detection tank is introduced into the waste tank:
    introducing the liquid in the detection tank into the second temporary tank; and
    returning the liquid in the second temporary tank to the detection tank.

16. The detection method of claim 10, wherein the detection cartridge further comprises a capture unit, and the capture unit is connected to an inner wall of the at least one first temporary tank.

17. A detection device, comprising:
    a centrifuge device, comprising:
        a driving unit;
        a platform connected to the driving unit; and
        a turntable disposed on the platform; and
    the detection cartridge of claim 1 mounted on the turntable.

* * * * *